(12) United States Patent
Hasegawa et al.

(10) Patent No.: US 11,895,044 B2
(45) Date of Patent: *Feb. 6, 2024

(54) TRANSMISSION DEVICE, COMMUNICATION SYSTEM, AND TRANSMISSION METHOD

(71) Applicant: MITSUBISHI ELECTRIC CORPORATION, Tokyo (JP)

(72) Inventors: Fumihiro Hasegawa, Tokyo (JP); Akinori Taira, Tokyo (JP); Shigeru Uchida, Tokyo (JP); Noriyuki Fukui, Tokyo (JP); Akihiro Okazaki, Tokyo (JP); Hiroki Iura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 17/144,700

(22) Filed: Jan. 8, 2021

(65) Prior Publication Data

US 2021/0135805 A1 May 6, 2021

Related U.S. Application Data

(63) Continuation of application No. 16/466,999, filed as application No. PCT/JP2016/086450 on Dec. 7, 2016, now Pat. No. 10,931,413.

(51) Int. Cl.
*H04L 5/00* (2006.01)

(52) U.S. Cl.
CPC .......... *H04L 5/0007* (2013.01); *H04L 5/0053* (2013.01)

(58) Field of Classification Search
CPC .................................................. H04L 5/0007
See application file for complete search history.

(56) References Cited

U.S. PATENT DOCUMENTS 8,036,190 B2  10/2011  Hsiao et al.
8,428,018 B2   4/2013  Noh et al.
(Continued)

FOREIGN PATENT DOCUMENTS

EP   2 498 413 A1   9/2012
EP   2 763 480 A1   8/2014
(Continued)

OTHER PUBLICATIONS

Indian Office Action for Indian Application No. 202148027072, dated May 27, 2022, with an English translation.
(Continued)

*Primary Examiner* — Sulaiman Nooristany
(74) *Attorney, Agent, or Firm* — Birch, Stewart, Kolasch & Birch, LLP

(57) ABSTRACT

A base station includes: a control unit that allocates one or more layers per terminal for transmission to one or more terminals, and configures positions in a frequency domain and a time domain of reference signals of each of the layers on the basis of at least one of information indicating a position of each of the terminals and information indicating condition of each of channel between the transmission device and the one or more terminals; a processing unit that arranges the reference signals of each of the layers in the frequency domain and the time domain on the basis of the positions in the frequency domain and the time domain configured by the control unit; and a precoding unit and a transmitting unit that perform space-division multiplexing on signals of one or more layers arranged by the processing unit, and transmit the multiplexed signals.

5 Claims, 24 Drawing Sheets

(56) References Cited

U.S. PATENT DOCUMENTS

| | | | |
|---|---|---|---|
| 8,588,161 | B2 | 11/2013 | Lee et al. |
| 8,885,541 | B2 | 11/2014 | Gorokhov et al. |
| 8,953,430 | B2 | 2/2015 | Pham |
| 9,112,552 | B2 | 8/2015 | Ko et al. |
| 9,178,639 | B2 | 11/2015 | Lee et al. |
| 9,401,824 | B1 | 7/2016 | Zhang et al. |
| 9,554,381 | B2 | 1/2017 | Park et al. |
| 9,648,802 | B2 | 1/2017 | Nazar et al. |
| 9,648,588 | B2 | 5/2017 | Kim et al. |
| 9,648,632 | B2 | 5/2017 | Yang et al. |
| 9,769,812 | B2 | 9/2017 | Chae et al. |
| 9,769,813 | B2 | 9/2017 | Kim et al. |
| 9,800,393 | B2 | 10/2017 | Wei et al. |
| 10,243,720 | B2 | 3/2019 | Lee et al. |
| 10,251,165 | B2 | 4/2019 | Seo et al. |
| 2010/0080154 | A1 | 4/2010 | Noh et al. |
| 2010/0177746 | A1 | 7/2010 | Gorokhov et al. |
| 2010/0260059 | A1 | 10/2010 | Zhang et al. |
| 2013/0039332 | A1 | 2/2013 | Nazar et al. |
| 2014/0200009 | A1 | 7/2014 | Schier et al. |
| 2015/0295745 | A1* | 10/2015 | Prodan ............... H04L 27/2647 375/260 |
| 2016/0087709 | A1 | 3/2016 | Horiuchi et al. |
| 2016/0205677 | A1 | 7/2016 | Kim et al. |
| 2019/0393999 | A1 | 12/2019 | Hasegawa et al. |

FOREIGN PATENT DOCUMENTS

| | | |
|---|---|---|
| JP | 2014-14097 A | 1/2014 |
| JP | 2014-138424 A | 7/2014 |
| JP | 2016-501489 A | 1/2016 |
| JP | 2016-027747 A | 2/2016 |
| JP | 2016-518758 A | 6/2018 |

OTHER PUBLICATIONS

Communication pursuant to Article 94(3) EPC dated Mar. 17, 2021 in corresponding European Application No. 16923604.9.
Office Action dated Mar. 23, 2021 in corresponding Japanese Application No. 2019-096661.
Bingham, "Multicarrier Modulation for Data Transmission: An Idea Whose Time Has Come", IEEE Communications Magazine, May 1990, vol. 28, No. 5. pp. 5-14.
Chu, "Polyphase codes with good periodic correlation properties" IEEE Transactions on Information Theory, Jul. 1972, vol. 18, No. 4, pp. 531-532.
Myung et al, "Single carrier FDMA for Uplink Wireless Transmission" IEEE Vehicular Technology Magazine, Sep. 2006, pp. 30-38.
Notification of Reason for Refusal (JP Application No. 2017-535725) dated Oct. 2, 2018.
NTT Docomo, "Discussion on High Order MU-MIMO Transmission for NR," 3GPP TSG RAN WG1 Meeting #87, R1-1613103, Reno, USA, Nov. 14-18, 2016, XP051190990, (Total pp. 6).
Office Action dated Dec. 31, 2020 in corresponding Indian Patent Application No. 201947022659.
Office Action dated Oct. 6, 2020 in corresponding Japanese Application No. 2019-096661.
Office Action dated Sep. 29, 2020 in corresponding European Patent Application 16923604.9.
Pantech, "Downlink control signaling for PDSCH RE mapping of DL CoMP", 3GPP TSG-RAN WG1#70bis R1-124304, San Diego, USA, Oct. 8-12, 2012, pp. 1-3.

* cited by examiner

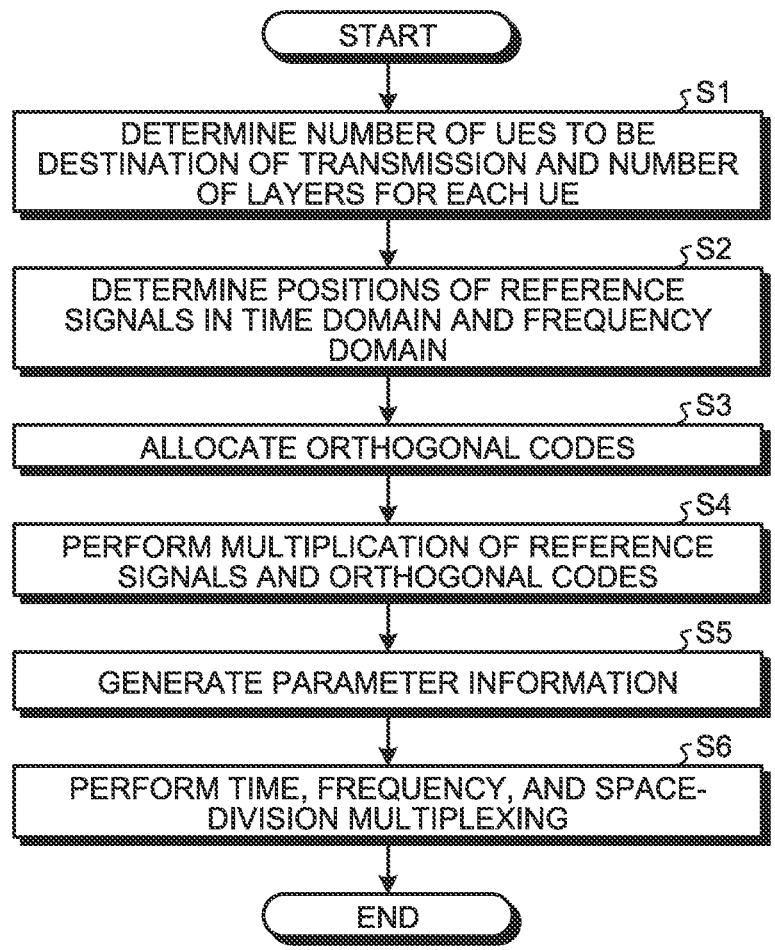
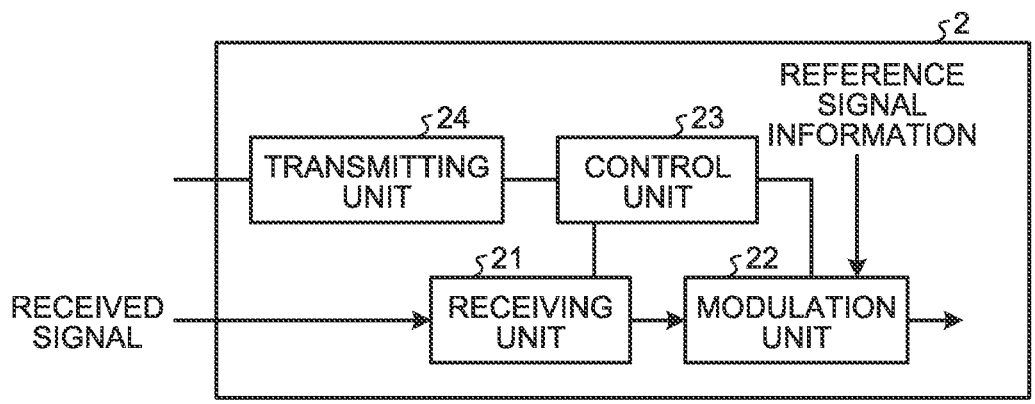

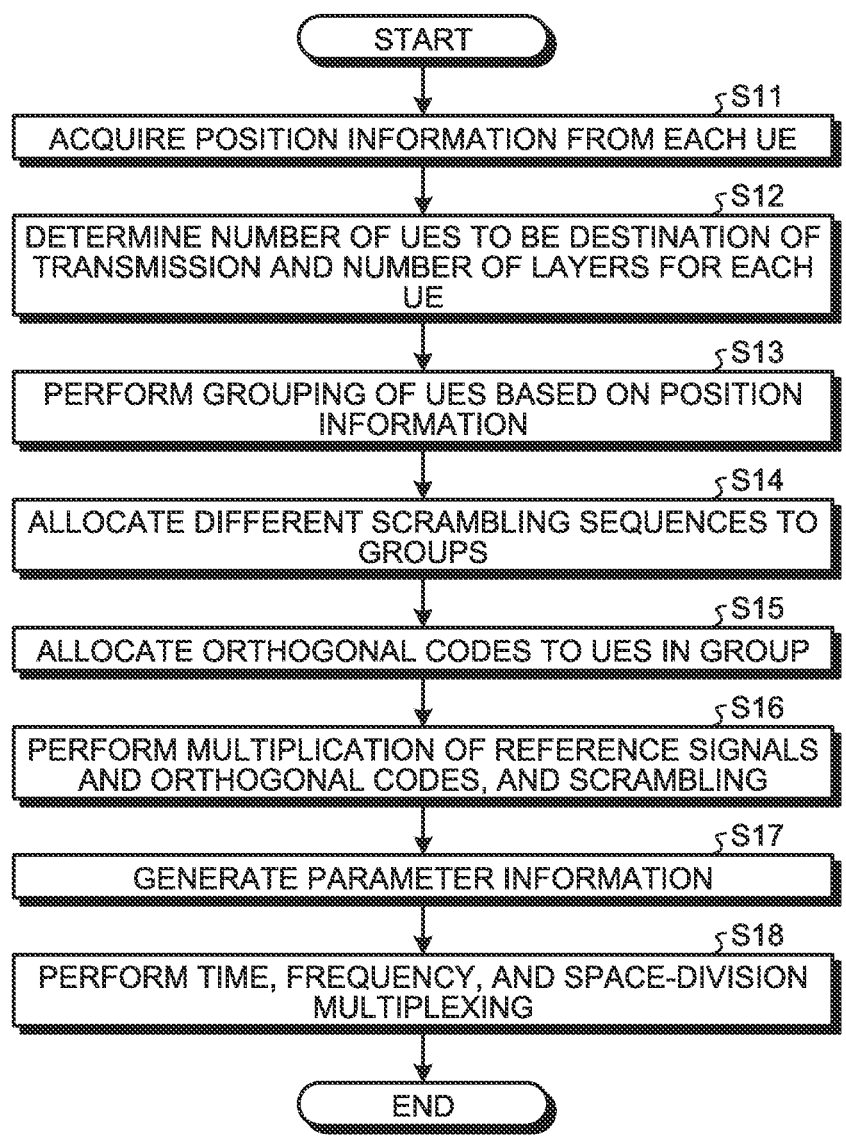

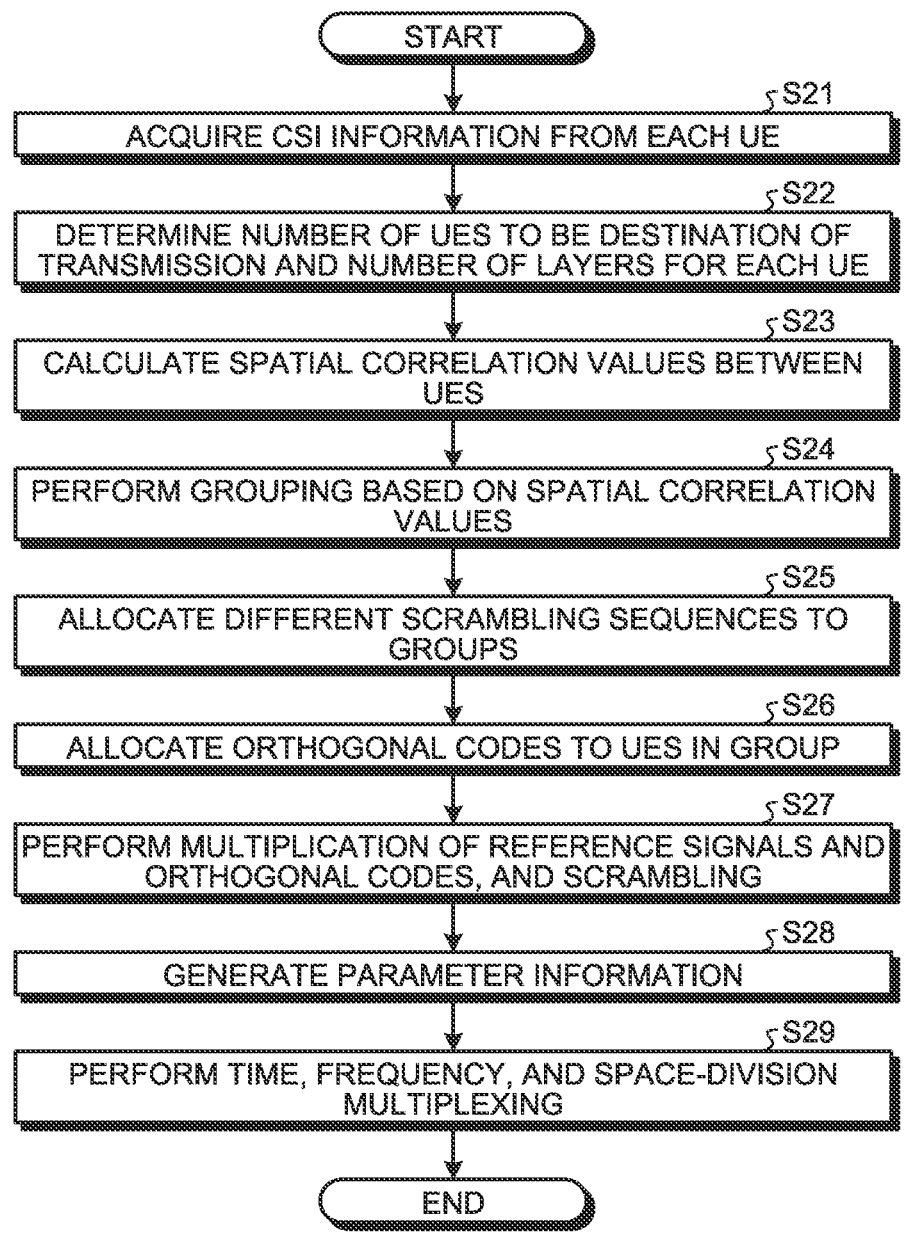

TRANSMISSION DEVICE, COMMUNICATION SYSTEM, AND TRANSMISSION METHOD

CROSS-REFERENCE TO RELATED APPLICATIONS

This application is a Continuation of copending application Ser. No. 16/466,999, filed on Jun. 5, 2019, which is the National Phase under 35 U.S.C. § 371 of International Application No. PCT/JP2016/086450, filed on Dec. 7, 2016, all of which are hereby expressly incorporated by reference into the present application.

FIELD

The present invention relates to a transmission device that transmits signals using space-division multiplexing, a communication system, and a transmission method.

BACKGROUND

In digital communication systems, frequency selectivity and time variation of channels are caused by multipath fading, which is caused by reflection of transmitted signals by buildings or the like, or Doppler fluctuation, which is caused by movement of terminals. In such multipath environment, a received signal is a signal resulting from interference between transmitted symbols and symbols arriving with delay.

To achieve best reception characteristics on such frequency-selective channels, the orthogonal frequency division multiplexing (OFDM) transmission scheme, which performs multiple carrier (MC) block transmission, is used (refer, for example, to Non Patent Literature 1 below).

In the meantime, to increase communication capacity, the multiple-input and multiple-output (MIMO) wireless transmission scheme using a plurality of transmitting and receiving antennas is used. In MIMO communication, signals of a plurality of transmission layers are multiplexed for the purpose of increasing communication capacity. Note that a transmission layer is a unit of signals subjected to space-division multiplexing, which is also called as stream. Hereinafter, multiplexing of signals of a plurality of transmission layers will be referred to as layer multiplexing. Layer multiplexing for a plurality of users is called multiuser MIMO. In multiuser MIMO, a transmission device multiplexes signals of one or more layers per user for a plurality of users.

Layer multiplexing is typically performed by using precoding by a transmission device. Precoding refers to a process of forming beams by weighting a plurality of signals to be transmitted from a plurality of antennas. Precoded signals are affected by a channel between a transmission device and a reception device before reaching the reception device. The transmission device inserts reference signals in signals to be transmitted to enable estimation of the state of a channel, that is, channel estimation and demodulation of signals subjected to layer multiplexing at the reception device. There are some types of reference signals. For example, one of reference signals defined by the 3rd Generation Partnership Project (3GPP) that is a standards body is a demodulation reference signal (DM-RS). Because a DM-RS is precoded, a reception device that has received a signal in which a DM-RS is inserted can use the DM-RS for estimation of the precoding performed at the transmission device and estimation of a channel.

Typically, in multiuser MIMO, a unique reference signal is allocated to each layer. Thus, a reception device can perform channel estimation and demodulation by using the reference signal allocated to a layer associated with the reception device.

CITATION LIST

Non Patent Literature

Non Patent Literature 1: J. A. C. Bingham, "Multicarrier Modulation for Data Transmission: An Idea Whose Time Has Come", IEEE Commun. Mag., vol. 28, No. 5, May 1990, pp. 5-14.

SUMMARY

Technical Problem

In the OFDM transmission scheme, reference signals can be arranged in the frequency domain and the time domain in units of a subcarrier in frequency or a resource element in the 3GPP. A resource element is a unit for allocation of resources provided in the 3GPP. As described above, use of reference signals enables a reception device to perform channel estimation and demodulation. In the typical multiuser MIMO, however, only a unique reference signal is allocated to each layer, but interference between layers is not considered. Thus, in a case where spatial separation between users is imperfect, interference between reference signals of a plurality of layers occurs, and the accuracy of channel estimation at a reception device may be degraded. When the accuracy of channel estimation is degraded, demodulation may not be performed properly at a reception device, which may result in increase in retransmission and decrease in communication capacity to a value lower than a desired value. In addition, the appropriate number of reference signals to be inserted by a transmission device varies depending on the states of channels, that is, the communication environment. According to the typical multiuser MIMO of the related art, however, more reference signals than necessary are inserted, which may lower transmission efficiency.

The present invention has been made in view of the above, and an object thereof is to provide a transmission device capable of preventing decrease in transmission efficiency and decrease in communication capacity.

Solution to Problem

A transmission device according to an aspect of the present invention includes a control unit to allocate one or more layers per one terminal for transmission to one or more terminals, and configure positions of reference signals in the frequency domain and the time domain of each of the layers on the basis of at least one of information indicating a position of each of the terminals and information indicating condition of each of channel between the transmission device and the one or more terminals. In addition, the transmission device includes an arranging unit to arrange the reference signals of each of the layers in the frequency domain and the time domain on the basis of the positions in the frequency domain and the time domain determined by the control unit; and a transmission processing unit to perform space-division multiplexing on signals of one or more layers arranged by the arranging unit, and transmit the multiplexed signals.

Advantageous Effects of Invention

A transmission device according to the present invention produces effects of preventing decrease in transmission efficiency and decrease in communication capacity.

BRIEF DESCRIPTION OF DRAWINGS

FIG. 28 is a flowchart illustrating an example of procedures in the base station of the first embodiment.

FIG. 29 is a diagram illustrating an example functional configuration of a terminal of the first embodiment.

FIG. 37 is a flowchart illustrating an example of procedures in the base station of the third embodiment.

FIG. 38 is a flowchart illustrating another example of procedures in the base station of the third embodiment.

DESCRIPTION OF EMBODIMENTS

A transmission device, a communication system, and a transmission method according to certain embodiments of the present invention will be described in detail below with reference to the drawings. Note that the present invention is not limited to the embodiments.

First Embodiment

Figure 1:
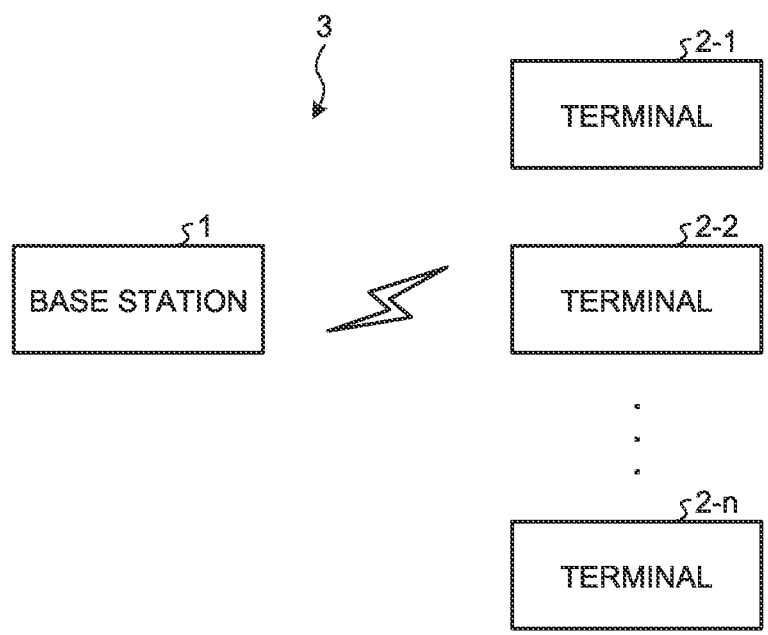
FIG. 1 is a diagram illustrating an example configuration of a communication system according to a first embodiment.

FIG. 1 is a diagram illustrating an example configuration of a communication system according to a first embodiment of the present invention. A communication system 3 according to the present embodiment includes a base station 1, and one or more terminals 2-1 to 2-*n*, which are examples of terminals. n is an integer not smaller than 1. When the terminals 2-1 to 2-*n* are not distinguished from one another, the terminals will be referred to as terminals 2.

The terminals 2 are communication devices also called user terminals or user equipment (UE). In downlink communication, which is communication in a direction from the base station 1 to a terminal 2, the base station 1 is a transmission device and the terminal 2 is a reception device. In uplink communication, which is communication in a direction from a terminal 2 to the base station 1, the terminal 2 is a transmission device and the base station 1 is a reception device. The communication system 3 of the present embodiment employs the OFDM scheme for downlink communication. In addition, the communication system 3 of the present embodiment uses the multiuser MIMO system for downlink communication, in which the base station 1 can perform precoding on transmission signals to be transmitted from a plurality of antennas and form beams directed to a plurality of terminals 2. While an example in which the communication system 3 uses a multiuser MIMO system will be described below, the communication system 3 is not limited to a multiuser MIMO system but may be any communication system that performs layer multiplexing. The communication scheme for uplink communication in the communication system 3 of the present embodiment is not particularly limited and any scheme may be used. Description below may be made mainly on downlink communication. Thus, in the description below, the terminals 2 are reception devices and the base station 1 is a transmission device.

Figure 2:
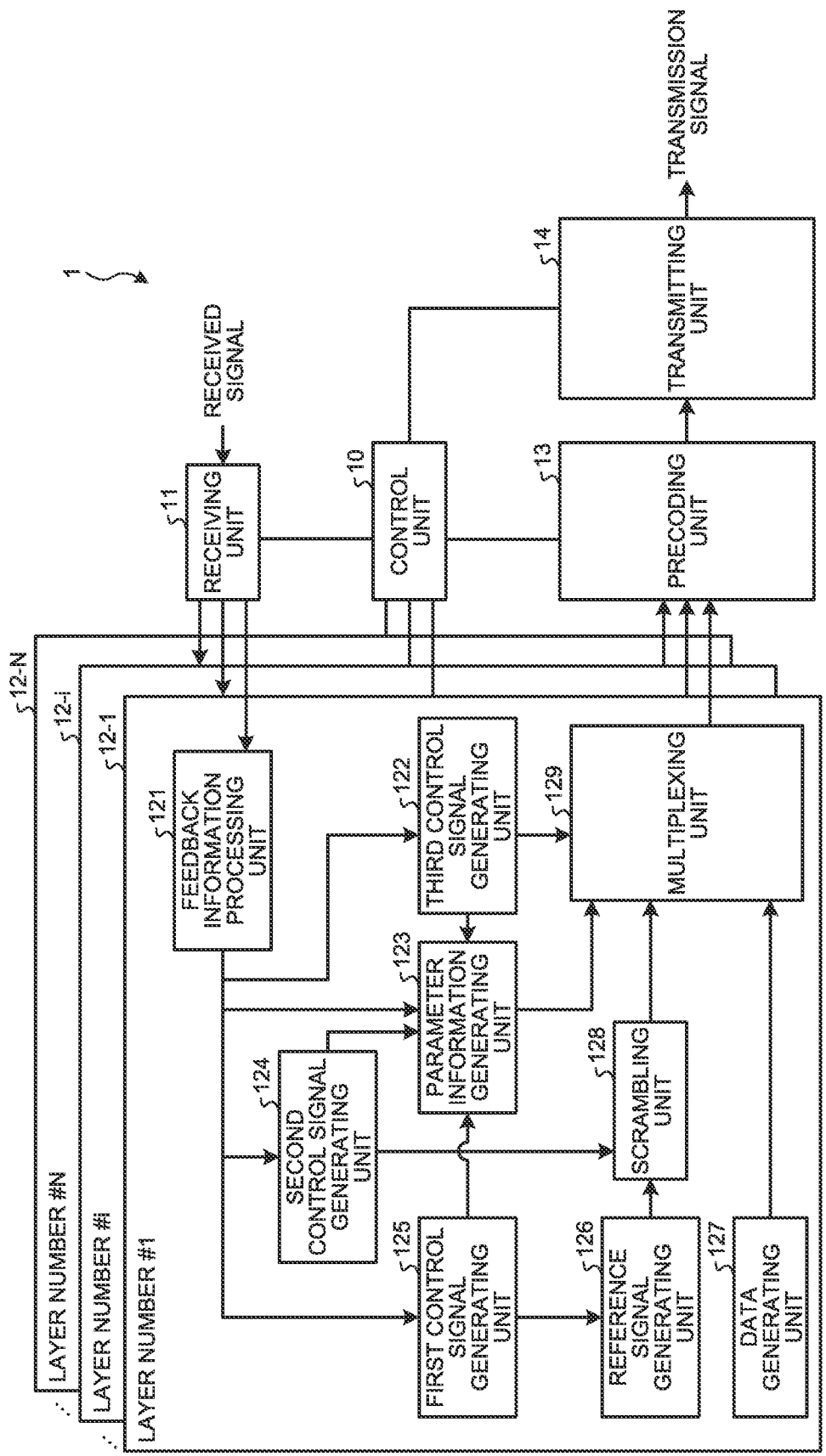
FIG. 2 is a diagram illustrating an example functional configuration of a base station of the first embodiment.

FIG. 2 is a diagram illustrating an example functional configuration of the base station 1 of the present embodiment. As illustrated in FIG. 2, the base station 1 includes a control unit 10, a receiving unit 11, processing units 12-1 to 12-N, a precoding unit 13, and a transmitting unit 14. N is an integer equal to or larger than 2, which is the number of transmission layer. Thus, the number of processing units included in the base station 1 corresponds to the number of transmission layers. In the base station 1, the processing units 12-1 to 12-N has configurations similar to one another. The processing units 12-1 to 12-N constitute arranging units that arrange reference signals in a frequency domain and a time domain of each layer on the basis of positions in the frequency domains and the time domains determined by the control unit 10. When the processing units 12-1 to 12-N are not distinguished from one another, the processing units will be referred to as processing units 12. A processing unit 12 corresponding to a layer number #i (i=1, 2, . . . , N) is a processing unit 12-*i*. Note that a layer with a layer number #i is also called an i-th layer.

The control unit 10 controls the entire operation of the base station 1. For example, the control unit 10 allocates one or more layers per one terminal for transmission to one or more terminals 2, determines the positions of reference signals in the frequency domain and the time domain of each layer on the basis of at least one of information indicating the position of each of the terminals 2 and information indicating the state of each of channels between the base station 1 and the terminals 2, and indicates the results of determination to the processing units 12, correspondingly.

The receiving unit 11 receives signals transmitted from the terminals 2 via uplink communication, and passes the received signals to the processing units 12-1 to 12-N, correspondingly. The precoding unit 13 performs precoding on multiplexed signals, which will be described later, output from the processing units 12-1 to 12-N, and passes the precoded signals to the transmitting unit 14. The precoding unit 13 may include precoders each of which is provided for corresponding one of layers, and perform precoding by different precoders for different layers. Precoding refers to a process of forming beams by weighting a plurality of signals to be transmitted from a plurality of antennas, phase rotation and addition. In this manner, the precoding unit 13 reduces interference when signals to be transmitted toward one or more terminals 2 are spatially multiplexed. In some cases, there is temporarily only one terminal 2 that communicates with the base station 1; this case is also included in the space-division multiplexing. Alternatively, the base station 1 may perform layer multiplexing based on space-division multiplexing by performing polarization-division multiplexing instead of the precoding by the precoding unit 13. Alternatively, the polarization-division multiplexing and the precoding may be combined.

The transmitting unit 14 includes a plurality of antennas, performs modulation, cyclic prefix (CP) addition, and the like on signals received from the precoding unit 13, and transmits the resulting signals as transmission signals to the terminals 2. The precoding unit 13 and the transmitting unit 14 perform space-division multiplexing in downlink communication. Specifically, the precoding unit 13 and the transmitting unit 14 constitute a transmission processing unit that spatially multiplexes signals of one or more layers arranged by the processing units 12-1 to 12-N.

The processing units 12 each include a feedback information processing unit 121, a first control signal generating unit 125, a second control signal generating unit 124, a third control signal generating unit 122, a parameter information generating unit 123, a reference signal generating unit 126, a data generating unit 127, a scrambling unit 128, and a multiplexing unit 129.

Each feedback information processing unit 121 receives feedback information, which is transmitted from the corresponding terminal 2 via uplink communication, via the receiving unit 11. The feedback information transmitted from the terminal 2 is at least one of information on the position of the terminal 2 and information indicating the quality of communication measured or calculated by the terminal 2. For example, the feedback information is at least one of reception device position information, spatial separation information including spatial correlation between layers and the like, used carrier information, a delay spread value of a channel, the moving speed of the reception device, a transmission rate, an allowable delay time, the reversibility of the channel, a calibration accuracy, and distances between reception devices. The reception device position information is information indicating the position of a terminal 2. The terminals 2 each include a position calculating unit using a global positioning system (GPS), for example, or the like to calculate the position of the terminal 2. The used carrier information is information indicating frequencies used for communication by the terminal 2. A delay dispersion value on a channel is a dispersion value of delay on the channel calculated by a terminal 2 on the basis of received signals. The moving speed of a reception device is a moving speed of a terminal 2 measured by the terminal 2, which is calculated by the terminal 2 on the basis of the amount of change of the position of the terminal 2 per unit time, for example. A transmission rate is a transmission rate in downlink communication measured by a terminal 2. When the downlink channel and the uplink channel are the same, channel reciprocity holds. Information on whether channel reciprocity holds or not may be used as feedback information. In addition, in order to achieve the reciprocity, devices are adjusted at a receiver and a transmitter so that the uplink and downlink channels are the same as each other. The magnitude of error between an uplink channel and a downlink channel caused in the adjustment is called calibration accuracy, which may be used as the feedback information. The feedback information may be information other than the above.

The feedback information processing unit 121 outputs the feedback information to the first control signal generating unit 125, the second control signal generating unit 124, the third control signal generating unit 122, and the parameter information generating unit 123.

The first control signal generating unit 125 generates a first control signal, which is a control signal for reference signals, on the basis of the feedback information, and outputs the first control signal to the reference signal generating unit 126. A reference signal is selected from signals of a plurality of predetermined patterns. The first control signal is a control signal indicating a pattern to be used for the reference signal among a plurality of patterns, and includes identification information indicating a pattern to be used for the reference signal. As will be described later, the reference signal may be determined by combination of a pattern and a parameter for the pattern. In this case, the first control signal generating unit 125 selects a pattern to be used for the reference signal, and a parameter for the pattern is also determined.

The reference signal generating unit 126 generates the reference signal on the basis of the first control signal, and outputs the generated reference signal to the scrambling unit 128. Specifically, the reference signal generating unit 126 outputs the reference signal of the pattern indicated by the first control signal among a plurality of patterns held by the reference signal generating unit 126 to the scrambling unit 128. When a parameter for a pattern is specified by the first control signal, the reference signal generating unit 126 changes the reference signal of the pattern indicated by the first control signal on the basis of the parameter for the pattern, and outputs the reference signal resulting from the change to the scrambling unit 128. Any pattern, that is, data sequence to be used for the reference signal may be used; for example, a sequence such as a Zadoff-Chu sequence or a pseudo-noise sequence described in the following document can be used: D. C. Chu, "Polyphase codes with good periodic correlation properties", IEEE Transactions on Information Theory, vol. 18, no. 4, July 1972, pp. 531-532.

The second control signal generating unit 124 generates a second control signal, which is a control signal for scrambling, and outputs the second control signal to the scrambling unit 128. The second control signal is a control signal indicating a kind of scrambling to be performed by the scrambling unit 128. The second control signal is identification information indicating which scrambling code is to be used in the scrambling among a plurality of predetermined scrambling codes, for example. In a case where the scrambling code is a PN sequence, a seed number for generating a PN sequence or the like may be used as the identification information.

The scrambling unit 128 performs scrambling on the reference signal received from the reference signal generating unit 126, and outputs the scrambled reference signal to the multiplexing unit 129. The scrambling is a process for making the content of communication unintelligible, for which there are various techniques. Any process may be used as the scrambling, such as a process of multiplying the reference signal and a scrambling code, for example.

The third control signal generating unit 122 generates a third control signal, which is a control signal for multiplexing, and output the third control signal to the multiplexing unit 129. The third control signal is a control signal indicating a method of multiplexing at the multiplexing unit 129, which is a signal indicating how to arrange to multiplex data generated by the data generating unit 127, the scrambled reference signal, and control information received from the parameter information generating unit 123 in the time domain and the frequency domain. The control information is information used in a process for restoring transmitted data at each of the terminals 2, and includes parameter information, which will be described later, in the present embodiment.

The data generating unit 127 generates data to be transmitted, and outputs the data to the multiplexing unit 129. The multiplexing unit 129 multiplexes the data generated by the data generating unit 127, the scrambled reference signal, and the control information received from the parameter information generating unit 123 by arranging the data, the reference signal, and the control information in the time domain and the frequency domain on the basis of the third control signal. The multiplexing unit 129 outputs the multiplexed signal, which is a signal resulting from the multiplexing, to the precoding unit 13.

The parameter information generating unit 123 selects a pattern to be used for the reference signal on the basis of the feedback information received from the feedback information processing unit 121 similarly to the first control signal generating unit 125. The parameter information generating unit 123 determines the kind of scrambling on the basis of the feedback information similarly to the second control signal generating unit 124. The parameter information generating unit 123 determines a multiplexing method on the basis of the feedback information similarly to the third control signal generating unit 122. The parameter information generating unit 123 generates parameter information including a layer number, information indicating the pattern to be used for the selected reference signal, information indicating the determined kind of scrambling, and information indicating the determined multiplexing method. While the parameter information generating unit 123 selects the information indicating the pattern to be used for the reference signal and determines the kind of scrambling and the multiplexing method on the basis of the feedback information herein, the parameter information generating unit 123 may alternatively acquire such information from the first control signal generating unit 125, the second control signal generating unit 124, and the third control signal generating unit 122.

The parameter information generating unit 123 outputs control information including the generated parameter information to the multiplexing unit 129. Note that the control information may or may not include information other than the parameter information generated by the control unit 10 and the like. In a case where information other than the parameter information is included in the control information, the parameter information generating unit 123 adds the parameter information to the control information received from the control unit and the like, and outputs the control information resulting from the addition to the multiplexing unit 129.

The multiplexed signals output from the multiplexing units 129 of the processing units 12 are precoded by the precoding unit 13 and transmitted via the transmitting unit 14. The terminals 2, which are reception devices that receive signals transmitted from the base station 1, can identify the multiplexing method, the reference signal, and the scrambling code used at the base station 1 on the basis of the parameter information included in the received signals, and perform estimation of channels and decoding of data of the corresponding layer(s) on the basis of the identified information. Any techniques may be used for the channel estimation technique and the decoding technique at the terminals 2.

While the base station 1 scrambles reference signals before transmitting the reference signals in the present embodiment, the base station 1 may transmit the reference signals without performing the scrambling.

Typically, when a transmission device transmits a plurality of layers to a plurality of reception devices, the transmission device informs each of the reception devices of the layer number(s) of the layer(s) used for transmission to each of the reception devices. In the present embodiment as well, the base station 1 informs each of the terminals 2 of the layer number(s) of the layer(s) used for transmission to each of the terminals 2. Each of the terminals 2 performs demodulation by using parameter information corresponding to the layer number(s) given to the terminal. In a case where the base station 1 transmits the layer numbers associated with all the terminals 2, to which transmission using layer multiplexing is performed, to all the terminals 2, to which transmission using layer multiplexing, each of the terminals 2 can also know the layer numbers of the other terminals 2. In this case, each of the terminals 2 is capable of measuring interference caused by signals to other terminals 2 by measuring the strengths or the like of signals transmitted to other terminals 2. The layer numbers and the reference signals are associated one-to-one with each other.

While the parameter information is multiplexed by the multiplexing unit 129 and transmitted to the corresponding terminal 2 in the example described above, the method by which the base station 1 transmits the parameter information to the terminals 2 is not limited to this example. The base station 1 may transmit the parameter information to the terminals 2 by using control information at a higher layer or a lower layer. Examples of the control information at a higher layer in the 3GPP include Layer 3 information and an RRC message, which is a message using the Radio Resource Control (RRC) protocol. The base station 1 may include the parameter information in Layer 3 information or in an RRC message for transmission to the terminals 2. Examples of the control information at a lower layer in the 3GPP include the physical downlink control channel (PDCCH), which is a physical channel. The base station 1 may transmit the parameter information to the terminals 2 through the PDCCH. Typically, the PDCCH is called Layer 1 information. Alternatively, the parameter information may be transmitted as Media Access Control (MAC) layer information from the base station 1 to the terminals 2. For example, the parameter information may be transmitted as a MAC control element (CE), which is information processed in a layer 2 (Layer 2) in the 3GPP, from the base station 1 to the terminals 2. Thus, the method for transmitting control information is not limited as long as the base station 1 can transmit control information including the positions of reference signals in the frequency domain and the time domain and information indicating sequences used as reference signals to each of the terminals.

Figure 3:
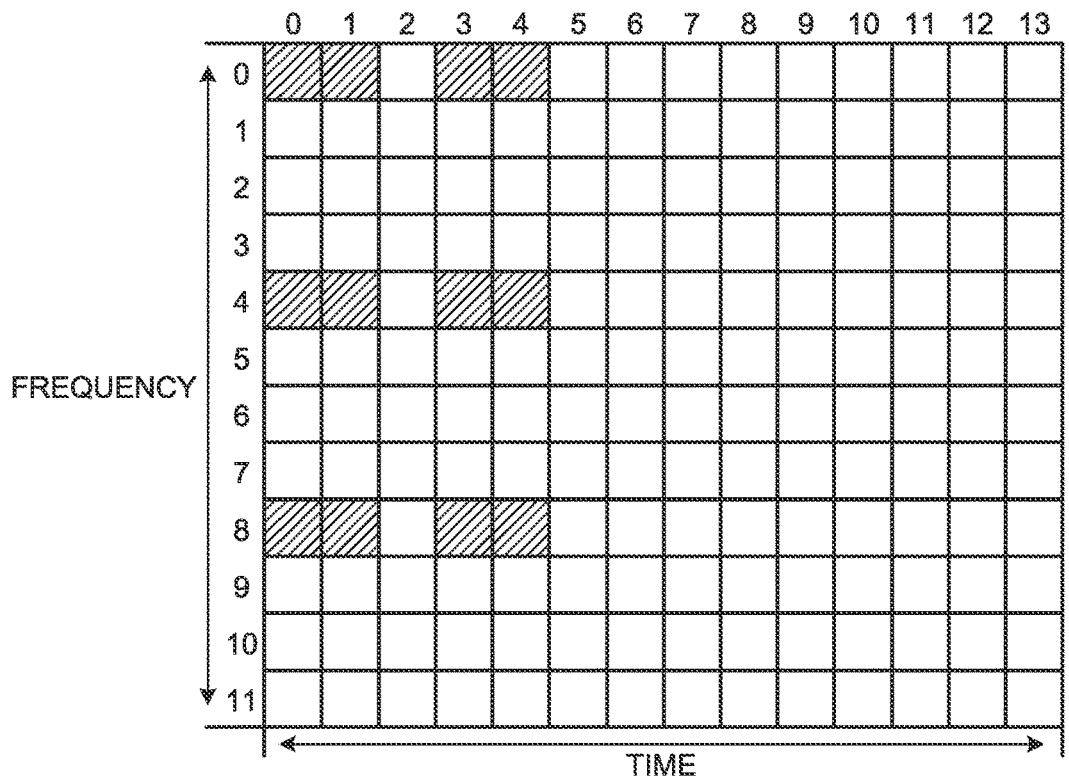
FIG. 3 is a diagram illustrating example arrangement of reference signals in the first embodiment.

Next, the reference signals in the layers and the multiplexing method at the multiplexing unit 129 in the present embodiment will be described. The multiplexing unit 129 arranges the data, the scrambled reference signal, and the control information in the time domain and the frequency domain as described above. FIG. 3 is a diagram illustrating example arrangement of reference signals in the frequency domain and the time domain in the present embodiment. In FIG. 3, the vertical axis represents frequency and the horizontal axis represents time. More specifically, in FIG. 3, 12 carriers from zeroth to eleventh carriers in units of carriers, which are units of frequency allocation, are illustrated on the vertical axis, and 14 symbols from zeroth to thirteenth symbols in units of symbol time are illustrated on the horizontal axis. The symbol time is time required to transmit one symbol, which is the unit of transmission data. Each square in FIG. 3 represents one subcarrier and one symbol. A subcarrier is also called a resource element (RE) in the 3GPP. In the 3GPP, a group constituted by 12 carriers and seven symbols is called one resource block (RB). In the description below, similarly to definitions in the 3GPP LTE (Long Term Evolution), one carrier is defined as an RE, and a group constituted by 12 carriers and seven symbols is defined as an RB. Note that the definition of an RB is, but need not be limited to, a definition using the example of LTE.

In the present embodiment, an example in which the multiplexing unit 129 arranges the data, the scrambled reference signal, and the control information in the frequency domain and the time domain, in units of RBs or in units of resources each being constituted by 12 carriers and 14 symbols will be described. The unit for allocation of resources being constituted by 12 carriers and 14 symbols, that is, resources in the frequency domain and the time domain, is also called a schedule unit. Specifically, a schedule unit is constituted by a matrix of 12 subcarriers from zeroth to eleventh subcarriers and 14 symbols from zeroth to thirteenth symbols. While the resources in schedule unit are resources each constituted by 12 carriers and 14 symbols herein, the number of carriers and the number of symbols constituting a resource in schedule unit are not limited to this example. For example, a resource constituted by 12 subcarriers and seven symbols may be a schedule unit. Alternatively, a resource including less than seven symbols may be a schedule unit. The multiplexing method at the multiplexing unit 129 is determined by the third control signal generating unit 122 as described above. Note that the units in which the multiplexing unit 129 arranges the data, the scrambled reference signal, and the control information are not limited to these examples. In addition, a reference signal may be scrambled and then multiplied by an orthogonal code, or may be multiplied by an orthogonal code and then scrambled.

In FIG. 3, the positions where the reference signals are arranged in the frequency domain and the time domain are illustrated by hatched squares. In white squares, the control information or the data are arranged. The reference signals in one layer may be identical to each other, but need not be identical to each other. For example, reference signals in FIG. 3, whose positions in a form of (frequency (subcarrier number), time (symbol number)) are (0,0) and (4,0), may be different from each other. For the reference signals, sequences such as Zadoff-Chu (ZC) sequences or pseudo-noise (PN) sequences can be used. Different values are obtained from different parameters given to these sequences. A parameter may be a pseudo-noise sequence or a coefficient in a formula for obtaining a pseudo-noise sequence or the like, for example. Alternatively, different reference signals may be generated by shifting each bit value in an identical pattern. In this case, a parameter is a shift amount. In a case where all the reference signals in one layer are identical, the first control signal generating unit 125 generates a first control signal representing one reference signal. In a case where the reference signals in one layer are not identical, the first control signal generating unit 125 may generate a first control signal indicating identification information representing a plurality of reference signals, or the first control signal generating unit 125 may generate a first control signal indicating identification information representing one reference signal and the reference signal generating unit 126 may generate a plurality of reference signals by a method of changing a parameter according to a predetermined rule.

The multiplexed signals output from the multiplexing units 129 of the processing units 12 are output to the precoding unit 13, and subjected to layer multiplexing by addition, phase rotation, weighting and space-division multiplexing by the precoding unit 13. The positions of the reference signals arranged by the multiplexing units 129 of the respective processing units 12, which are associated with the respective layers, in the frequency domain and the time domain may be the same positions. In this case, the third control signal generating units 122 of the processing units 12 each generate a third control signal so that the positions of the reference signals of the layers become the same positions. In the case where the positions of the reference signals of the layers in the frequency domain and the time domain are the same positions, interference may occur when the reference signals are received by the terminals 2 and separation of the reference signals may be difficult. Thus, in the case where the positions of the reference signals of the layers in the frequency domain and the time domain are the same positions, the reference signals may be multiplied by orthogonal codes for the layers that are orthogonal to one another so that the reference signals can be separated from each other at the terminals 2.

For example, an example in which two layers are multiplexed will be described with reference to the arrangement illustrated in FIG. 3. Assume that reference signals identical to each other are used in the first and second layers. In the processing unit 12-1 associated with the first layer, the multiplexing unit 129 multiplies the reference signal at (0,0) by +1, the reference signal at (0,1) by −1, the reference signal at (0,3) by +1, and the reference signal at (0,4) by −1 in FIG. 3. In addition, the multiplexing unit 129 of the processing unit 12-1 associated with the first layer multiplies the reference signal at (4,0) by +1, the reference signal at (4,1) by −1, the reference signal at (4,3) by +1, and the reference signal at (4,4) by −1. In addition, the multiplexing unit 129 of the processing unit 12-1 associated with the first layer multiplies the reference signal at (8,0) by +1, the reference signal at (8,1) by −1, the reference signal at (8,3) by +1, and the reference signal at (8,4) by −1 in the first layer.

Meanwhile, in the processing unit 12-2 associated with the second layer, the multiplexing unit 129 multiplies the reference signal at (0,0) by +1, the reference signal at (0,1) by +1, the reference signal at (0,3) by +1, and the reference signal at (0,4) by +1. In addition, the multiplexing unit 129 of the processing unit 12-2 associated with the second layer multiplies the reference signal at (4,0) by +1, the reference signal at (4,1) by +1, the reference signal at (4,3) by +1, and the reference signal at (4,4) by +1. In addition, the multiplexing unit 129 of the processing unit 12-2 associated with the second layer multiplies the reference signal at (8,0) by +1, the reference signal at (8,1) by +1, the reference signal at (8,3) by +1, and the reference signal at (8,4) by +1.

As a result of the process above, the reference signals corresponding to four symbols to be transmitted on the same carrier are multiplied by (+1,−1,+1,−1) in the first layer and by (+1,+1,+1,+1) in the second layer. Because (+1,−1,+1,−1) and (+1,+1,+1,+1) are orthogonal codes that are orthogonal to each other, the reference signals in the first layer and the reference signals in the second layer are orthogonal to each other. In this manner, the base station 1 multiplies the reference signals of the layers, which are at the same positions in the frequency domain and the time domain, by different orthogonal codes in different layers. Thus, a terminal 2 that has received signals, which are obtained by layer multiplexing of signals including the reference signals multiplied by the orthogonal codes as described above, can separate the reference signals for each layer if the terminal 2 has the information on the orthogonal codes used in the multiplication. In this example, the orthogonal codes have a length of four bits. While the multiplexing unit 129 multiplies the reference signals by the orthogonal codes herein, the reference signal generating unit 126 may alternatively multiply the reference signals by the orthogonal codes.

Note that the aforementioned orthogonal codes are called orthogonal cover codes (OCCs) in the 3GPP, and the values of which can be varied by a parameter.

In addition, the third control signal generating unit 122 may change the positions of the reference signals, or the intervals between the reference signals, that is, the distances between the reference signals in the time domain or the frequency domain. A case where the base station 1 performs transmission of one layer will be described as one example. For example, the reference signals arranged in the example arrangement of FIG. 3 are grouped into two groups. The reference signals arranged at (0,0), (4,0), (8,0), (0,1), (4,1), and (8,1) are defined as reference signals of a first reference signal group. In addition, the reference signals arranged at (0,3), (4,3), (8,3), (0,4), (4,4), and (8,4) are defined as reference signals of a second reference signal group. Thus, assume that the reference signals of two reference signal groups are used for transmission of one layer. In addition, the distance between the groups in the time domain is variable.

Figure 4:
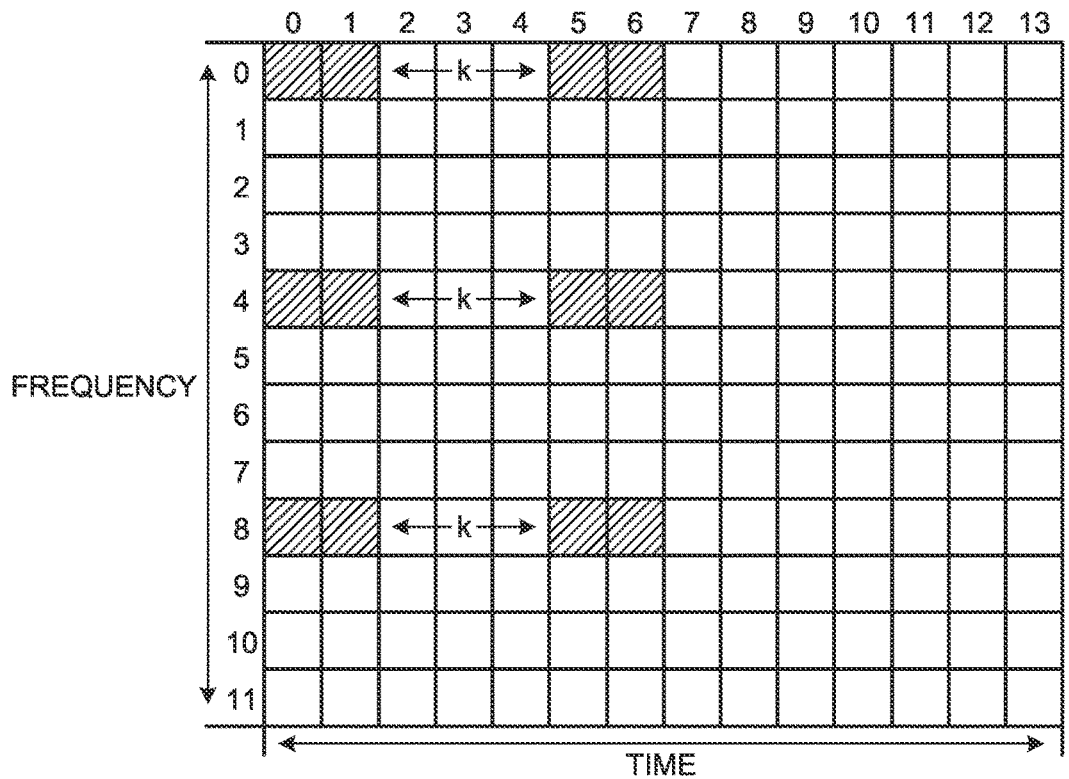
FIG. 4 is a diagram illustrating a change in a distance between reference signal groups in a time domain in the first embodiment.

FIG. 4 is a diagram illustrating a change in the distance between the reference signal groups in the time domain in the present embodiment. As illustrated in FIG. 4, the distance between the first reference signal group and the second reference signal group in the time direction is set by a parameter k. In the example illustrated in FIG. 4, the parameter k is a value indicating by how much symbol time the symbol number at the left end of the positions of the reference signals constituting the first reference signal group and the symbol number at the right end of the positions of the reference signals constituting the second reference signal group are separated from each other. In the state illustrated in FIG. 4, k=3. The third control signal generating unit 122 determines the parameter k on the basis of the feedback information, and includes the parameter k in the third control signal. As the value of the parameter k is larger, the distance between the reference signal groups is larger, and interference between the reference signals is thus less likely to occur. The parameter k is therefore set to a larger value as the quality of communication is lower on the basis of the feedback information, for example. In addition, the parameter k may be settable to any value or may be selected from a plurality of candidates provided in advance. In a case where the parameter k is selected from a plurality of candidates provided in advance, the third control signal generating unit 122 includes a candidate number representing the number of a candidate in the third control signal.

While the positions of the reference signals in the time domain are variable in the example illustrated in FIG. 4, the positions in the frequency domain may be similarly variable. For example, the reference signals arranged in the example arrangement of FIG. 3 are grouped into three groups. The reference signals arranged at (0,0), (0,1), (0,3), and (0,4) are defined as reference signals in a first reference signal group. The reference signals arranged at (4,0), (4,1), (4,3), and (4,4) are defined as reference signals of a second reference signal group. The reference signals arranged at (8,0), (8,1), (8,3), and (8,4) are defined as reference signals in a third reference signal group.

Figure 5:
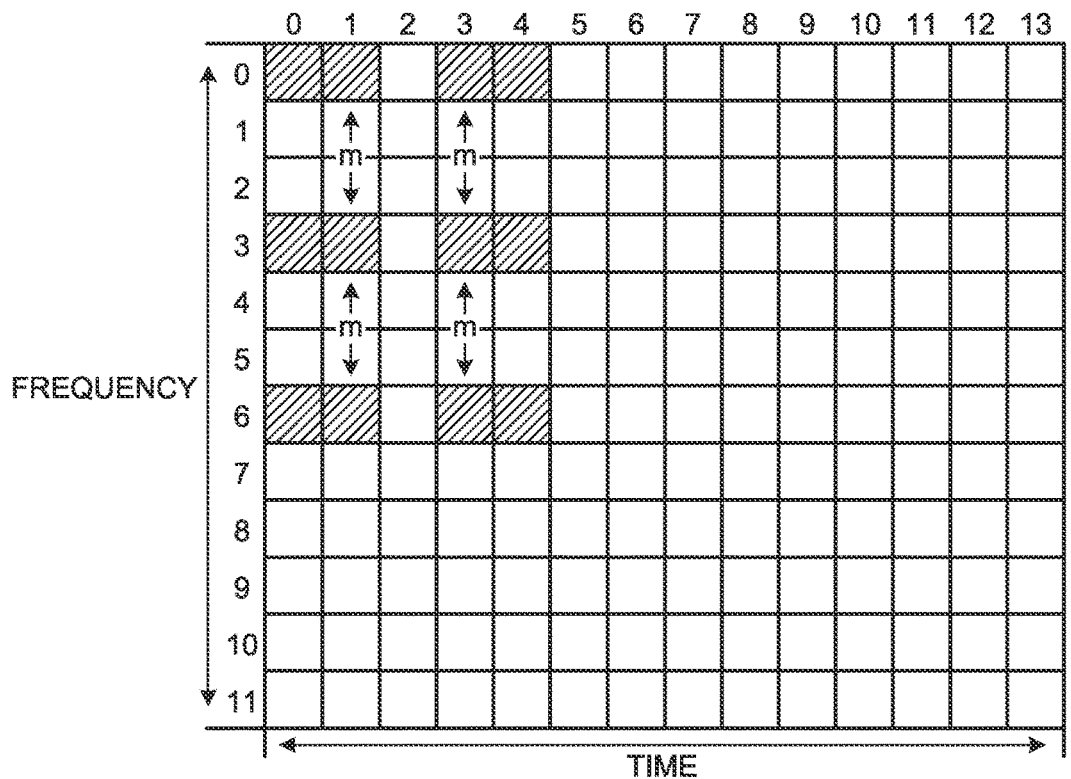
FIG. 5 is a diagram illustrating a change in a distance between reference signal groups in a frequency domain in the first embodiment.

FIG. 5 is a diagram illustrating a change in the distance between the reference signal groups in the frequency domain in the present embodiment. As illustrated in FIG. 5, m representing a distance between the reference signal groups in the frequency direction is variable. In the example illustrated in FIG. 5, the parameter m represents an interval between the reference signal groups in units of carrier. The third control signal generating unit 122 determines the parameter m on the basis of the feedback information, and includes the parameter m in the third control signal. As the value of the parameter m is larger, the distance between the reference signal groups is larger, and interference between the reference signals is thus less likely to occur. In addition, estimation of a significantly frequency-selective channel with high accuracy is easier. The parameter m is therefore set to a larger value as the quality of communication is lower on the basis of the feedback information, for example. In addition, the parameter m may be settable to any value or may be selected from a plurality of candidates provided in advance. In a case where the parameter k is selected from a plurality of candidates provided in advance, the third control signal generating unit 122 includes a candidate number representing the number of a candidate in the third control signal.

In the examples explained with reference to FIGS. 4 and 5, one or more reference signal groups, which are groups of reference signals whose positions are determined in advance within resources in a schedule unit, are provided, positions of one reference signal groups are defined as reference positions within the resource of the schedule unit, and a parameter m or a parameter k is specified, so that the positions of the other reference signal groups can be indicated. The parameter m is an offset value from the reference positions in the time domain, and the parameter k is an offset value from the reference positions in the frequency domain. Thus, within the resource in the schedule unit, the positions of one reference signal group are defined as reference positions, and the positions of the other reference signal groups are defined by offset values in at least one of the frequency domain and the time domain. The base station 1 may include the offset value for each reference signal group in the parameter information.

Alternatively, the third control signal generating unit 122 may determine the positions of the reference signals in such a manner that the density of the reference signals is variable. Specifically, the base station 1 may change the density of the reference signals within the resource in the schedule unit on the basis of the moving speeds of terminals or the states of channels. For example, the number of reference signal groups to be arranged in 12 carriers and 14 symbol times that constitute the schedule unit illustrated in FIG. 3 may be changed depending on the speed of a channel, that is, the speed of the base station 1 and the terminal 2 relative to each other. When a channel fluctuates rapidly in the time domain, it is desirable that the reference signals are densely arranged in the time domain because the state of the channel fluctuates. In contrast, when temporal fluctuation of a channel is small, the reference signals need not be densely arranged. Whether or not a channel fluctuates temporarily rapidly can be determined on the basis of whether or not the relative speed of the terminal 2 and the base station 1 is equal to or higher than a predetermined value, for example. The relative speed of the terminal 2 and the base station 1 can be obtained by calculating temporal changes of the geological position of the base station 1 known by the base station 1 and the position of the terminal 2 included in the feedback information from the terminal 2. Alternatively, a Doppler frequency may be calculated with use of the aforementioned relative speed and a value of used carrier frequency, and whether or not a channel fluctuates temporarily rapidly may be determined on the basis of whether or not a normalized Doppler frequency obtained by normalization by a transmission rate is equal to or higher than a predetermined value. Alternatively, whether or not a channel fluctuates rapidly may be determined on the basis of whether or not a change in communication quality of signals with the same frequency is equal to or higher than a predetermined value. The communication quality may be the strength of a signal transmitted from the base station 1 when the signal is received by the terminal 2, or the like. The density of the reference signals is changed on the basis of whether or not a channel fluctuates rapidly, which improves transmission efficiency by lowering the density of the reference signals when unnecessary while maintaining the accuracy of demodulation.

Figure 6:
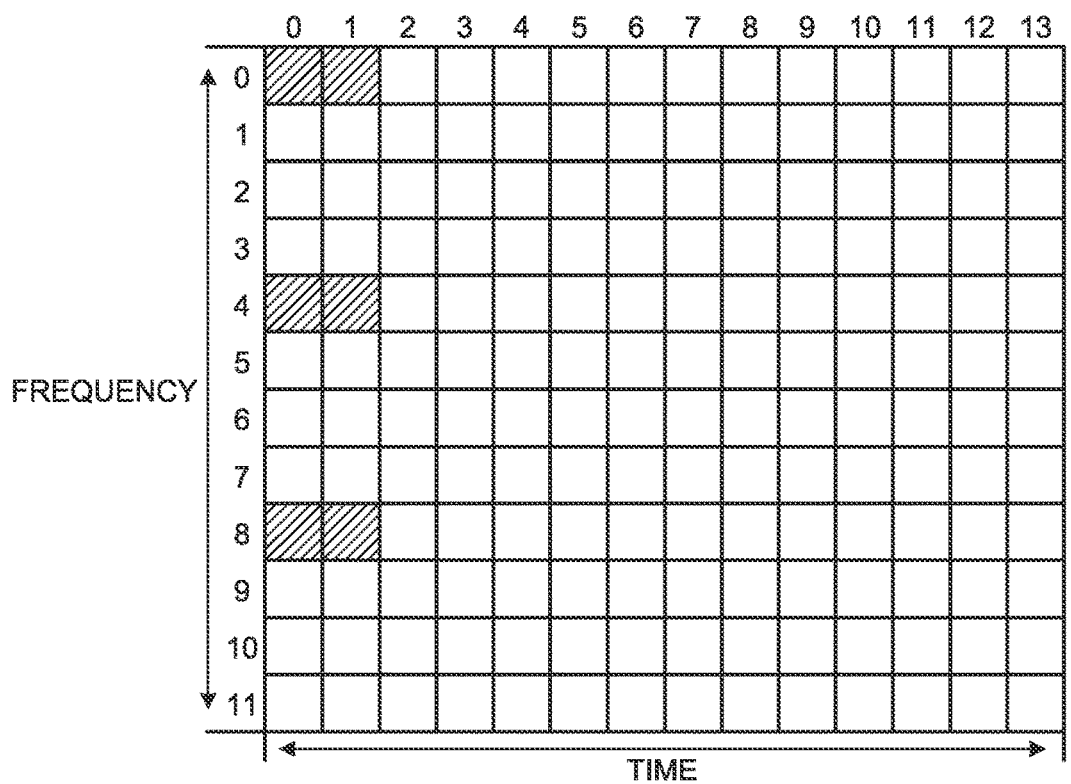
FIG. 6 is a diagram illustrating an example in which reference signals of one group are arranged in the first embodiment.
Figure 7:
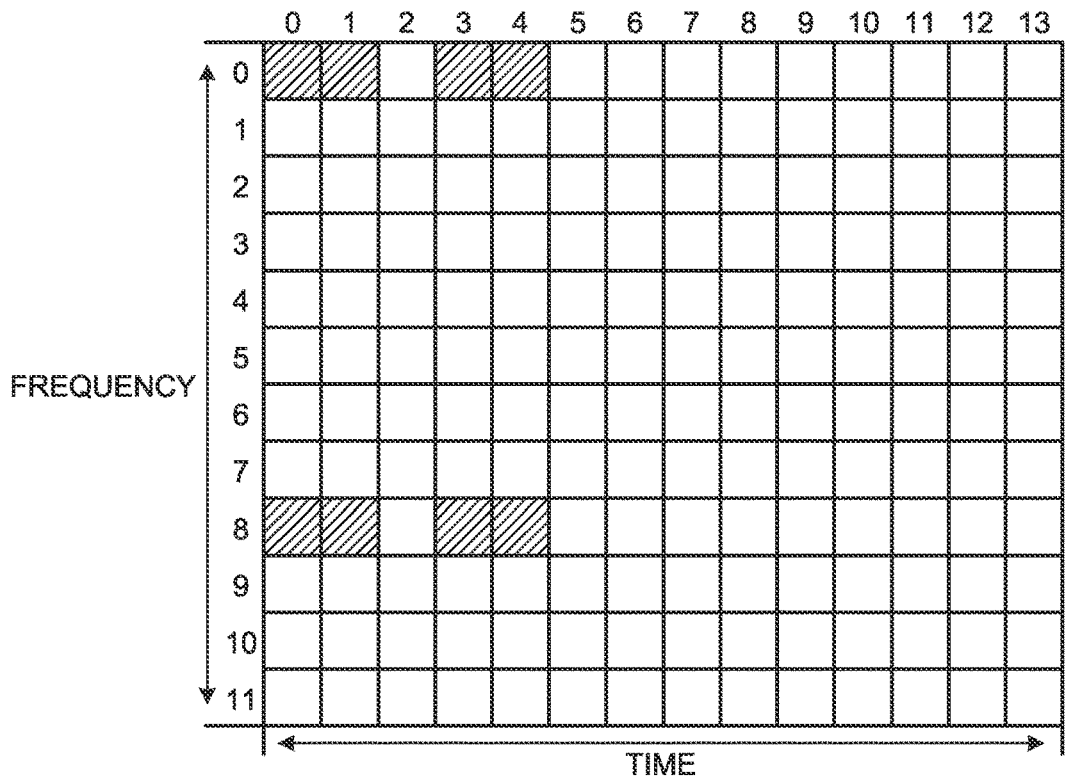
FIG. 7 is a diagram illustrating an example in which reference signals of two groups are arranged in the first embodiment.

For example, the third control signal generating unit 122 determines the positions of the reference signals in such a manner that the density of the reference signals in the time domain is variable. For example, the reference signals illustrated in FIG. 3 are grouped into two reference signal groups. The reference signals arranged at (0,0), (4,0), (8,0), (0,1), (4,1), and (8,1) are defined as reference signals of a first reference signal group. In addition, the reference signals arranged at (0,3), (4,3), (8,3), (0,4), (4,4), and (8,4) are defined as reference signals of a second reference signal group. When the relative speed of the base station 1 and the terminal 2 is equal to or higher than the predetermined value, the third control signal generating unit 122 arranges reference signals of two groups, and when the relative speed of the base station 1 and the terminal 2 is lower than the predetermined value, the third control signal generating unit 122 arranges reference signals of one group. FIG. 6 illustrates an example in which reference signals of one group are arranged, and FIG. 7 illustrates an example in which reference signals of two groups are arranged. In the example illustrated in FIG. 7, the positions in the time domain are different to each other for the first reference signal group and the second reference signal group. Specifically, in the example illustrated in FIG. 7, the positions of different reference signal groups within the resource in the schedule unit are different in the time domain. The base station 1 then changes the number of reference signal groups to be arranged depending on the relative speed of the base station 1 and the terminal 2, for example. In the case where the number of reference signal groups to be arranged is changed depending on the relative speed of the base station 1 and the terminal 2 in this manner, the number of reference signal groups generated by the reference signal generating unit 126 may also be changed, or the reference signal generating unit 126 may generate a maximum number of groups of reference signals and assign an identification number to each of the groups. In the latter case, the third control signal generating unit 122 includes information indicating the identification numbers of the reference signal groups to be used in the third control signal.

Specifically, the third control signal generating unit 122 includes a flag indicating whether or not to be transmitted for each of the identification numbers representing the reference signal groups in the third control signal. When the flag of the identification number representing a first reference signal group is "1", for example, the multiplexing unit 129 arranges the reference signals in the first reference signal group in the time domain and the frequency domain as illustrated in FIG. 6 or the like. In contrast, when the flag of the identification number representing a first reference signal group is "0", the multiplexing unit 129 does not arrange the reference signals in the first reference signal group in the time domain and the frequency domain. Similarly, the multiplexing unit 129 determines whether or not to arrange reference signals in each reference signal group in the time domain and the frequency domain on the basis of the flag of the reference signal group. When the time domain and the frequency domain of each reference signal group are determined in advance, and the third control signal generating unit 122 includes the flag of each reference signal group in the third control signal, the multiplexing unit 129 can arrange the reference signals in the time domain and the frequency domain. In addition, the parameter information generating unit 123 includes flag information of each reference signal group in the parameter information. This enables the terminals 2 to know which group of reference signals are transmitted. Alternatively, the third control signal generating unit 122 may instruct the reference signal generating unit 126 the identification numbers of the reference signal groups to be generated, instead of the methods described above.

Similarly, the density of the reference signals in the frequency domain may be variable. When a channel significantly fluctuates owing to multipath propagation or the like in the frequency domain, it is desirable that the reference signals are densely arranged in the frequency domain. In contrast, when a channel does not fluctuate within a certain frequency band, the reference signals are not densely arranged in the frequency domain so that the frequency use efficiency can be increased. Whether or not a channel fluctuates significantly in the frequency domain can be obtained from channel information (channel state information: CSI) provided in the feedback information from a terminal 2. The channel information is a result of estimation of a channel for each frequency at a terminal 2.

For example, the reference signals in the example arrangement illustrated in FIG. 3 are grouped into three groups. The reference signals arranged at (0,0), (0,1), (0,3), and (0,4) are defined as reference signals in a first reference signal group. The reference signals arranged at (4,0), (4,1), (4,3), and (4,4) are defined as reference signals of a second reference signal group. The reference signals arranged at (8,0), (8,1), (8,3), and (8,4) are defined as reference signals in a third reference signal group. In this case, the positions of different reference signal groups within the resource in the schedule unit are different in the frequency domain as described above. Similarly to the examples explained with reference to FIGS. 6 and 7, the third control signal generating unit 122 then determines whether or not to transmit the reference signals in each of the reference signal groups, that is, whether or not to arrange the reference signals in each of the reference signal groups in the time domain and the frequency domain. As a result of determining whether or not to arrange the reference signals in units of reference signal group, whose positions are determined in advance, as described above, the base station 1 can change the density of the reference signals.

In this case as well, within the resource in the schedule unit, the positions of one reference signal group may be defined as reference positions, and the positions of the other reference signal groups may be defined by offset values in at least one of the frequency domain and the time domain. In addition, the base station 1 may include an offset value for each reference signal group and a flag indicating presence or absence of arrangement of the reference signals for each reference signal group in the parameter information.

Furthermore, a plurality of reference signal groups may be combined to obtain an aggregation, and whether or not to arrange reference signals may be determined in units of the aggregation. For example, assume that the reference signals illustrated in FIG. 3 are reference signals constituting two groups. The reference signals arranged at (0,0), (4,0), (8,0), (0,1), (4,1), and (8,1) are defined as reference signals of a first reference signal group. The reference signals arranged at (0,3), (4,3), (8,3), (0,4), (4,4), and (8,4) are defined as reference signals in a second reference signal group. The first reference signal group and the second reference signal group are defined as a first reference signal set. In addition, the third control signal generating unit 122 arranges reference signals at the same positions as those of the reference signals in the first reference signal set, to positions shifted at least in one of the time domain and the frequency domain. This enables the third control signal generating unit 122 to control arrangement of reference signals in units of the reference signal set, within 12 carriers and 14 symbols that constitute the schedule unit.

Figure 8:
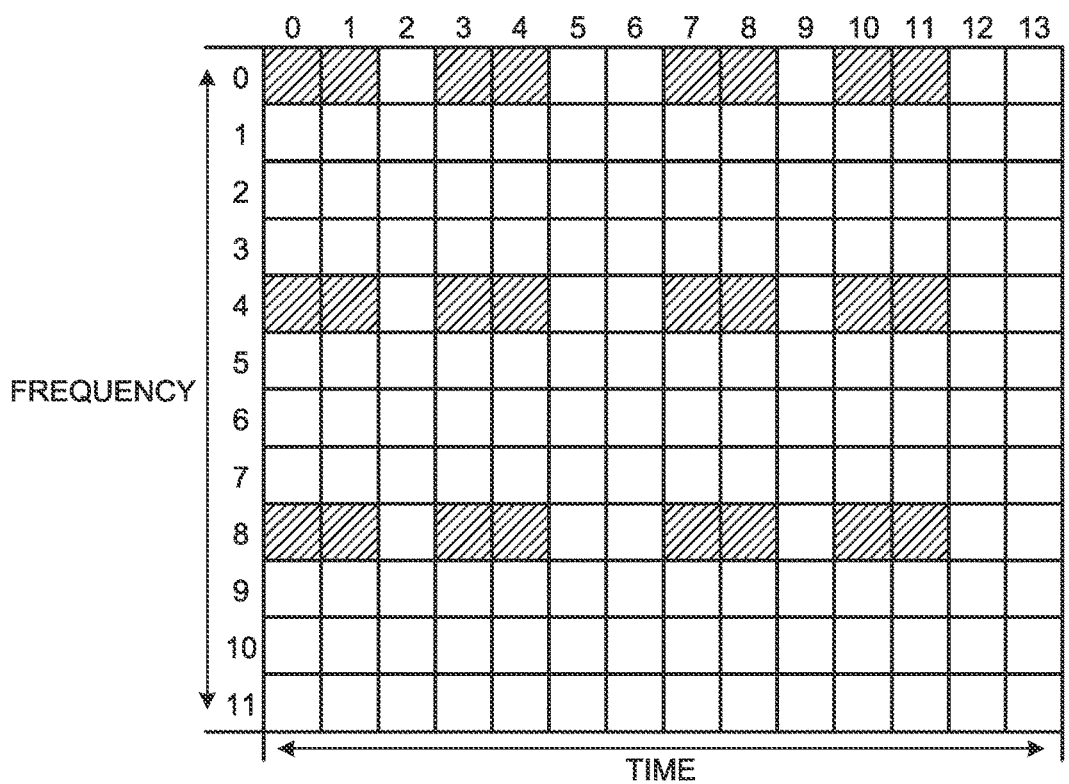
FIG. 8 is a diagram illustrating an example in which two reference signal sets are arranged within 12 subcarriers and 14 symbols in the first embodiment.

FIG. 8 is a diagram illustrating an example in which two reference signal sets are arranged within 12 subcarriers and 14 symbols. In the example illustrated in FIG. 8, a second reference signal set, which is additionally arranged in addition to the first reference signal set illustrated in FIG. 3, is arranged at (0,7), (4,7), (8,7), (0,8), (4,8), (8,8), (0,10), (4,10), (8,10), (0,11), (4,11), and (8,11). Specifically, a parameter that specifies the amount by which the positions are shifted in at least one of the frequency domain and the time domain from the arrangement of the first reference signal set, which is a basic arrangement pattern, is defined, and the third control signal generating unit 122 specifies the arrangement of the reference signal set on the basis of the parameter. In the example illustrated in FIG. 8, the second reference signal set is arranged at positions shifted from the positions of the first reference signal set by seven symbol times in the time domain. Note that the content of the reference signal set whose arrangement is shifted from the arrangement of the basic arrangement pattern may be different from the content of the reference signal set of the basic arrangement pattern. For example, in FIG. 8, the reference signals arranged at (0,0), (0,3), (0,7), and (0,10) may be different from one another. While an example of arrangement shifted from the basic arrangement pattern in the time domain is explained in FIG. 8, a reference signal set whose arrangement is shifted from the basic arrangement pattern in the frequency domain can similarly be defined. In a case where the arrangement is shifted only in the time domain, a parameter representing the shift is symbol times by which the arrangement is shifted. In a case where the arrangement is shifted only in the frequency domain, a parameter representing the shift is the number of carriers by which the arrangement is shifted. In a case where the arrangement is shifted in the time domain and the frequency domain, parameters representing the shift are the symbol times and the number of carries by which the arrangement is shifted.

Figure 9:
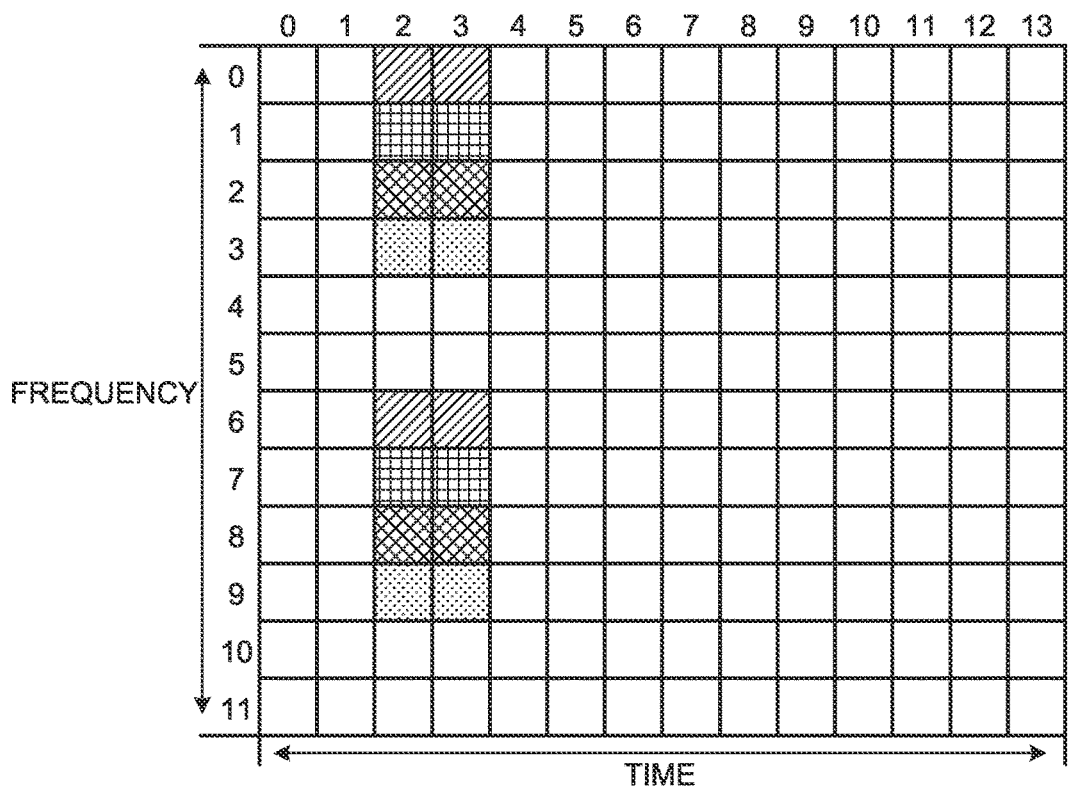
FIG. 9 is a diagram illustrating an example structure of reference signals in which orthogonal codes have a length of four bits and up to 16 layers can be multiplexed in the first embodiment.

In addition, the orthogonal codes in one layer by which the reference signals are multiplied as described above may be changed depending on the number of layers to be multiplexed. FIG. 9 is a diagram illustrating an example structure of reference signals in which orthogonal codes have a length of four bits and up to 16 layers can be multiplexed. In the example illustrated in FIG. 9, a total of 16 REs at (0,2), (0,3), (6,2), (6,3), (1,2), (1,3), (7,2), (7,3), (2,2), (2,3), (8,2), (8,3), (3,2), (3,3), (9,2), and (9,3) are used for transmission of reference signals. In addition, the reference signals arranged at (0,2), (0,3), (6,2), and (6,3) are defined as a first reference signal group, the reference signals arranged at (1,2), (1,3), (7,2), and (7,3) are defined as a second reference signal group, the reference signals arranged at (2,2), (2,3), (8,2), and (8,3) are defined as a third reference signal group, and the reference signals arranged at (3,2), (3,3), (9,2), and (9,3) are defined as a fourth reference signal group.

Reference signals of the first reference signal group are multiplied by orthogonal codes as follows. As reference signals for a first layer, the signal at (0,2) is multiplied by +1, the signal at (0,3) is multiplied by +1, the signal at (6,2) is multiplied by +1, and the signal at (6,3) is multiplied by +1. As reference signals for a second layer, the signal at (0,2) is multiplied by +1, the signal at (0,3) is multiplied by −1, the signal at (6,2) is multiplied by +1, and the signal at (6,3) is multiplied by −1. As reference signals for a third layer, the signal at (0,2) is multiplied by +1, the signal at (0,3) is multiplied by +1, the signal at (6,2) is multiplied by −1, and the signal at (6,3) is multiplied by −1. As reference signals for a fourth layer, the signal at (0,2) is multiplied by +1, the signal at (0,3) is multiplied by −1, the signal at (6,2) is multiplied by −1, and the signal at (6,3) is multiplied by +1. In this manner, up to four layers can be multiplexed by using the reference signals arranged at (0,2), (0,3), (6,2), and (6,3) in the first reference signal group and the orthogonal codes.

Similarly, orthogonal codes are used for each of the second reference signal group at (1,2), (1,3), (7,2), and (7,3), the third reference signal group at (2,2), (2,3), (8,2), and (8,3), and the fourth reference signal group at (3,2), (3,3), (9,2), and (9,3). As a result, up to four layers can be multiplexed in each of the reference signal groups, and reference signals in a total of 16 layers can thus be multiplexed. As described above, the orthogonal codes have a length of four and reference signals are inserted with use of two symbol times, which reduces interference between the reference signals and enables multiplexing of 16 layers. In the example described above, because 16 layers are multiplexed with use of 16 carriers within one schedule unit, the density of reference signals is 16/16/1=1[layer/RE/RB'] where one schedule unit, which is constituted by 12 carriers and 14 symbols, is represented by RB'. The reference signal density represents the number of layers that can be transmitted with use of one RE per one RB'. Note that the relation between layer numbers and orthogonal codes is not limited to the example described above.

Figure 10:
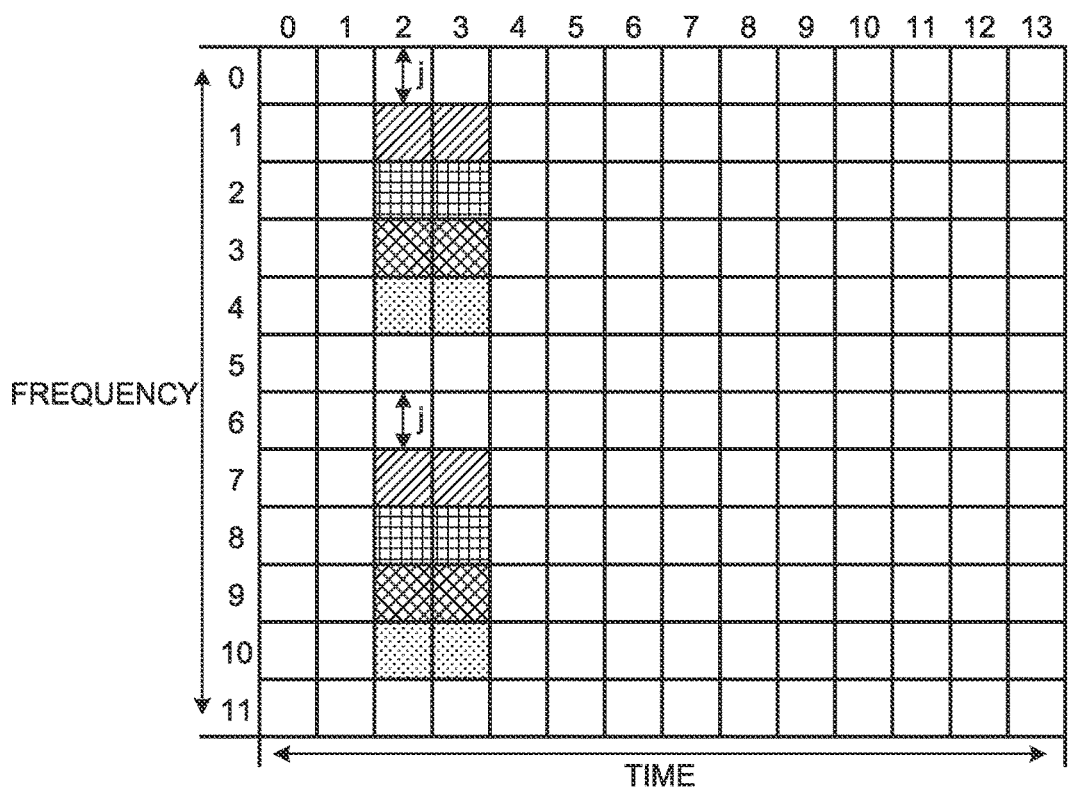
FIG. 10 is a diagram illustrating an example in which an offset in the frequency domain in each reference signal group is given in the first embodiment.

In addition, when layer multiplexing is performed, an offset in the frequency domain may be given to each reference signal group of each layer. FIG. 10 is a diagram illustrating an example in which an offset in the frequency domain in each reference signal group is given. In the example illustrated in FIG. 10, each of the reference signal groups in the example arrangement illustrated in FIG. 9 is offset in the frequency domain by an offset value j. In the example illustrated in FIG. 10, j=1. Specifically, the example illustrated in FIG. 10 is arrangement in which reference signals arranged at the second symbol on the zeroth subcarrier, the third symbol on the zeroth subcarrier, the second symbol on the sixth subcarrier, and the third symbol on the sixth subcarrier are defined as a first reference signal group, reference signals arranged at the second symbol on the first subcarrier, the third symbol on the first subcarrier, the second symbol on the seventh subcarrier, and the third symbol on the seventh subcarrier are defined as a second reference signal group, reference signals arranged at the second symbol on the second subcarrier, the third symbol on the second subcarrier, the second symbol on the eighth subcarrier, and the third symbol on the eighth subcarrier are defined as a third reference signal group, and reference signals arranged at the second symbol on the third subcarrier, the third symbol on the third subcarrier, the second symbol on the ninth subcarrier, and the third symbol on the ninth subcarrier are defined as a fourth reference signal group, the reference signals in each of the first to fourth reference signal groups are multiplied by orthogonal codes of four bits that are different for different layers, and each layer of the first to fourth reference signal groups is offset in the frequency direction. The third control signal generating unit 122 can set j depending on the state of a channel on the basis of the feedback information. For example, the third control signal generating unit 122 can set j so as to avoid a subcarrier where the state of the channel is poor. In addition, in a case where control information or a reference signal may be inserted in a certain subcarrier, j can be changed so that the reference signal can be inserted without using the certain subcarrier.

While the orthogonal codes have a length of four bits in the example described above, the length of orthogonal codes may be two bits so that the number of symbols belonging to a reference signal group is reduced. For example, the reference signals arranged at (1,2) and (1,3) for the first layer are multiplied by +1 and +1, respectively. The reference signals arranged at (1,2) and (1,3) for the second layer are multiplied by +1 and −1, respectively. Similarly, for example, the reference signals arranged at (7,2) and (7,3) for the first layer are multiplied by +1 and +1, respectively. The reference signals arranged at (7,2) and (7,3) for the second layer are multiplied by +1 and −1, respectively. Thus, the reference signals arranged at (1,2) and (1,3), and (7,2) and (7,3) are used for transmission of the first layer. The length of the orthogonal codes used for each of the layers is two bits. Similar processes are performed on the reference signals at (2,2), (2,3), (8,2), and (8,3) for transmission of the second layer, the reference signals at (3,2), (3,3), (9,2), and (9,3) for transmission of the third layer, and the reference signals at (4,2), (4,3), (10,2), and (10,3) for transmission of the fourth layer. This reduces interference between the reference signals and enable transmission of a total of eight layers.

Figure 11:
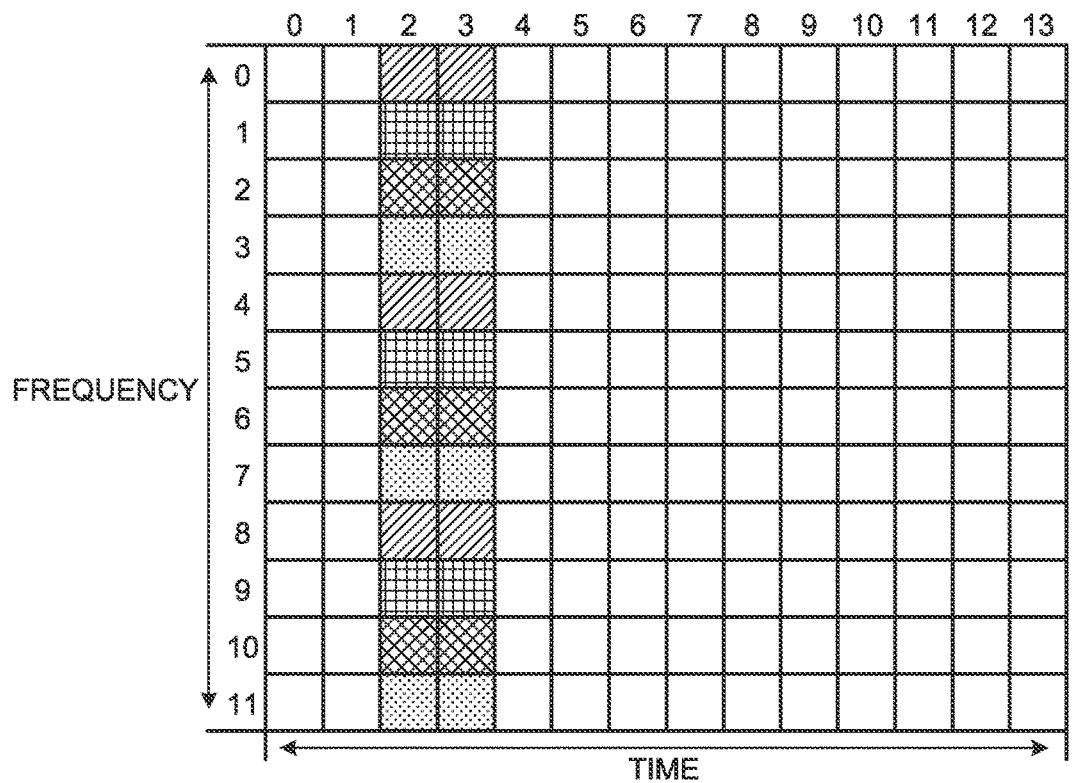
FIG. 11 is a diagram illustrating an example in which signals that are duplicates of reference signals are arranged in the first embodiment.
Figure 12:
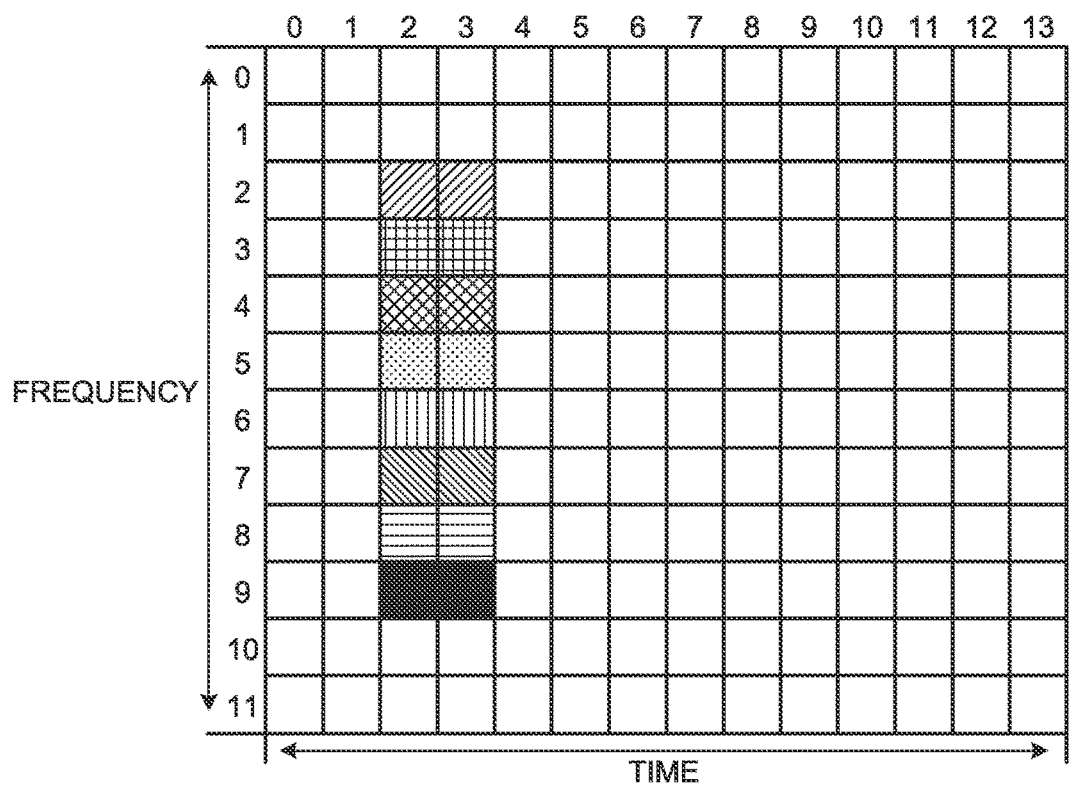
FIG. 12 is a diagram illustrating an example structure of reference signals in which orthogonal codes have a length of two bits and up to 16 layers can be multiplexed in the first embodiment.
Figure 13:
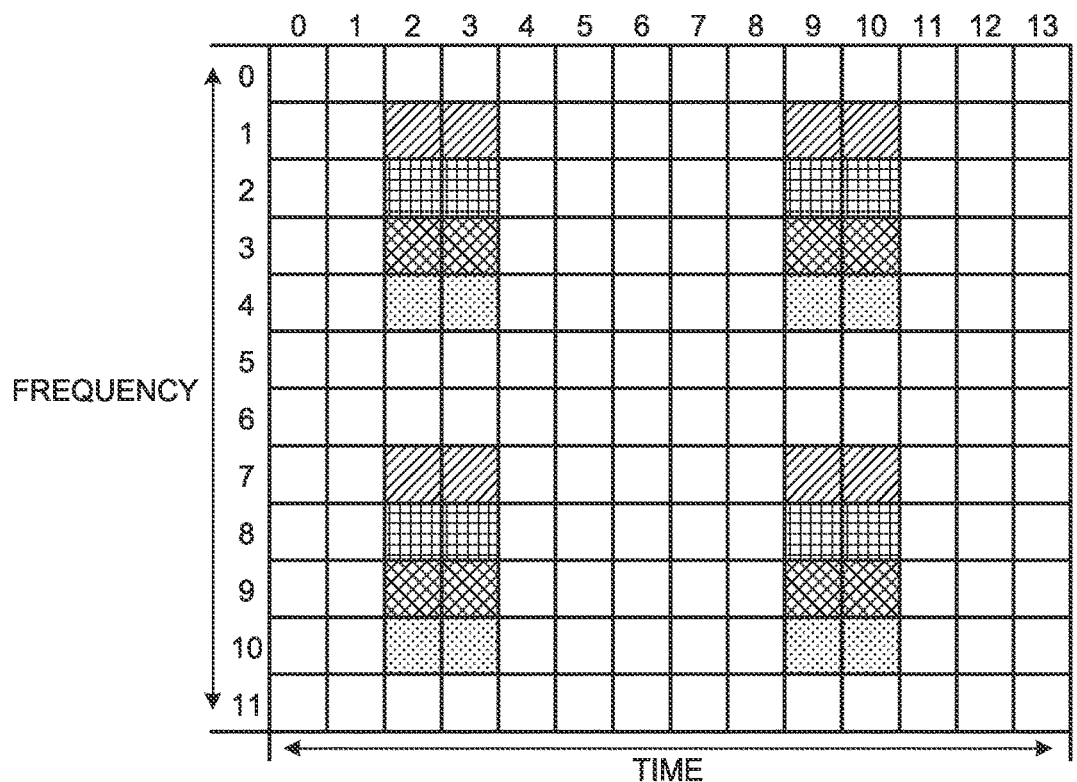
FIG. 13 is a diagram illustrating an example in which signals that are duplicates of the reference signals in the arrangement illustrated in FIG. 10 are arranged.

In addition, the reference signals in the arrangement illustrated in FIG. 10 may be duplicated, and the duplicate reference signals may be arranged at positions different from those of the original reference signals. FIG. 13 is a diagram illustrating an example in which signals that are duplicates of the reference signals in the arrangement illustrated in FIG. 10 are arranged. In the example illustrated in FIG. 13, the reference signal group arranged at (1,2), (1,3), (2,2), (2,3), (3,2), (3,3), (4,2), and (4,3) illustrated in FIG. 10 is a basic pattern, the basic pattern is duplicated, and the duplicate pattern is arranged at a position different from that of the basic pattern. Similarly, in the arrangement of the reference signals illustrated in FIG. 9, some reference signals may be assumed to be a basic pattern and the basic pattern may be duplicated. In this case, in the basic pattern, one reference signal group is multiplied by orthogonal codes, for example. In example arrangement illustrated in FIG. 11, the reference signal group arranged at (0,2), (0,3), (1,2), (1,3), (2,2), (2,3), (3,2), and (3,3) illustrated in FIG. 9 is a basic pattern, the basic pattern is duplicated, and a total of three basic patterns including duplicate patterns and the duplicated pattern are arranged. Example arrangement illustrated in FIG. 12 is arrangement in which the length of orthogonal codes is two bits and communication of a total of 16 layers is enabled. As illustrated in FIG. 12, the reference signals at the positions with the same hatching are in an identical reference signal group, and the signal groups are multiplied by different orthogonal codes of two bits that are different to one another for layers. In the example arrangement illustrated in FIG. 13, a total of four basic patterns including the duplicated pattern are arranged. In this example as well, what are duplicated are the positions, and the contents of the reference signals may be different. For example, the reference signals arranged at (1,2), (1,9), (7,2), and (7,9) illustrated in FIG. 13 may be different from one another. Specifically, in the example illustrated in FIG. 11, reference signals arranged at the second symbol on the zeroth subcarrier and the third symbol on the zeroth subcarrier are defined as a first reference signal group, reference signals arranged at the second symbol on the first subcarrier and the third symbol on the first subcarrier are defined as a second reference signal group, reference signals arranged at the second symbol on the second subcarrier and the third symbol on the second subcarrier are defined as a third reference signal group, and reference signals arranged at the second symbol on the third subcarrier and the third symbol on the third subcarrier are defined as a fourth reference signal group, the first to fourth reference signal groups are defined as a basic pattern, and the basic pattern are duplicated so that a total of three patterns are arranged in the frequency direction. In the example illustrated in FIG. 12, reference signals are arranged at the second and third symbols on the second to ninth subcarriers, and reference signals arranged on the same subcarrier are multiplied by orthogonal codes of two bits that are different for layers.

Note that the orthogonal codes are not limited to the example described above in which the sequences orthogonal to one another only within a pattern are used, but sequences of patterns orthogonal to one another may be used. For example, reference signals arranged at (1,2), (1,3), (1,9), and (1,10) for transmission of a first layer may be multiplied by orthogonal sequences +1, +1, +1, and +1, and reference signals arranged at (1,2), (1,3), (1,9), and (1,10) for transmission of a second layer may be multiplied by +1, −1, +1, and −1.

Figure 14:
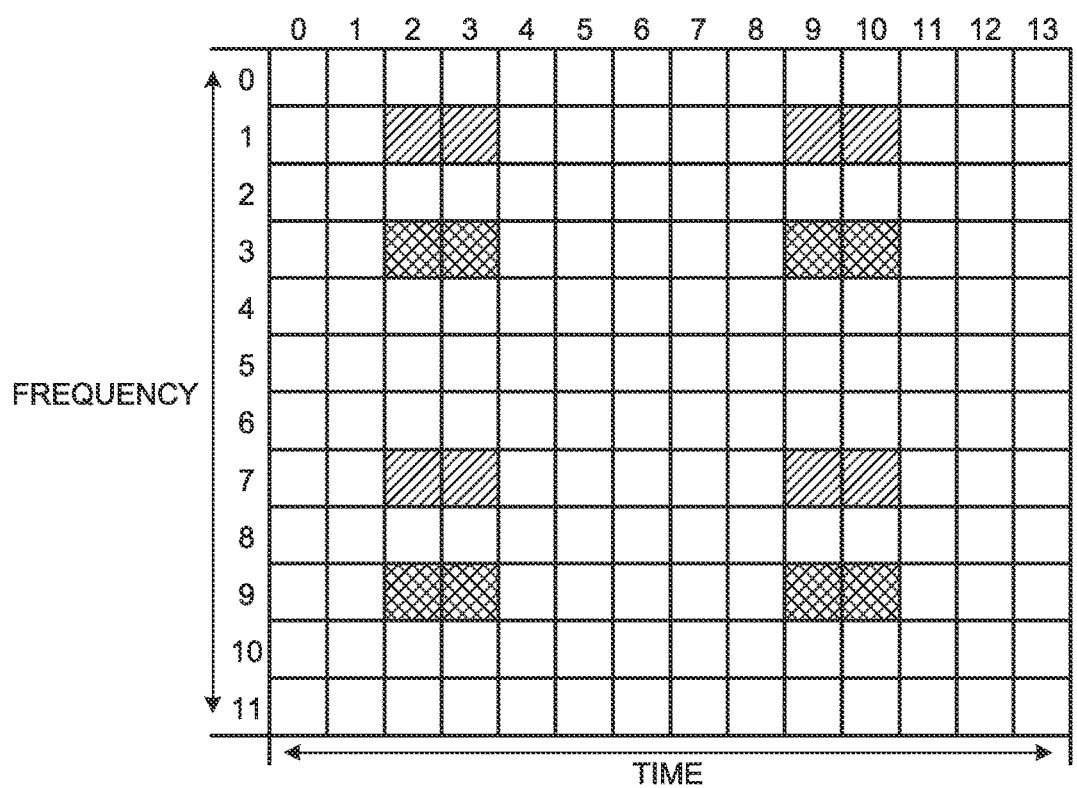
FIG. 14 is a diagram illustrating an example in which reference signal groups are reduced from the example arrangement of the reference signals illustrated in FIG. 13.

Furthermore, some reference signal groups may be removed from the basic pattern. FIG. 14 is a diagram illustrating an example in which reference signal groups are reduced from the example arrangement of the reference signals illustrated in FIG. 13. In the example illustrated in FIG. 14, the reference signal groups arranged at (2,2) and (2,3), and (4,2) and (4,3) are removed from (1,2), (1,3), (2,2), (2,3), (3,2), (3,3), (4,2), and (4,3), which constitute a basic pattern. In addition, the basic pattern resulting from removal of the reference signal groups is duplicated, and a total of four basic patterns resulting from the removal of the reference signal groups, including the duplicated pattern, are arranged.

Furthermore, multiplexing of 16 layers can also be performed with orthogonal codes having a length of two bits instead of four bits. A specific example will be described. As reference signals for a first layer, the signal at (0,2) is multiplied by +1, and the signal at (6,2) is multiplied by +1. As reference signals for a second layer, the signal at (0,2) is multiplied by +1, and a signal at (6,2) is multiplied by −1. As reference signals for a third layer, the signal at (1,2) is multiplied by +1, and the signal at (7,2) is multiplied by +1. As reference signals for a fourth layer, the signal at (1,2) is multiplied by +1, and a signal at (7,2) is multiplied by −1. As reference signals for a fifth layer, the signal at (2,2) is multiplied by +1, and the signal at (8,2) is multiplied by +1. As reference signals for a sixth layer, the signal at (2,2) is multiplied by +1, and the signal at (8,2) is multiplied by −1. As reference signals for a seventh layer, the signal at (3,2) is multiplied by +1, and the signal at (9,2) is multiplied by +1. As reference signals for an eighth layer, the signal at (3,2) is multiplied by +1, and the signal at (9,2) is multiplied by −1. The reference signals at the zeroth symbols are used in this manner, which enables transmission of eight layers.

Similarly, a reference signal is inserted at the first symbol, and as reference signals for a ninth layer, the signal at (0,3) is multiplied by +1, and the signal at (6,3) is multiplied by +1. As reference signals for a tenth layer, the signal at (0,3) is multiplied by +1, and the signal at (6,3) is multiplied by −1. As reference signals for an eleventh layer, the signal at (1,3) is multiplied by +1, and the signal at (7,3) is multiplied by +1. As reference signals for a twelfth layer, the signal at (1,3) is multiplied by +1, and the signal at (7,3) is multiplied by −1. As reference signals for a thirteenth layer, the signal at (2,3) is multiplied by +1, and the signal at (8,3) is multiplied by +1. As reference signals for a fourteenth layer, the signal at (2,3) is multiplied by +1, and the signal at (8,3) is multiplied by −1. As reference signals for a fifteenth layer, the signal at (3,3) is multiplied by +1, and the signal at (9,3) is multiplied by +1. As reference signals for a sixteenth layer, the signal at (3,3) is multiplied by +1, and the signal at (9,3) is multiplied by −1. The process above enables multiplexing of 16 layers with the orthogonal codes having a length of 2 and reference signals arranged at two symbols. In this example, because 16 layers are multiplexed with use of 16 carriers within one schedule unit, the reference signal density is 16/16/1=1[layer/RE/RB']. Note that the relation between layer numbers and orthogonal codes is not limited to the example described above.

Figure 15:
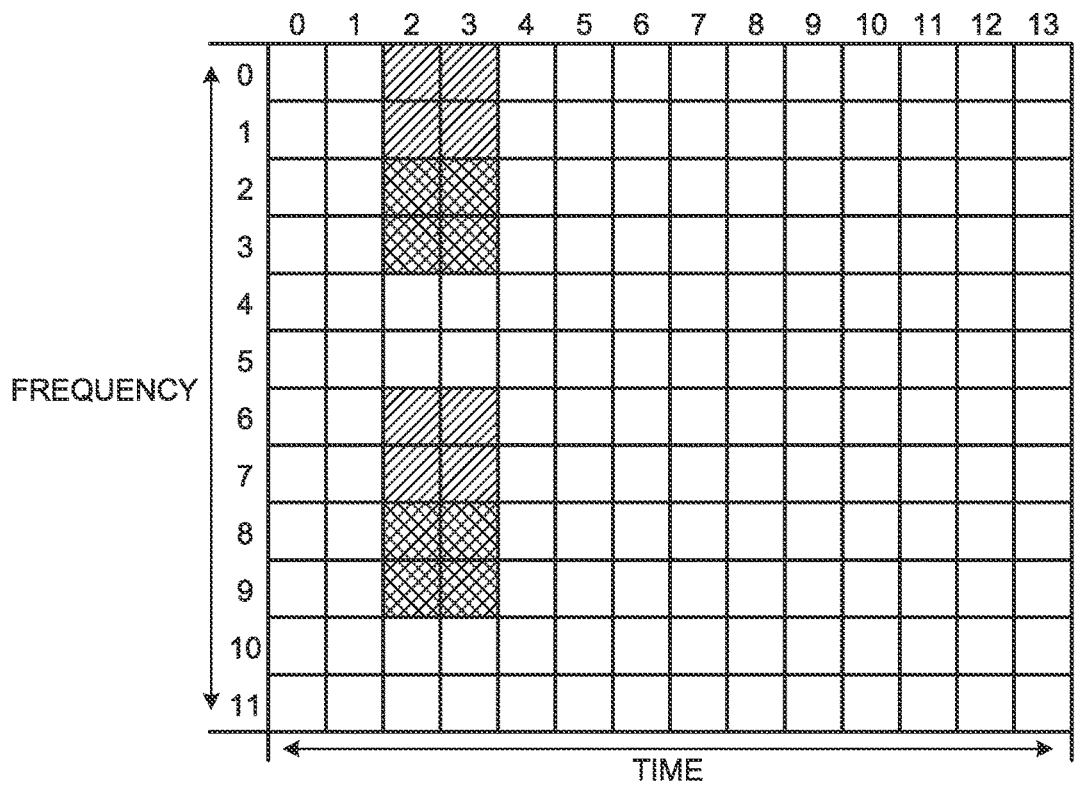
FIG. 15 is a diagram illustrating example arrangement of reference signals in a case where orthogonal codes of eight bits are used in the first embodiment.

While the orthogonal codes have a length of two bits or four bits in the examples described above, multiplexing of 16 layers of reference signals can also be performed using orthogonal codes of eight bits. FIG. 15 is a diagram illustrating example arrangement of reference signals in a case where orthogonal codes of eight bits are used. In the example illustrated in FIG. 15, as reference signals for a first layer, the reference signal placed at (0,2) is multiplied by +1, the reference signal placed at (0,3) is multiplied by +1, the reference signal placed at (1,2) is multiplied by +1, the reference signal placed at (1,3) is multiplied by +1, the reference signal placed at (6,2) is multiplied by +1, the reference signal placed at (6,3) is multiplied by +1, the reference signal placed at (7,2) is multiplied by +1, and the reference signal placed at (7,3) is multiplied by +1. As reference signals for a second layer, the reference signal placed at (0,2) is multiplied by +1, the reference signal placed at (0,3) is multiplied by −1, the reference signal placed at (1,2) is multiplied by +1, the reference signal placed at (1,3) is multiplied by −1, the reference signal placed at (6,2) is multiplied by +1, the reference signal placed at (6,3) is multiplied by −1, the reference signal placed at (7,2) is multiplied by +1, and the reference signal placed at (7,3) is multiplied by −1.

In addition, in the example illustrated in FIG. 15, as reference signals for a third layer, the reference signal placed at (0,2) is multiplied by +1, the reference signal placed at (0,3) is multiplied by +1, the reference signal placed at (1,2) is multiplied by −1, the reference signal placed at (1,3) is multiplied by −1, the reference signal placed at (6,2) is multiplied by +1, the reference signal placed at (6,3) is multiplied by +1, the reference signal placed at (7,2) is multiplied by −1, and the reference signal placed at (7,3) is multiplied by −1. As reference signals for a fourth layer, the reference signal placed at (0,2) is multiplied by +1, the reference signal placed at (0,3) is multiplied by −1, the reference signal placed at (1,2) is multiplied by −1, the reference signal placed at (1,3) is multiplied by +1, the reference signal placed at (6,2) is multiplied by +1, the reference signal placed at (6,3) is multiplied by −1, the reference signal placed at (7,2) is multiplied by −1, and the reference signal placed at (7,3) is multiplied by +1.

As reference signals for a fifth layer, the reference signal placed at (0,2) is multiplied by +1, the reference signal placed at (0,3) is multiplied by +1, the reference signal placed at (1,2) is multiplied by +1, the reference signal placed at (1,3) is multiplied by +1, the reference signal placed at (6,2) is multiplied by −1, the reference signal placed at (6,3) is multiplied by −1, the reference signal placed at (7,2) is multiplied by −1, and the reference signal placed at (7,3) is multiplied by −1. As reference signals for a sixth layer, the reference signal placed at (0,2) is multiplied by +1, the reference signal placed at (0,3) is multiplied by −1, the reference signal placed at (1,2) is multiplied by +1, the reference signal placed at (1,3) is multiplied by −1, the reference signal placed at (6,2) is multiplied by −1, the reference signal placed at (6,3) is multiplied by +1, the reference signal placed at (7,2) is multiplied by −1, and the reference signal placed at (7,3) is multiplied by +1.

As reference signals for a seventh layer, the reference signal placed at (0,2) is multiplied by +1, the reference signal placed at (0,3) is multiplied by +1, the reference signal placed at (1,2) is multiplied by −1, the reference signal placed at (1,3) is multiplied by −1, the reference signal placed at (6,2) is multiplied by −1, the reference signal placed at (6,3) is multiplied by −1, the reference signal placed at (7,2) is multiplied by +1, and the reference signal placed at (7,3) is multiplied by +1.

As reference signals for an eighth layer, the reference signal placed at (0,2) is multiplied by +1, the reference signal placed at (0,3) is multiplied by −1, the reference signal placed at (1,2) is multiplied by −1, the reference signal placed at (1,3) is multiplied by +1, the reference signal placed at (6,2) is multiplied by −1, the reference signal placed at (6,3) is multiplied by +1, the reference signal placed at (7,2) is multiplied by +1, and the reference signal placed at (7,3) is multiplied by −1.

Similar processes are performed on the reference signals placed at (2,2), (2,3), (3,2), (3,3), (8,2), (8,3), (9,2), and (9,3). As reference signals for a ninth layer, the reference signal placed at (2,2) is multiplied by +1, the reference signal placed at (2,3) is multiplied by +1, the reference signal placed at (3,2) is multiplied by +1, the reference signal placed at (3,3) is multiplied by +1, the reference signal placed at (8,2) is multiplied by +1, the reference signal placed at (8,3) is multiplied by +1, the reference signal placed at (9,2) is multiplied by +1, and the reference signal placed at (9,3) is multiplied by +1. As reference signals for a tenth layer, the reference signal placed at (2,2) is multiplied by +1, the reference signal placed at (2,3) is multiplied by −1, the reference signal placed at (3,2) is multiplied by +1, the reference signal placed at (3,3) is multiplied by −1, the reference signal placed at (8,2) is multiplied by +1, the reference signal placed at (8,3) is multiplied by −1, the reference signal placed at (9,2) is multiplied by +1, and the reference signal placed at (9,3) is multiplied by −1.

As reference signals for an eleventh layer, the reference signal placed at (2,2) is multiplied by +1, the reference signal placed at (2,3) is multiplied by +1, the reference signal placed at (3,2) is multiplied by −1, the reference signal placed at (3,3) is multiplied by −1, the reference signal placed at (8,2) is multiplied by +1, the reference signal placed at (8,3) is multiplied by +1, the reference signal placed at (9,2) is multiplied by −1, and the reference signal placed at (9,3) is multiplied by −1. As reference signals for a twelfth layer, the reference signal placed at (2,2) is multiplied by +1, the reference signal placed at (2,3) is multiplied by −1, the reference signal placed at (3,2) is multiplied by −1, the reference signal placed at (3,3) is multiplied by +1, the reference signal placed at (8,2) is multiplied by +1, the reference signal placed at (8,3) is multiplied by +1, the reference signal placed at (9,2) is multiplied by −1, and the reference signal placed at (9,3) is multiplied by +1.

As reference signals for a thirteenth layer, the reference signal placed at (2,2) is multiplied by +1, the reference signal placed at (2,3) is multiplied by +1, the reference signal placed at (3,2) is multiplied by +1, the reference signal placed at (3,3) is multiplied by +1, the reference signal placed at (8,2) is multiplied by −1, the reference signal placed at (8,3) is multiplied by −1, the reference signal placed at (9,2) is multiplied by −1, and the reference signal placed at (9,3) is multiplied by −1.

As reference signals for a fourteenth layer, the reference signal placed at (2,2) is multiplied by +1, the reference signal placed at (2,3) is multiplied by −1, the reference signal placed at (3,2) is multiplied by +1, the reference signal placed at (3,3) is multiplied by −1, the reference signal placed at (8,2) is multiplied by −1, the reference signal placed at (8,3) is multiplied by +1, the reference signal placed at (9,2) is multiplied by −1, and the reference signal placed at (9,3) is multiplied by +1.

As reference signals for a fifteenth layer, the reference signal placed at (2,2) is multiplied by +1, the reference signal placed at (2,3) is multiplied by +1, the reference signal placed at (3,2) is multiplied by −1, the reference signal placed at (3,3) is multiplied by −1, the reference signal placed at (8,2) is multiplied by −1, the reference signal placed at (8,3) is multiplied by −1, the reference signal placed at (9,2) is multiplied by +1, and the reference signal placed at (9,3) is multiplied by +1. As reference signals for a sixteenth layer, the reference signal placed at (2,2) is multiplied by +1, the reference signal placed at (2,3) is multiplied by −1, the reference signal placed at (3,2) is multiplied by −1, the reference signal placed at (3,3) is multiplied by +1, the reference signal placed at (8,2) is multiplied by −1, the reference signal placed at (8,3) is multiplied by +1, the reference signal placed at (9,2) is multiplied by +1, and the reference signal placed at (9,3) is multiplied by −1.

Figure 16:
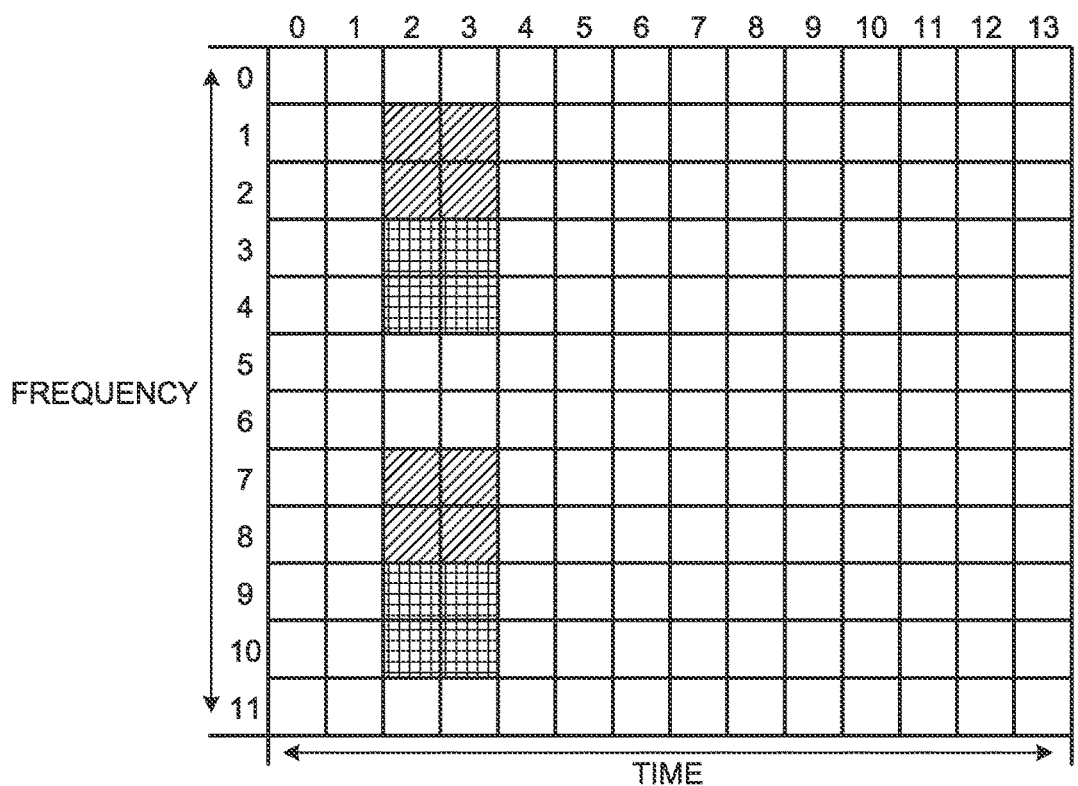
FIG. 16 is a diagram illustrating example arrangement of reference signals in a case where orthogonal codes of four bits are used in the first embodiment.

In the example described above withe reference to FIG. 15, because 16 layers are multiplexed with use of 16 carriers within one schedule unit, the reference signal density is 16/16/1=1[layer/RE/RB']. Note that the relation between layer numbers and orthogonal codes is not limited to the example described above. Example arrangement illustrated in FIG. 16 is an example in which the arrangement of FIG. 15 is shifted by one subcarrier in frequency domain. The example arrangements of FIGS. 15 and 16 also enable multiplexing of eight layers. For example, in the example arrangement in FIG. 16, orthogonal codes of four bits are used, and for a first layer, the reference signal placed at (1,2) is multiplied by +1, the reference signal placed at (1,3) is multiplied by +1, the reference signal placed at (2,2) is multiplied by +1, and the reference signal placed at (2,3) is multiplied by +1. The orthogonal codes of four bits are different for layers as described above. The example illustrated in FIG. 16 is example arrangement in which duplication is performed twice in the frequency domain. Specifically, in the example of FIG. 16, reference signals arranged at the second symbols on the first and second subcarriers and the third symbols on the first and second subcarriers are defined as a first reference signal group, reference signals arranged at the second symbols on the third and fourth subcarriers and the third symbols on the third and fifth subcarriers are defined as a second reference signal group, the first and second reference signal groups are multiplied by different orthogonal codes of two bits for different layers, the first and second reference signal groups are defined as a basic pattern, the basic pattern is duplicated, and the duplicated basic pattern is arranged at a position shifted by six subcarriers in the frequency direction.

Figure 17:
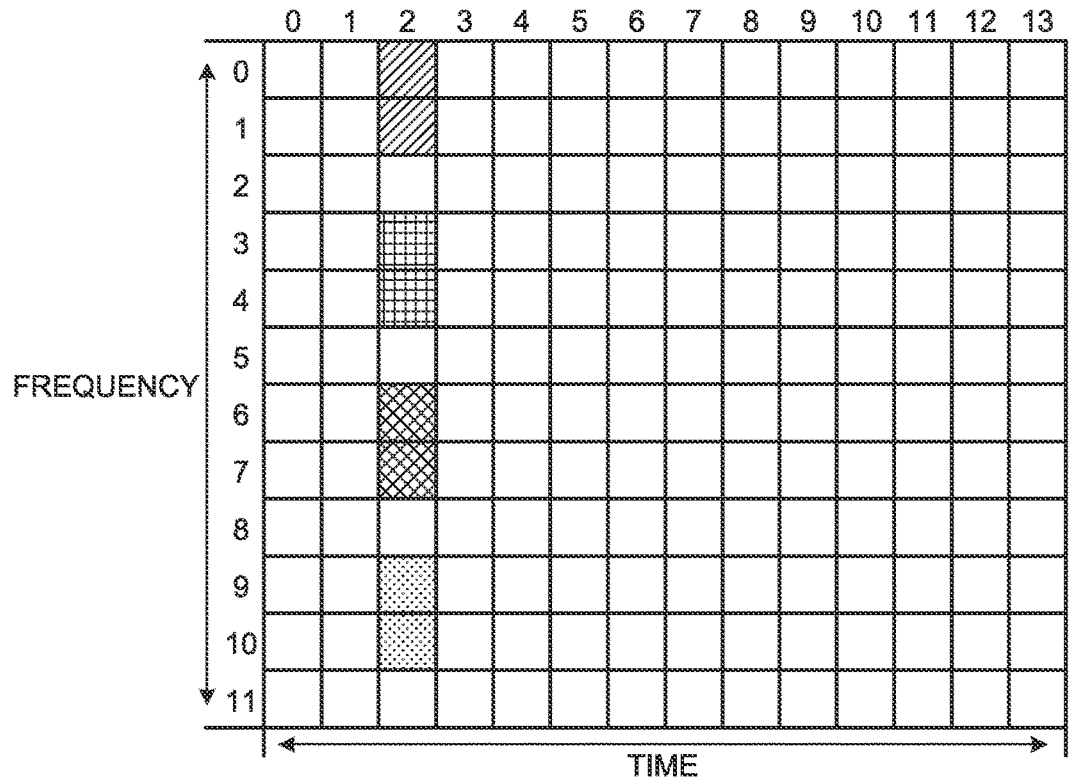
FIG. 17 is a diagram illustrating an example in which multiplexing is performed with reference signals arranged at one symbol time and with use of orthogonal codes in the first embodiment.
Figure 18:
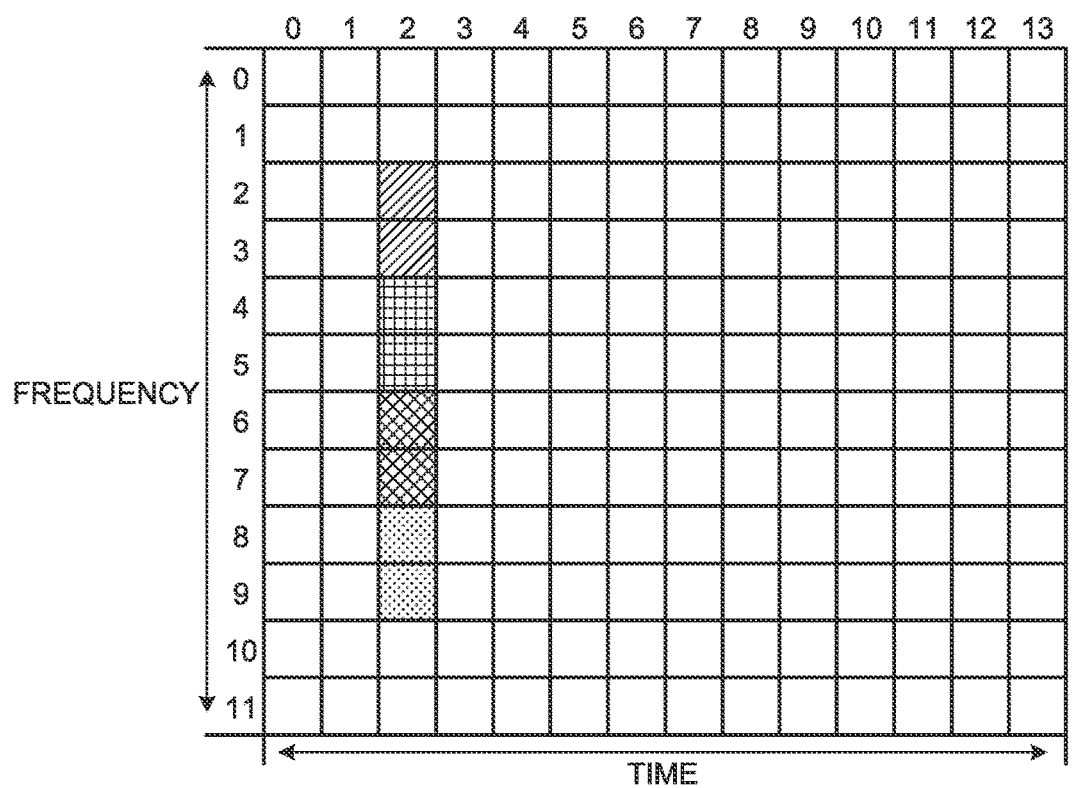
FIG. 18 is a diagram illustrating example arrangement of reference signals in a case where orthogonal codes of two bits are used at one symbol time in the first embodiment.
Figure 19:
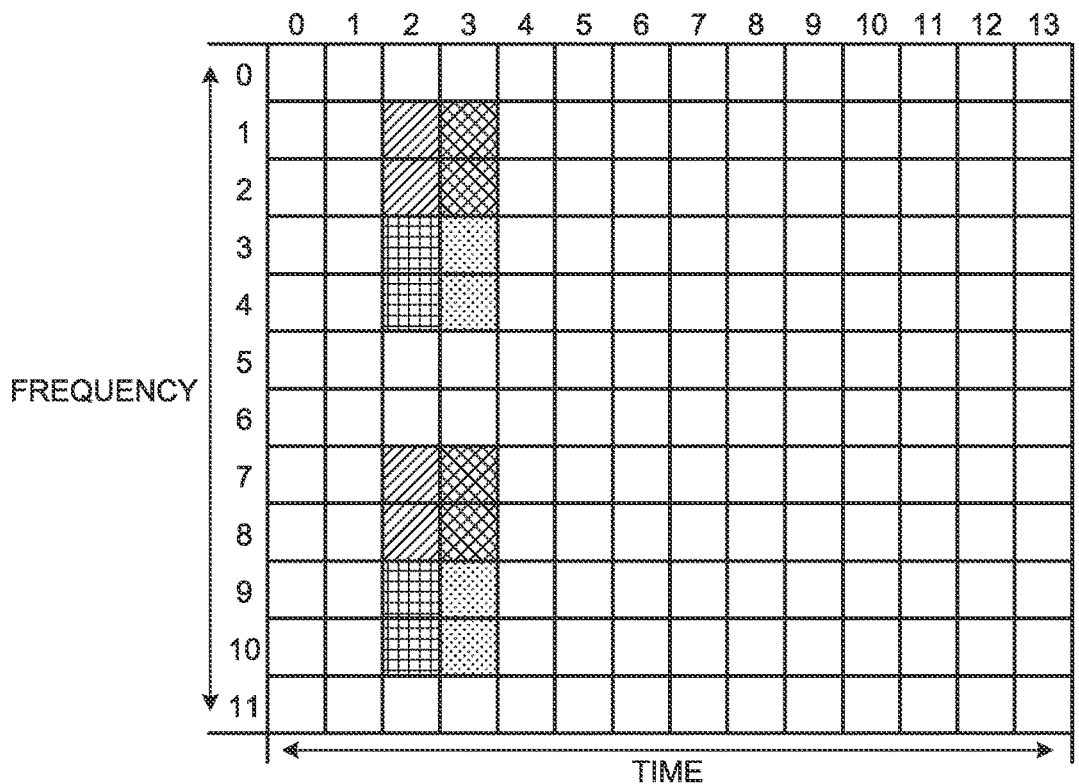
FIG. 19 is a diagram illustrating example arrangement of reference signals corresponding to two symbols with use of orthogonal codes of two bits at one symbol time in the first embodiment.

While the reference signals are arranged over a plurality of symbol times in the examples described above, multiplexing can also be performed with reference signals arranged at one symbol time and with use of orthogonal codes. FIG. 17 is a diagram illustrating an example in which multiplexing is performed with reference signals arranged at one symbol time and with use of orthogonal codes. In the example illustrated in FIG. 17, (0,2) and (1,2) constitute a first reference signal group, (3,2) and (4,2) constitute a second reference signal group, (6,2) and (7,2) constitute a third reference signal group, and (9,2) and (10,2) constitute a fourth reference signal group. For example, as reference signals for a first layer, the reference signal at (0,2) is multiplied by +1, and the reference signal at (1,2) is multiplied by +1. As reference signals for a second layer, the reference signal at (0,2) is multiplied by +1, and the reference signal at (1,2) is multiplied by −1. Similar processes are performed on the other reference signal groups, and transmission of reference signals of eight layers can thus be performed within the second symbol time. While an interval of one subcarrier is provided in the frequency domain between the groups in FIG. 17, reference signals may be arranged without intervals as in an example illustrated in FIG. 18. In the example illustrated in FIG. 18, the second symbols on the second and third subcarriers are defined as a first reference signal group, the second symbols on the fourth and fifth subcarriers are defined as a second reference signal group, the second symbols on the sixth and seventh subcarriers are defined as a third reference signal group, the second symbols on the eighth and ninth subcarriers are defined as a fourth reference signal group, and the reference signals in each of the first to fourth reference signal groups are multiplied by orthogonal codes of two bits that are different for different layers. While patterns in which no duplication is made in the time domain are presented in the example arrangements in FIGS. 17 and 18, a plurality of arrangement patterns may be duplicated in time domain as illustrated in FIG. 19. As a result, reference signals are arranged using two symbols as illustrated in FIG. 19.

Figure 20:
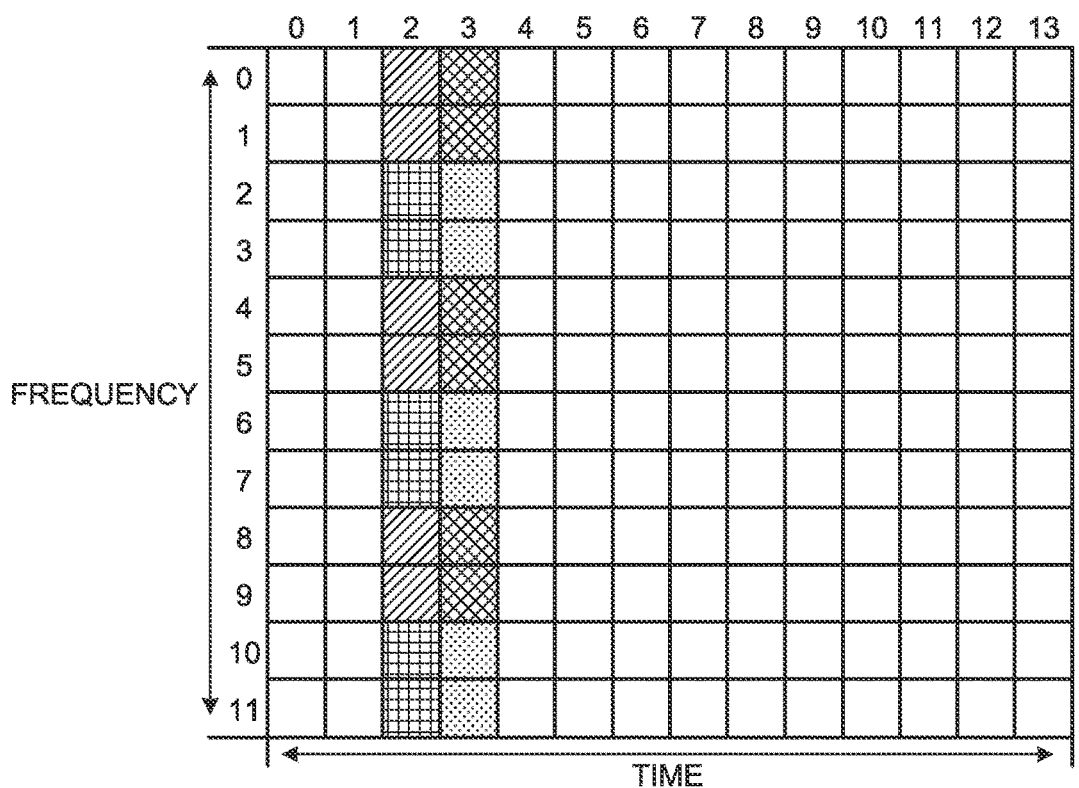
FIG. 20 is a diagram illustrating example arrangement of reference signals corresponding to two symbols with use of orthogonal codes of two bits at one symbol time in the first embodiment.

Specifically, in the example illustrated in in FIG. 19, the second symbols on the first, second, seventh, and eighth subcarriers are defined as a first reference signal group, the second symbols on the third, fourth, ninth, and tenth subcarriers are defined as a second reference signal group, the third symbols on the first, second, seventh, and eighth subcarriers are defined as a third reference signal group, the third symbols on the third, fourth, ninth, and tenth subcarriers are defined as a fourth reference signal group, reference signals in each of the first to fourth reference signal groups are multiplied by orthogonal codes of four bits that are different for different layers. In addition, as illustrated in FIG. 20, a pattern may be duplicated in frequency three times. Specifically, in the example illustrated in FIG. 20, the second symbols on the first and second subcarriers are defined as a first reference signal group, the second symbols on the third and fourth subcarriers are defined as a second reference signal group, the third symbols on the first and second subcarriers are defined as a third reference signal group, the third symbols on the third and fourth subcarriers are defined as a fourth reference signal group, reference signals in each of the first to fourth reference signal groups are multiplied by orthogonal codes of four bits that are different for different layers, the first to fourth reference signal groups are defined as a basic pattern, and the basic pattern is duplicated, so that a total of three patterns are arranged in the frequency direction.

Figure 21:
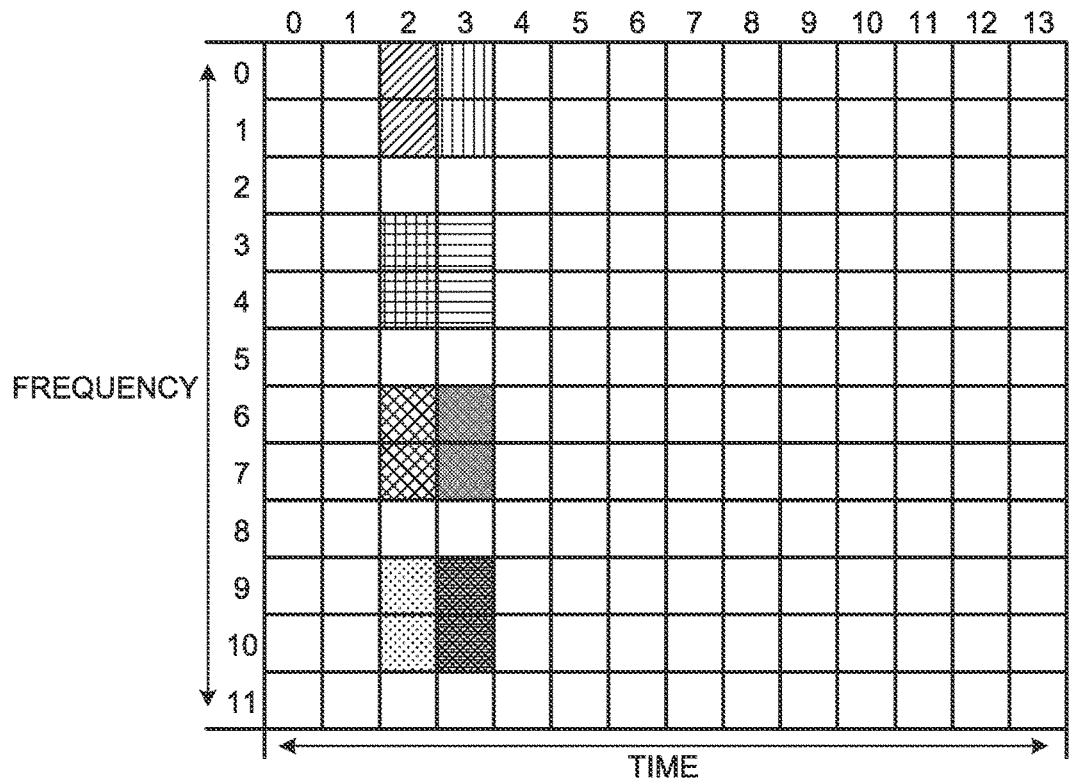
FIG. 21 is a diagram illustrating an example in which multiplexing is performed with reference signals arranged at two symbol times and with use of orthogonal codes in the first embodiment.
Figure 22:
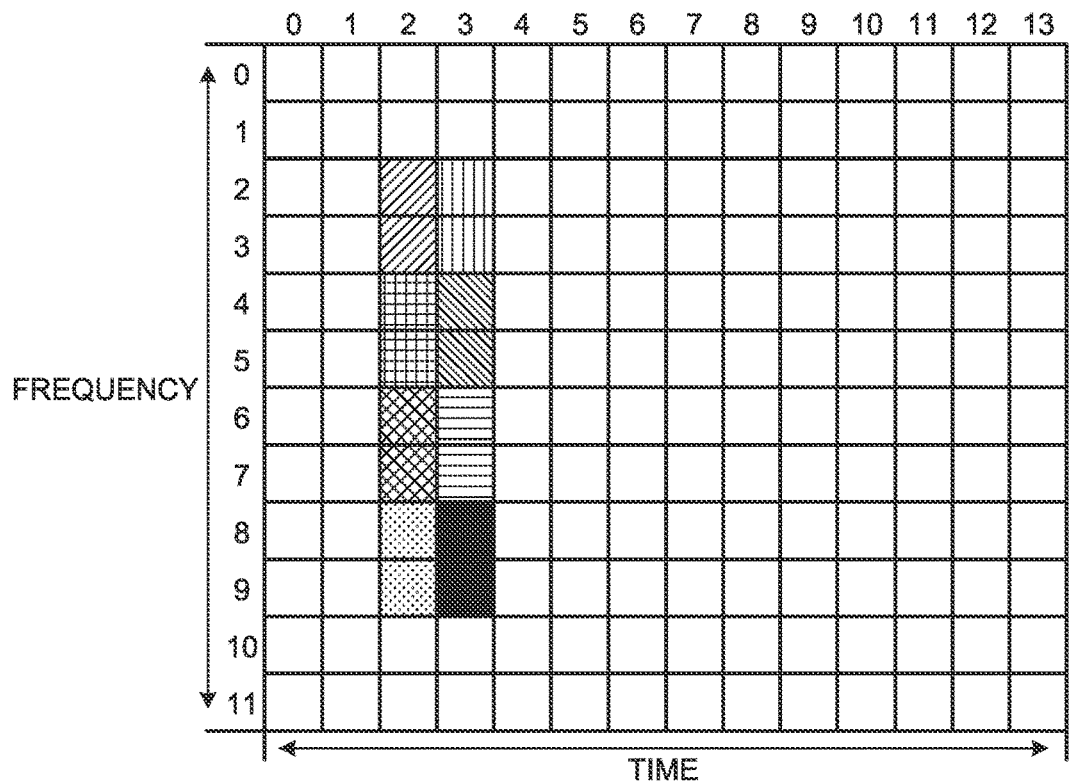
FIG. 22 is a diagram illustrating arrangement enabling multiplexing of 16 layers with use of orthogonal codes of two bits at one symbol time and reference signals corresponding to two symbols in the first embodiment.

The number of layers to be multiplexed can be increased by similarly applying the arrangement pattern illustrated in FIG. 17 to two symbol times. FIG. 21 is a diagram illustrating an example in which multiplexing is performed with reference signals arranged at two symbol times and with use of orthogonal codes. Reference signals multiplied by orthogonal codes similarly to the reference signals illustrated in FIG. 17 are arranged at the second symbol time. In addition, reference signals multiplied by orthogonal codes are similarly arranged at the third symbol time, which enables multiplexing of eight layers in addition to the example illustrated in FIG. 17, that is, multiplexing of a total of 16 layers. In an arrangement pattern illustrated in FIG. 22, intervals between groups in the frequency domain are eliminated. In the example illustrated in FIG. 22, the second symbols on the second and third subcarriers are defined as a first reference signal group, the second symbols on the fourth and fifth subcarriers are defined as a second reference signal group, the second symbols on the sixth and seventh subcarriers are defined as a third reference signal group, the second symbols on the eighth and ninth subcarriers are defined as a fourth reference signal group, the third symbols on the second and third subcarriers are defined as a fifth reference signal group, the third symbols on the fourth and fifth subcarriers are defined as a sixth reference signal group, the third symbols on the sixth and seventh subcarriers are defined as a seventh reference signal group, the third symbols on the eighth and ninth subcarriers are defined as an eighth reference signal group, and reference signals in each of the first to eighth reference signal groups are multiplied by orthogonal codes of two bits that are different for different layers.

Figure 23:
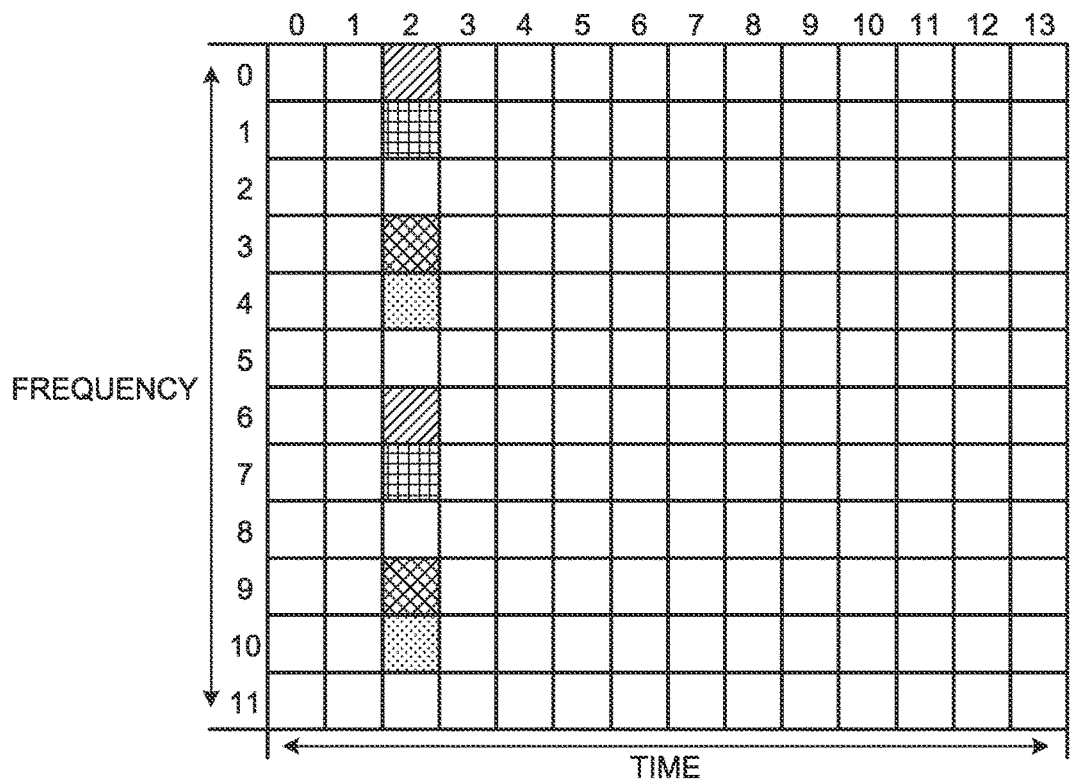
FIG. 23 is a diagram illustrating an example in which reference signals constituting each reference signal group are separated in the frequency domain in the first embodiment.
Figure 24:
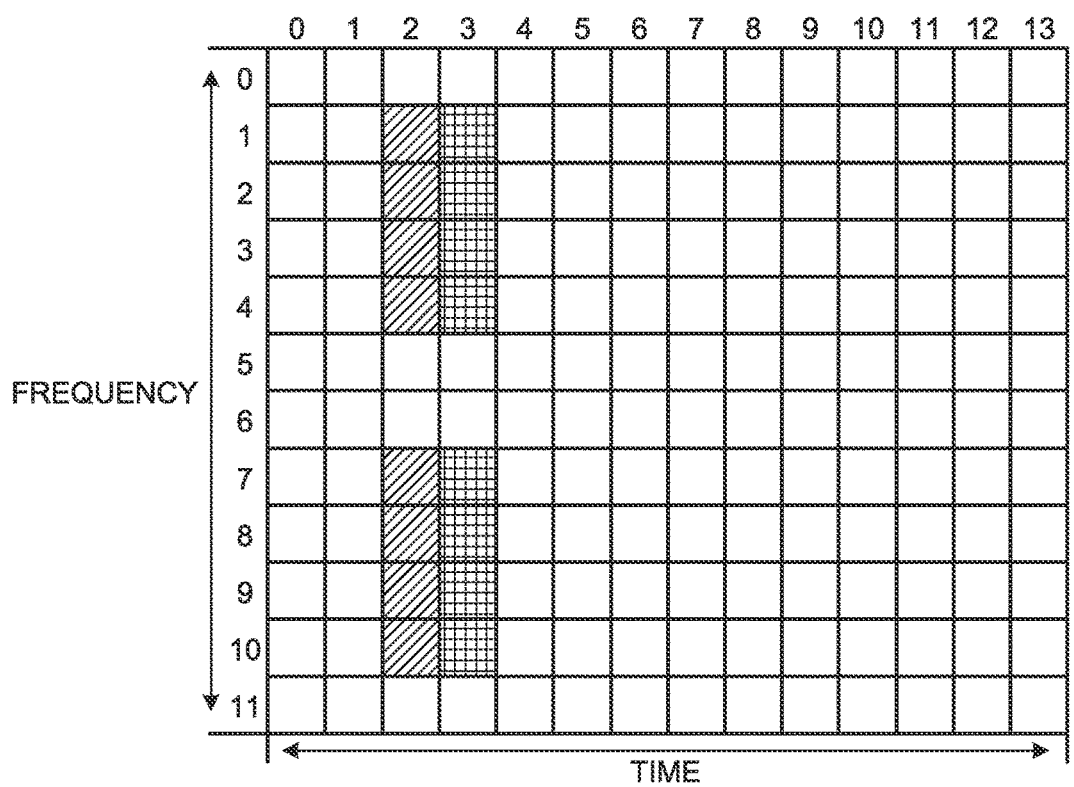
FIG. 24 is a diagram illustrating example arrangement of reference signals corresponding to two symbols with use of orthogonal codes of four bits at one symbol time in the first embodiment.

While the positions of the reference signals are adjacent to each other in the frequency domain in each reference signal group in the example illustrated in FIG. 17, the positions of reference signals in each reference signal group need not be adjacent to each other in the frequency domain. In other words, reference signals constituting a reference signal group may be separated in the frequency domain. FIG. 23 is a diagram illustrating an example in which reference signals constituting each reference signal group are separated in the frequency domain. In FIG. 23, positions corresponding to the same reference signal group are represented by the same hatching pattern. In the example arrangement illustrated in FIG. 23, reference signals in a first reference signal group are arranged at (0,2) and (6,2), for example. In an example illustrated in FIG. 24, each reference signal group is arranged continuously in frequency. For example, a first group is arranged from (1,2) to (4,2) at the second symbol. An orthogonal code of four bits is then applied. Furthermore, the first group is duplicated twice in frequency. A second group is arranged at the third symbol. In the example illustrated in FIG. 24, the second symbols on the first to fourth subcarriers are defined as a first reference signal group, the third symbols on the first to fourth subcarriers are defined as a second reference signal group, the reference signals in the first and second reference signal groups are multiplied by orthogonal codes of four bits that are different for different layers, the first and second reference signal groups are defined as a basic pattern, the basic pattern is duplicated, and the duplicated basic pattern is arranged at a position shifted by six subcarriers in the frequency direction.

Figure 25:
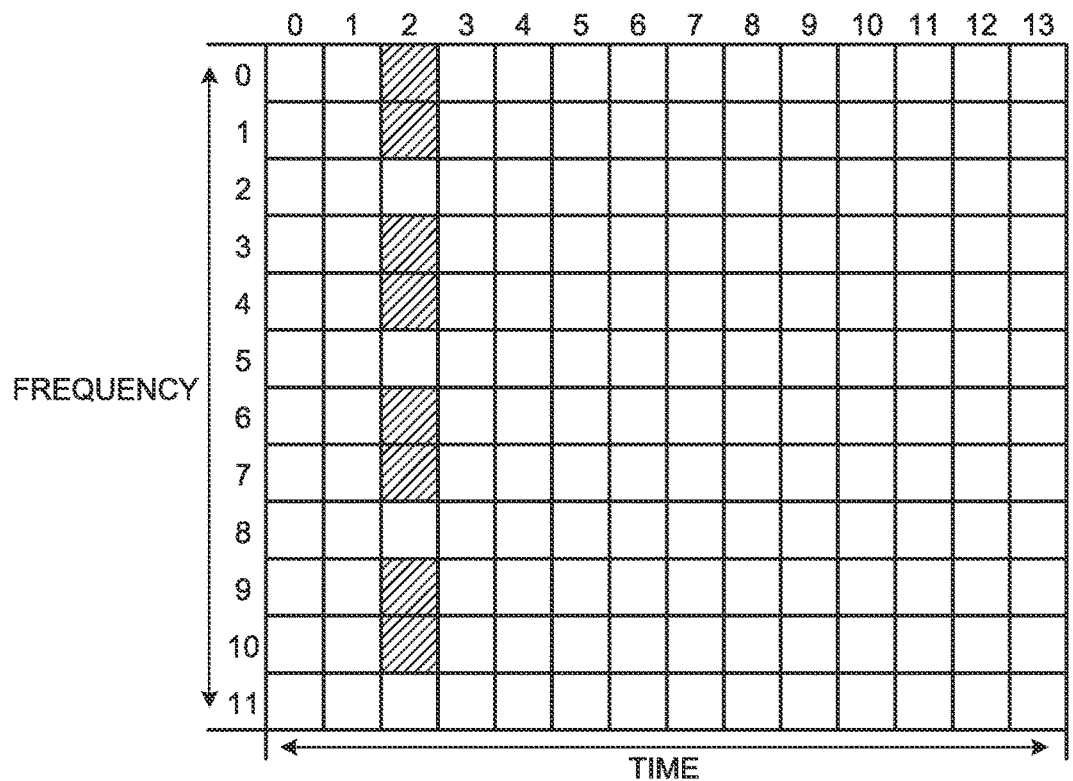
FIG. 25 is a diagram illustrating an example in which reference signals are arranged at one symbol time with use of orthogonal codes of eight bits in the first embodiment.

Furthermore, while the example arrangement illustrated in FIG. 17 is an example in which the orthogonal codes have a length of two bits, orthogonal codes of eight bits may be used. FIG. 25 is a diagram illustrating an example in which reference signals are arranged at one symbol time with use of orthogonal codes of eight bits. In the example illustrated in FIG. 25, reference signals are arranged at (0,2), (1,2), (3,2), (4,2), (6,2), (7,2), (9,2), and (10,2). In the example illustrated in FIG. 25, layer multiplexing is then performed using orthogonal codes of eight bits. For example, the orthogonal codes of eight bits that can be used are [+1,+1,+1,+1,+1,+1,+1,+1], [+1,−1,+1,−1,+1,−1,+1,−1], [+1,+1,−1,−1,+1,+1,−1,−1], [+1,−1,−1,+1,+1,−1,−1,+1], [+1,+1,−1,−1,−1,−1,+1,+1], and [+1,−1,−1,+1,−1,+1,+1,−1].

Figure 26:
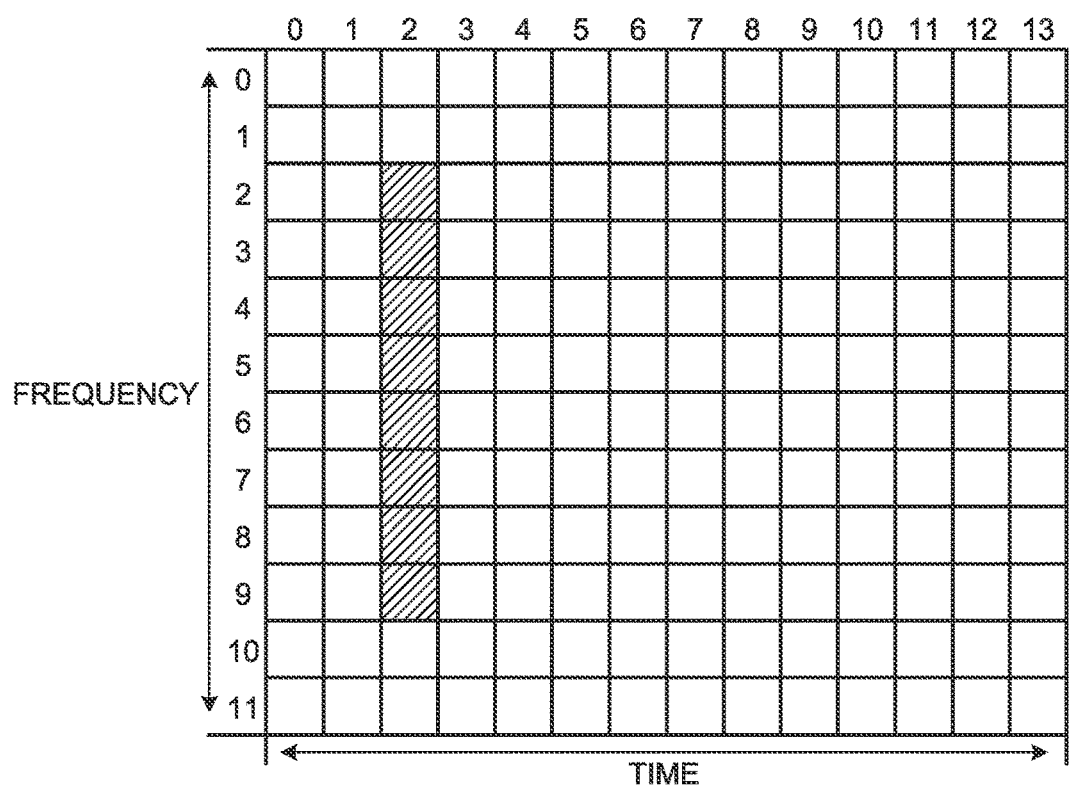
FIG. 26 is a diagram illustrating another example in which reference signals are arranged at one symbol time with use of orthogonal codes of eight bits in the first embodiment.
Figure 27:
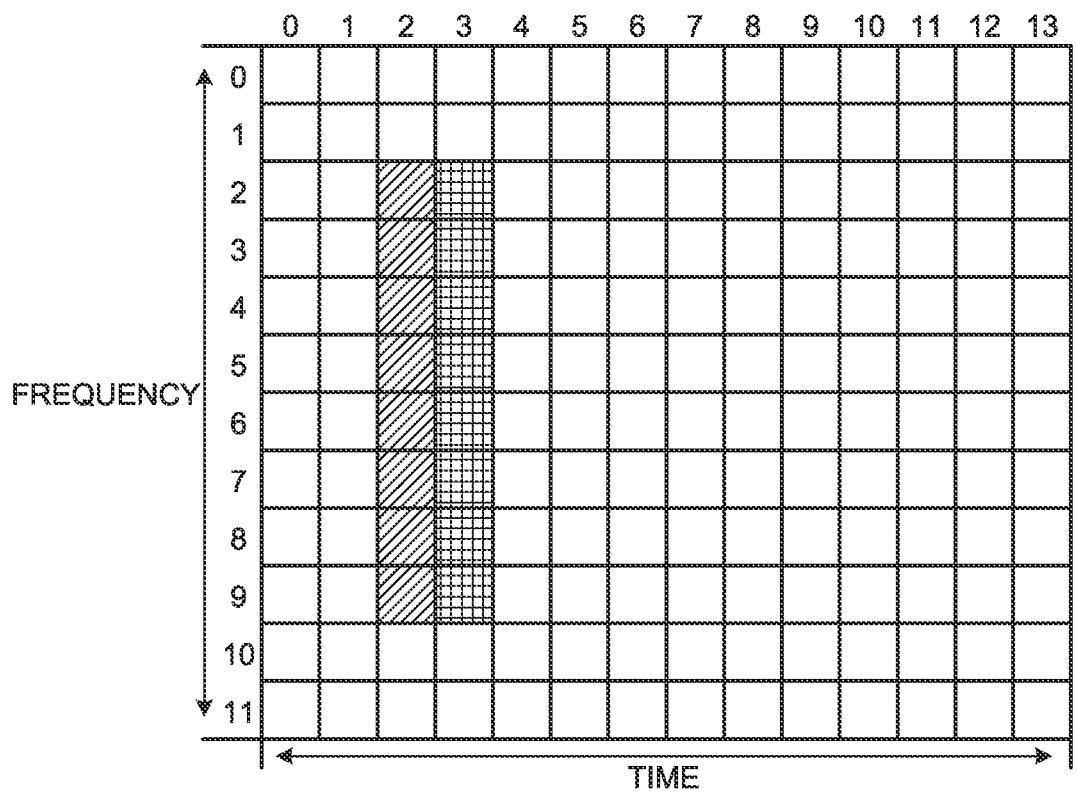
FIG. 27 is a diagram illustrating example arrangement of reference signals corresponding to two symbols with use of orthogonal codes of eight bits at one symbol time in the first embodiment.

Alternatively, reference signals may be arranged at positions different from those in the example illustrated in FIG. 25 by using orthogonal codes of eight bits. FIG. 26 is a diagram illustrating another example in which reference signals are arranged at one symbol time with use of orthogonal codes of eight bits. In the example illustrated in FIG. 26, reference signals are continuously arranged from (2,2) to (9,2) in the frequency domain. An example illustrated in FIG. 27 is an example in which a reference signal arrangement pattern arranged at the second symbols is arranged at the third symbols. Use of this example arrangement enables multiplexing of a total of 16 layers. The first to eighth layers are multiplexed by using the reference signals arranged at the second symbols, and the ninth to sixteenth layers are multiplexed by using the reference signals arranged at the third symbols. In the example illustrated in FIG. 27, the second symbols on the second to ninth subcarriers are defined as a first reference signal group, the third symbols on the second to ninth subcarriers are defined as a second reference signal group, reference signals in the first and second reference signal groups are multiplied by orthogonal codes of eight bits that are different for different layers.

Next, procedures for allocation of orthogonal codes, arrangement in the time domain and frequency, and generation of control information in the base station 1 of the present embodiment will be described. FIG. 28 is a flowchart illustrating an example of procedures performed by the base station 1 of the present embodiment. First, the base station 1 determines the number of UEs, that is, terminals 2 to be destinations of transmission, and the number of layers for the each of UEs (step S1). Specifically, the control unit 10 of the base station 1 manages the number of terminals 2 to be destinations of transmission on the basis of signals received from the terminals 2. For examples, the control unit 10 of the base station 1 manages the terminal 2 which has transmitted a request for starting communication with the base station 1, as a UE that is a destination of transmission until the terminal 2 requests termination of the communication. In a case where no signal has been received from a terminal 2 for a predetermined period or longer, the control unit 10 may delete the terminal 2 from the UEs that are destinations of transmission even if the terminal 2 has not requested termination of the communication. The control unit 10 determines the number of layers for each UE on the basis of a request for band allocation transmitted from each of the terminals 2. Because any method may be used for the management of the number of UEs and the allocation of the layer numbers by the base station 1 and general methods can be used therefor, detailed description thereof will not be provided.

Subsequently, the control unit 10 of the base station 1 determines positions of reference signals in the time domain and the frequency domain depending on the number of UEs and the number of layer(s) allocated to each of the UEs (step S2). In a case where the number of UEs is eight and two layers are allocated to each of the UEs, for example, the total number of layers is 16, and the control unit 10 thus determines arrangement of reference signals in the frequency domain and the time domain which enables multiplexing of 16 layers. In this process, the control unit 10 also determines the number of bits of orthogonal codes. As described above, the base station 1 arranges reference signals so that at least either of the positions in the frequency domain and the positions in the time domain of the reference signals of layers are different or multiplies the reference signals by orthogonal codes when the positions in the frequency domain and the positions in the time domain of the reference signals of layers are identical, so that the reference signals of layers do not interfere with each other. Thus, the control unit 10 determines the positions of reference signals in the time domain and the frequency domain and whether or not to multiply the reference signals by orthogonal codes so that the reference signals of layers do not interfere with each other.

Subsequently, the control unit 10 of the base station 1 allocates an orthogonal code to each of reference signal groups of each layer (step S3). The control unit 10 indicates the positions of the reference signals in the time domain and the frequency domain and the orthogonal codes to each of the processing units 12 associated with corresponding one of the layers.

Each of the processing units 12 multiplies reference signals by the orthogonal codes according to instruction from the control unit 10 (step S4). Note that the reference signals can be selected from a plurality of predetermined patterns by the first control signal generating units 125 of the processing units 12 as described above. In addition, a reference signal may be scrambled and then multiplied by an orthogonal code, or may be multiplied by an orthogonal code and then scrambled.

The processing units 12 each generate parameter information (step S5). Specifically, the parameter information generating unit 123 generates parameter information on the basis of information from the first control signal generating unit 125, the second control signal generating unit 124, and the third control signal generating unit 122. Note that the third control signal generating unit 122 determines arrangement of reference signals in accordance with instruction from the control unit 10. In this process, processing such as changing the arrangement of reference signals and changing the number of reference signal groups may be performed as described above on the basis of the feedback information from relevant terminals 2. In addition, the control unit 10 may instruct each of the processing units 12 whether or not to perform scrambling.

Subsequently, the base station 1 performs time, frequency, and space-division multiplexing (step S6), and terminates the processing. Specifically, the multiplexing units 129 of the processing units 12 multiplex data, reference signals, and control signals. The precoding unit 13 then performs space-division multiplexing of the multiplexed signals in the layers output from the processing units 12 by precoding, to perform time, frequency, and space-division multiplexing. Signals resulting from the time, frequency, and space-division multiplexing are transmitted by the transmitting unit 14.

FIG. 29 is a diagram illustrating an example functional configuration of a terminal 2 of the present embodiment. The terminal 2 includes a receiving unit 21, a demodulation unit 22, a control unit 23, and a transmitting unit 24. The receiving unit 21 performs removal of CPs from signals received from the base station 1, discrete Fourier transform (DFT), and the like. The demodulation unit 22 performs channel estimation and modulation on each layer on the basis of a signal received from the receiving unit 21. In this process, the demodulation unit 22 obtains arrangement of reference signals and the like on the basis of parameter information included in a received signal. The control unit 23 generates feedback information on the basis of the result of channel estimation by the demodulation unit 22, the strengths of received signals measured by the receiving unit 21, the result of detection of the position of the terminal 2 by a position detecting unit, which is not illustrated, and the like, and transmits the feedback information to the base station 1 via the transmitting unit 24.

Figure 30:
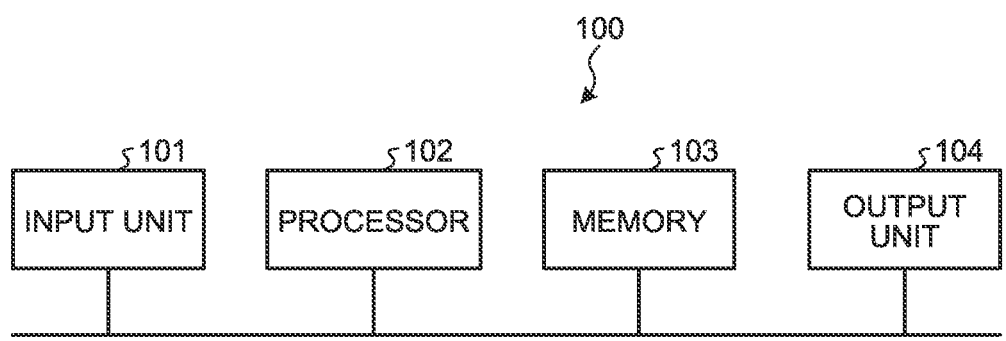
FIG. 30 is a diagram illustrating an example configuration of a control circuit in the first embodiment.

Next, a hardware configuration of the base station 1 and the terminals 2 will be described. Among the components of the base station 1 illustrated in FIG. 2, the transmitting unit 14 is a transmitter and the receiving unit 11 is a receiver. Among the components of the base station 1 illustrated in FIG. 2, the control unit 10, the processing unit 12, and the precoding unit 13 are implemented by processing circuits. Part of the transmitting unit 14 and the receiving unit 11 may be a processing circuit. These processing circuits may be circuits in which processors execute software or may be dedicated circuits. In a case where a processing circuit is implemented by software, the processing circuit is a control circuit illustrated in FIG. 30, for example. FIG. 30 is a diagram illustrating an example of a control circuit 100. The control circuit 100 includes an input unit 101, a processor 102, a memory 103, and an output unit 104. The input unit 101 is a receiving unit that receives data input from outside. The output unit 104 is a transmitting unit that transmits data to outside.

The processor 102 is a central processing unit (CPU; also referred to as a central processing device, a processing device, a computing device, a microprocessor, a microcomputer, or a digital signal processor (DSP)). The memory 103 may be nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disc, a mini disc, a digital versatile disc (DVD) or the like, for example. In a case where a processing circuit is the control circuit 100 illustrated in FIG. 30, the components of the base station 1 are implemented by the processor 102 by reading and executing a program associated with the components stored in the memory 103. The memory 103 is also used as a temporary memory in processes performed by the processor 102.

Figure 31:
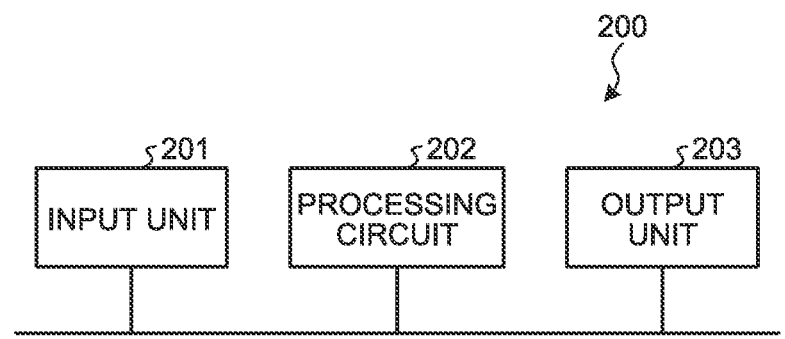
FIG. 31 is a diagram illustrating an example configuration of a dedicated hardware circuit in the first embodiment.

Some of the components of the base station 1, which are implemented as dedicated hardware, are implemented by a circuit illustrated in FIG. 31. FIG. 31 is a diagram illustrating an example configuration of a dedicated hardware circuit. The dedicated hardware circuit 200 includes an input unit 201, a processing circuit 202, and an output unit 203. The input unit 201 is a receiving unit that receives data input from outside. The output unit 203 is a transmitting unit that transmits data to outside. The processing circuit 202 is a single circuit, a composite circuit, a programmed processor, a parallel-programmed processor, an application specific integrated circuit (ASIC), a field programmable gate array (FPGA), or a combination thereof.

In addition, the components of the base station 1 may be implemented by combinations of the dedicated hardware circuit 200 and the control circuit 100.

The transmitting unit 24 of a terminal 2 is a transmitter, and a receiving unit 21 of a terminal 2 is a receiver. The demodulation unit 22 and the control unit 23 may be implemented by the control circuit 100 or the dedicated hardware circuit 200 described above. Part of the transmitting unit 24 and the receiving unit 21 may also be implemented by the control circuit 100 or the dedicated hardware circuit 200 described above.

As described above, in the present embodiment, the control unit 10 of the base station 1 determines the positions of reference signals in the time domain and the frequency domain and whether or not to multiply the reference signals by orthogonal codes so that the reference signals of layers do not interfere with each other. As a result, interference between reference signals of layers is prevented or reduced, retransmission of signals from the base station 1 is reduced, which prevents decrease in communication capacity, insertion of more reference signals than necessary is prevented, and decrease in transmission efficiency is prevented.

Second Embodiment

Next, a method for arranging reference signals in a second embodiment according to the present invention will be described. The base station 1 and the terminals 2 in the present embodiment have configurations similar to those in the first embodiment. Differences from the first embodiment will be described below. In the first embodiment, the example arrangement of reference signals within the schedule unit constituted by 12 carriers and 14 symbols is presented. In the present embodiment, a method of arrangement enabling arrangement of reference signals over a plurality of schedule units will be described. Hereinafter, resources of one schedule unit will be referred to one RB'.

In the present embodiment, reference signals are distributed over a plurality of schedule units, that is, a plurality of RB's. Distribution of reference signals over a plurality of RB's improves frequency use efficiency. In a case where reference signals are arranged over a plurality of RB's, the base station 1 needs to determine in advance how many RB's are defined as one group for arrangement of reference signals. A group constituted by a plurality of RB's over which reference signals are distributed is referred to as a resource block group. In an example below, assume that a resource block group is constituted by two RB's, which are referred to as a resource block pair.

For example, assume that two RB's, which are RB'0 and RB'1 constitute a resource block pair. In this case, for multiplexing and transmission of eight layers, the base station 1 arranges reference signals in the first to fourth layers are arranged in RB'0, and reference signals in the fifth to eighth layers are arranged in RB'1. In this case, because reference signals of eight layers need not be arranged in one RB', the frequency use efficiency is improved as compared to a case where reference signals of eight layers are arranged in all the RB's.

Figure 32:
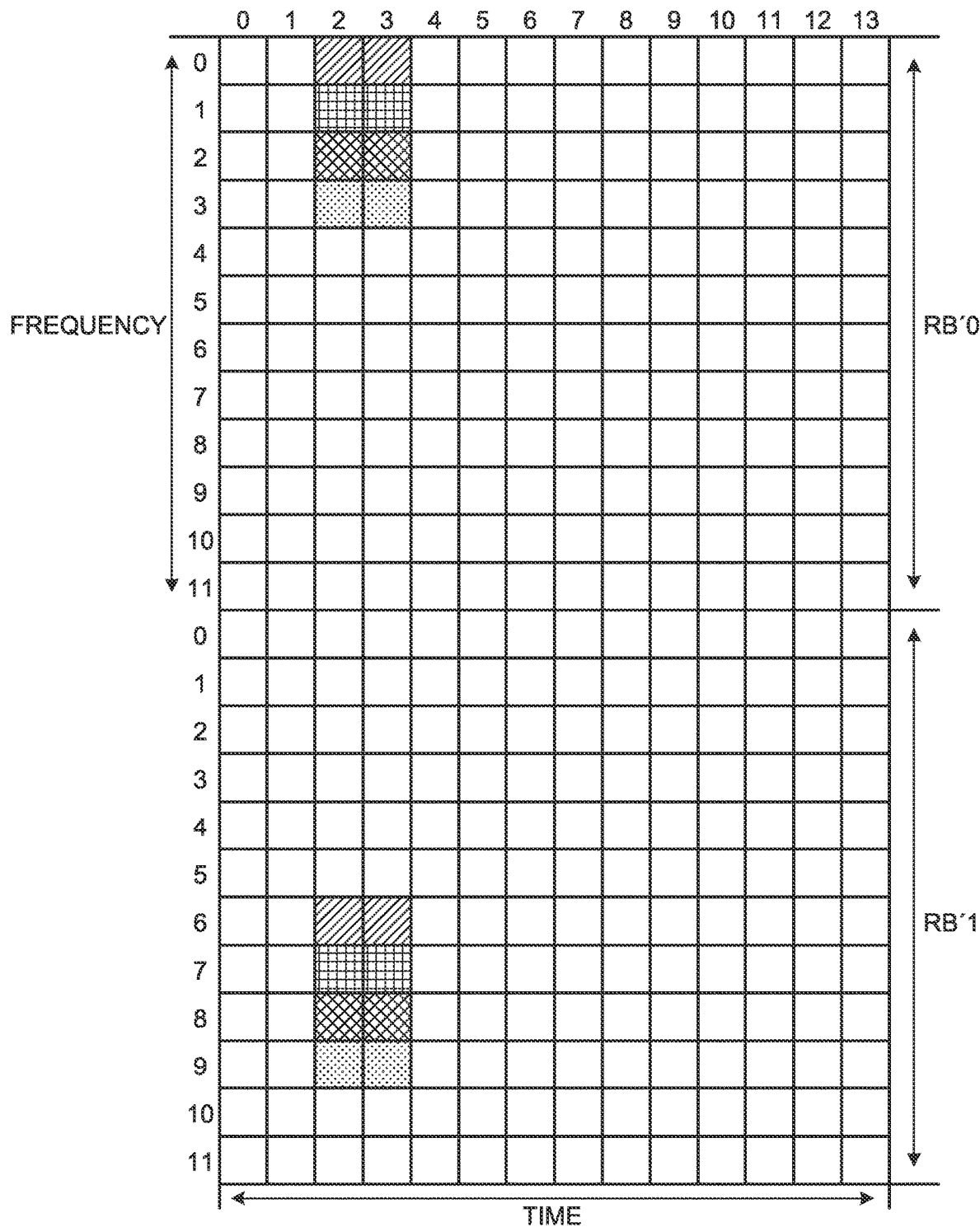
FIG. 32 is a diagram illustrating example arrangement of reference signals in a second embodiment.

A specific example will be described with reference to the arranged reference signals in FIG. 9. Similarly to the example of FIG. 9, orthogonal codes having a length of four bits are used, reference signals are inserted at two symbol times, and multiplexing of 16 layers is performed. FIG. 32 is a diagram illustrating example arrangement of reference signals in the present embodiment. In FIG. 32, the base station 1 distributes the reference signals illustrated in FIG. 9 over two RB's. Specifically, reference signals are arranged at (0,2), (0,3), (1,2), (1,3), (2,2), (2,3), (3,2), and (3,3) in RB'0, and at (6,2), (6,3), (7,2), (7,3), (8,2), (8,3), (9,2), and (9,3) in RB'1.

As reference signals for a first layer, the signal at (0,2) in RB'0 is multiplied by +1, the signal at (0,3) in RB'0 is multiplied by +1, the signal at (6,2) in RB'1 is multiplied by +1, and the signal at (6,3) in RB'1 is multiplied by +1. As reference signals for a second layer, the signal at (0,2) in RB'0 is multiplied by +1, the signal at (0,3) in RB'0 is multiplied by −1, the signal at (6,2) in RB'1 is multiplied by +1, and the signal at (6,3) in RB'1 is multiplied by −1. As reference signals for a third layer, the signal at (0,2) in RB'0 is multiplied by +1, the signal at (0,3) in RB'0 is multiplied by +1, the signal at (6,2) in RB'1 is multiplied by −1, and the signal at (6,3) in RB'1 is multiplied by −1. As reference signals for a fourth layer, the signal at (0,2) in RB'0 is multiplied by +1, the signal at (0,3) in RB'0 is multiplied by −1, the signal at (6,2) in RB'1 is multiplied by −1, and the signal at (6,3) in RB'1 is multiplied by +1.

Thus, up to four layers can be multiplexed by using the reference signals arranged at (0,2), (0,3), (6,2), and (6,3) and the orthogonal codes. Similarly, orthogonal codes are used for each of a group constituted by (1,2) in RB0, (1,3) in RB0, (7,2) in RB1, and (7,3) in RB1, a group constituted by (2,2) in RB0, (2,3) in RB0, (8,2) in RB1, and (8,3) in RB1, and a group constituted by (3,2) in RB0, (3,3) in RB0, (9,2) in RB1, and (9,3) in RB1, and up to four layers can thus be multiplexed in each of the groups. As a result, reference signals in a total of 16 layers can be multiplexed. Because 16 layers are transmitted with use of 16 carriers within two RB's, the reference signal density is 16/16/2=1/2[layer/RE/RB']. Note that the relation between layer numbers and orthogonal codes is not limited to the example described above.

In a case where reference signals are arranged in a resource block pair, some techniques can be considered for arrangement of reference signals. The parameter information generating unit 123 includes which technique is used for arrangement of reference signals in the parameter information. For example, the reference signals arranged at (0,2), (0,3), (1,2), (1,3), (2,2), (2,3), (3,2), and (3,3) are defined as a first reference signal group, the reference signals arranged at (6,2), (6,3), (7,2), (7,3), (8,2), (8,3), (9,2), and (9,3) are defined as a second reference signal group, and a flag indicating whether or not reference signals are to be arranged in each of the reference signal groups and transmitted is included in the parameter information. For example, in the example illustrated in FIG. 32, flag values associated with RB'0 in the parameter information are such that the flag associated with the first reference signal group has a value indicating that the reference signals are to be transmitted and the flag associated with the second reference signal group has a value indicating that the reference signals are not to be transmitted. In addition, flag values associated with RB'1 are such that the flag associated with the first reference signal group has a value indicating that the reference signals are not to be transmitted, and the flag associated with the second reference signal group has a value indicating that the reference signals are to be transmitted.

In addition, reference positions of the first reference signal group and the second reference signal group in a RB' may be defined in advance, and offset values from the reference positions may be stored in the parameter information. For example, in the example of FIG. 32, the first and second reference signal groups are at the reference positions. The offset values are in units of RB', that is, 12 subcarriers in the frequency directions. In this case, in the parameter information for RB'0, the flag value of the first reference signal group is a value indicating that the reference signals are to be transmitted, the offset value of the first reference signal group is 0, and the flag value of the second reference signal group is a value indicating that the reference signals are not to be transmitted. In contrast, in the parameter information for RB'1, the flag value of the first reference signal group is a value indicating that the reference signals are not to be transmitted, the flag value of the second reference signal group is a value indicating that the reference signals are to be transmitted, and the offset value of the second reference signal group is 1 (RB'). Thus, the offset value is defined with reference to RB'0. Note that the offset value may be defined in units of subcarriers instead of the RB' units.

Figure 33:
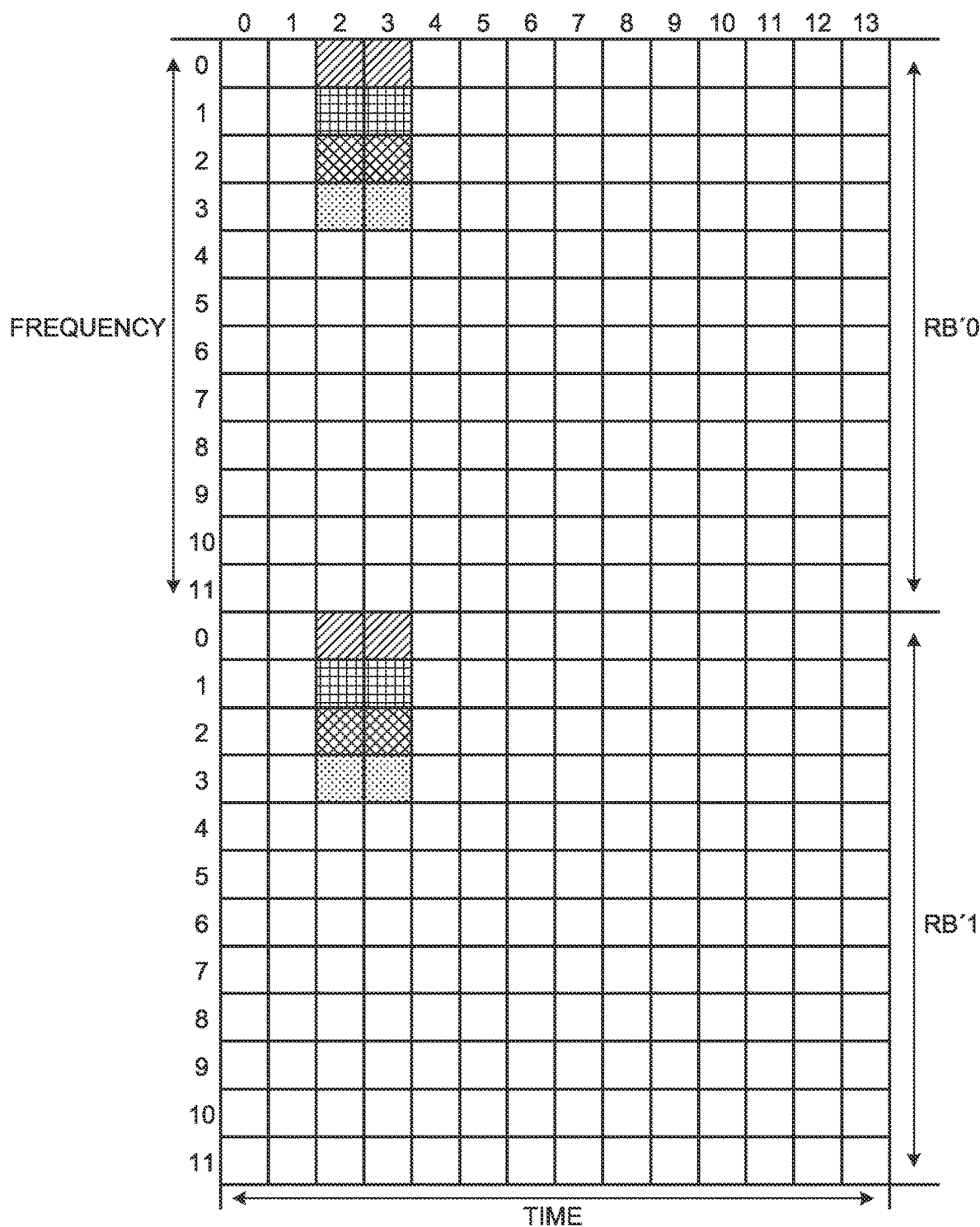
FIG. 33 is a diagram illustrating example arrangement in which offset values are different from those in the example arrangement illustrated in FIG. 32.

FIG. 33 is a diagram illustrating example arrangement in which the offset values are different from those in the example arrangement illustrated in FIG. 32. In the example arrangement illustrated in FIG. 33, in the parameter information for RB'0, the flag value of the first reference signal group is a value indicating that the reference signals are to be transmitted, the offset value of the first reference signal group is 0, and the flag value of the second reference signal group is a value indicating that the reference signals are not to be transmitted. In RB'1 in the parameter information, the flag value of the first reference signal group is a value indicating that the reference signals are to be transmitted, the offset value of the first reference signal group is 1 (RB'), and the flag value of the second reference signal group indicates that the reference signals are not to be transmitted.

Figure 34:
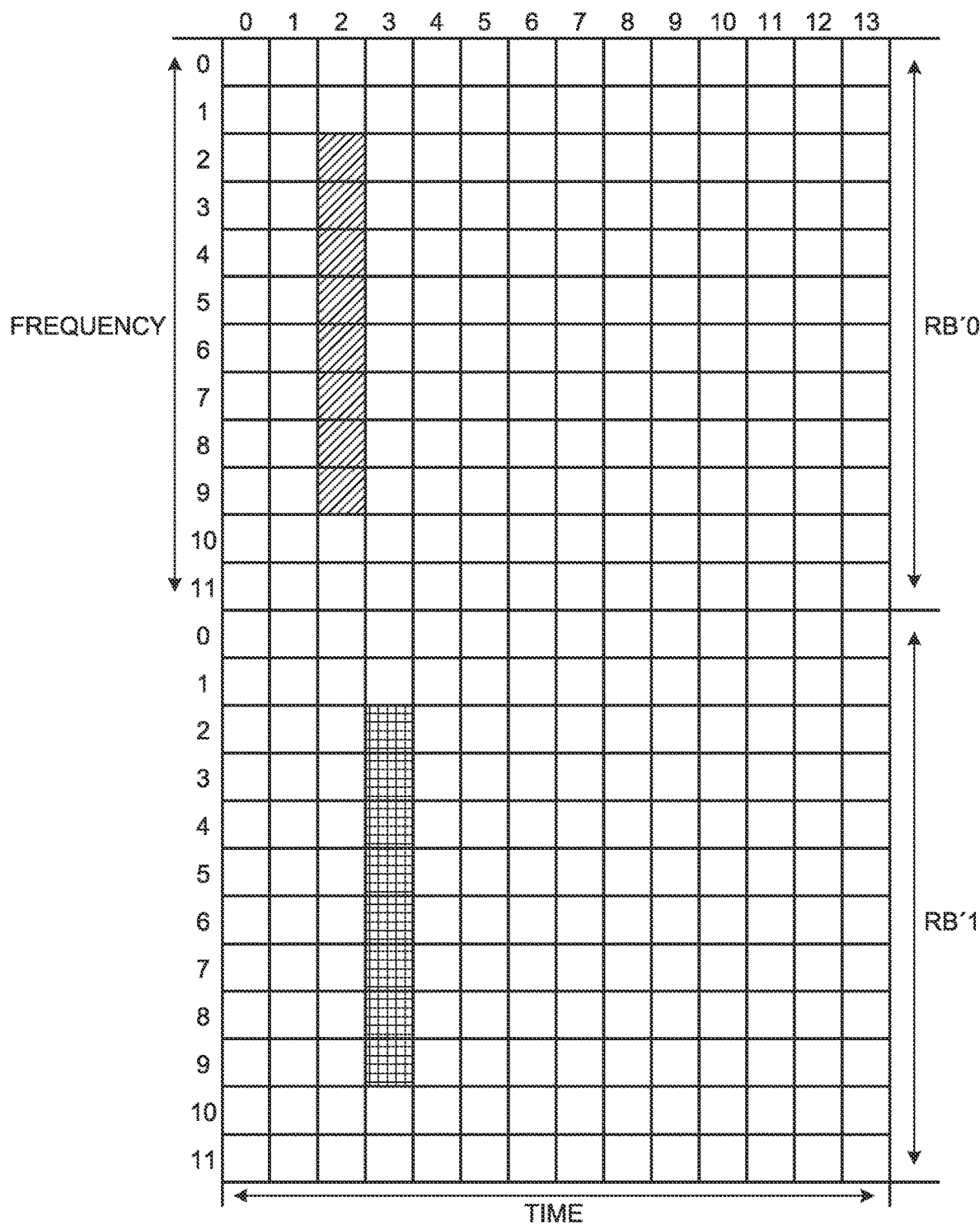
FIG. 34 is a diagram illustrating example arrangement in which offset values are different from those in the example arrangement illustrated in FIG. 27.
Figure 35:
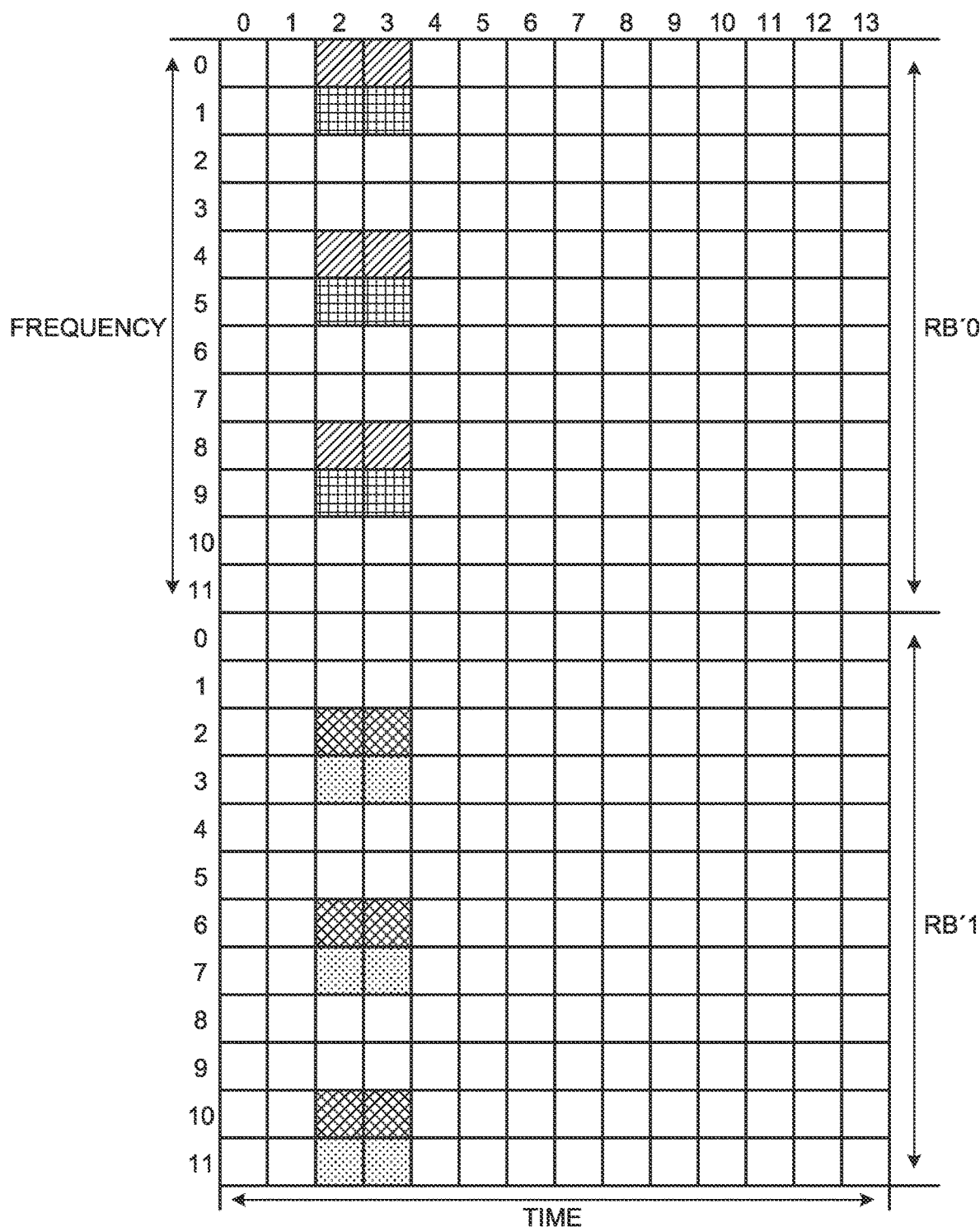
FIG. 35 is a diagram illustrating example arrangement in which offset values are different from those in the example arrangement illustrated in FIG. 11.

The arrangement of a reference signal group in one RB' of the resource block pair may be a reference, and the offset amount of the other RB' may be specified from the reference position. For example, in the example of FIG. 32, when the arrangement of the reference signal group in RB'0 is a reference, the offset amount of RB'1 is 6. FIG. 34 illustrates an example in which reference signals using one symbol illustrated in FIG. 27 are arranged. The first to eighth layers are multiplexed by using the reference signals arranged at the second symbols in RB'0, and the ninth to sixteen layers are multiplexed by using the reference signals arranged at the third symbols in RB'1. In the example illustrated in FIG. 34, reference signals are arranged over the zeroth schedule unit (RB'0) and the first schedule unit (RB'1), the second symbols on the second to ninth subcarriers in the zeroth schedule unit are defined as a first reference signal group, the second symbols on the second to ninth subcarriers in the first schedule unit are defined as a second reference signal group, and the reference signals in the first and second reference signal groups are multiplied by orthogonal codes of eight bits that are different for different layers. FIG. 35 illustrates an example of division of the arrangement illustrated in FIG. 11. In the example illustrated in FIG. 35, reference signals are arranged over the zeroth schedule unit and the first schedule unit, the second and third symbols on the zeroth subcarrier in the zeroth schedule unit are defined as a first reference signal group, the second and third symbols on the first subcarrier in the zeroth schedule unit are defined as a second reference signal group, the second and third symbols on the second subcarrier in the first schedule unit are defined as a third reference signal group, the second and third symbols on the third subcarrier in the first schedule unit are defined as a fourth reference signal group, reference signals in the first to fourth reference signal groups are multiplied by orthogonal codes of two bits that are different for different layers, the first to fourth reference signal groups are defined as a basic pattern, the basic pattern is duplicated, so that a total of three patterns are arranged in the frequency direction, and the respective patterns are offset by four subcarriers in the frequency direction.

The base station 1 may determine whether to arrange reference signals in one RB' as described in the first embodiment or distribute reference signals over a plurality of RB's as described above on the basis of the relative distance between the terminals 2 or the channel information. Specifically, the base station 1 may select whether to perform a first arrangement process of determining arrangement of reference signals in the frequency domain and the time domain within resources of one schedule unit or a second arrangement process of determining arrangement of reference signals in the frequency domain and the time domain within resources of a plurality of schedule units. In a case where the second arrangement process is performed, the amount of data used for reference signals within resources of one schedule unit is smaller than that used for reference signals within resources of one schedule unit in a case where the first arrangement process is performed.

The operations in the present embodiment other than those described above are similar to those in the first embodiment. Because sequences used as reference signals are grouped, group numbers or index numbers are assigned to the groups, and whether or not to transmit reference signal groups or offset values of the reference signal groups are included in the parameter information as described above, the terminals 2 can perform demodulation by using the parameter information. Thus, in the present embodiment, because reference signals are distributed over a plurality of RB's, the transmission efficiency is improved as compared to the first embodiment.

Third Embodiment

Figure 36:
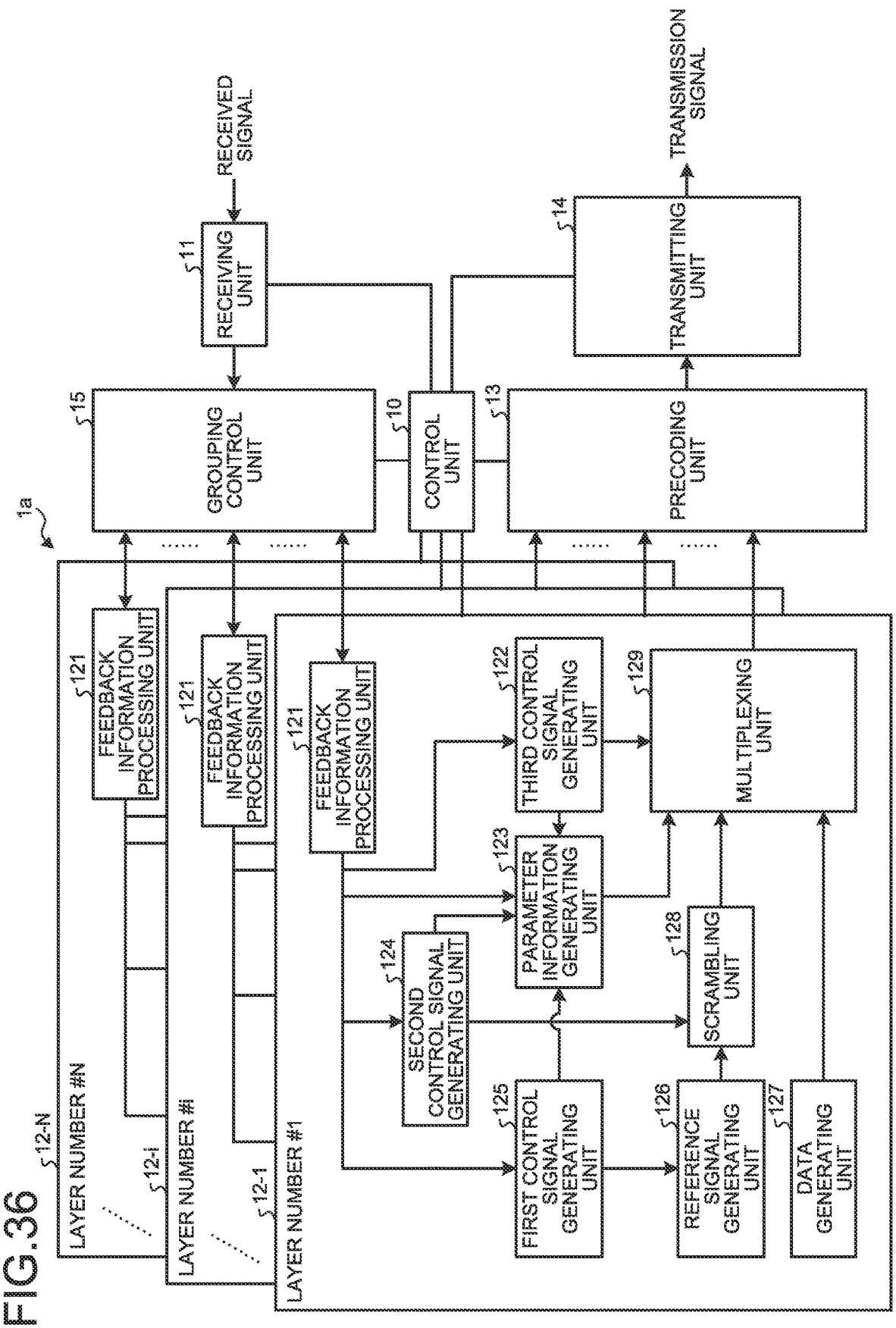
FIG. 36 is a diagram illustrating an example configuration of a base station in a third embodiment.

FIG. 36 is a diagram illustrating an example configuration of a base station in a third embodiment according to the present invention. The configuration of a communication system in the present invention is the same as that of the communication system in the first embodiment except that a base station 1a is included instead of the base station 1 in the first embodiment. Components that have the same functions as those in the first embodiment will be represented by the same reference numerals as those in the first embodiment, and redundant description thereof will not be repeated. Differences from the first embodiment will be mainly described below.

The base station 1a of the present embodiment performs space-division multiplexing of a plurality of layers. The terminals 2 need to know reference signals corresponding to the layers in order to demodulate the signals in the layers. In other words, the terminals 2 need to distinguish reference signals of each layer in some way. In the first and second embodiments, the techniques enabling separation of reference signals of each layer by using the time domain, the frequency domain, and the orthogonal codes are described. In the first and second embodiments, the terminals 2 are each informed of the positions of reference signals, the pattern of the reference signals, and information on orthogonal codes in a case where orthogonal codes are spread, of the layer associated with the terminal 2 by the parameter information.

Space-division multiplexing is performed by the precoding unit 13 by performing different beamforming for different destination terminals 2. In other words, when ideal beamforming is performed, signals transmitted from the base station 1a are transmitted in a spatially separated state for each of the terminals 2, and each of the terminals 2 receives only the layer(s) addressed to the terminal 2. In this case, each of the terminals 2 only needs to know parameter information relating to the reference signals of the layers transmitted to the terminal 2. In a case where the base station 1 transmits two layers to each of four terminals 2 by layer multiplexing, the base station 1 transmits signals of eight layers. If ideal beamforming is performed and the transmitted signals are completely separated for each of the terminals 2 by the beamforming, each of the terminals 2 only needs to know parameter information on the reference signals of the two layers for the terminal 2.

In actual environment, however, it is difficult to perform complete beamforming for various reasons such as failure in obtaining correct channel information. It is thus difficult to completely prevent the inter-user interference, that is, the influence of signals directed to other terminals 2. In such a case, a terminal 2 receives signals of the layers directed to other terminals 2 that are mixed with the signals of the layer(s) directed to the terminal 2. Thus, it is necessary to distinguish reference signals of the layer(s) directed to the terminal 2 from reference signals of the layers directed to other terminals 2, and perform demodulation by using the reference signals of the layers directed to the terminal 2. The "degree of mixture" is dependent on the accuracy of beamforming, the distances between the terminals 2, and the like. Thus, the degrees of requirement for arrangement of reference signals and separation of the reference signals using orthogonal codes are different depending on accuracy for spatial separation. For example, when accuracy for spatial separation is high, the degrees of separation between the reference signals by using the arrangement of reference signals in the frequency domain and the time domain and orthogonal codes may be low, and reference signals need not be completely separated in the frequency domain or the time domain, for example.

In the first and second embodiment, reference signals of layers are separated by using the arrangement of the reference signals in the frequency domain and the time domain and the orthogonal codes so that interference between layers is prevented. Thus, the accuracy of identification of reference signals is high but resources are consumed by the reference signals. In the present embodiment, a method of suppressing consumption of resources used for reference signals on the basis of the states of the terminals 2 will be described.

As illustrated in the configuration diagram of FIG. 36, the base station 1a in the present embodiment includes a grouping control unit 15 in addition to the configuration of the base station 1 in the first embodiment. The grouping control unit 15 collects feedback information received from the terminals 2 from the feedback information processing units 121 of the processing units 12. Alternatively, the grouping control unit 15 may collect feedback information received from the terminals 2 by extracting the feedback information transmitted from the terminals 2 from received signals received from the receiving unit 11. The grouping control unit 15 calculates combination of terminals 2 where spatial separation with high accuracy can be performed and combination of terminals 2 where spatial separation is difficult on the basis of the feedback information of the terminals 2. Specifically, a method of determining whether or not spatial separation with high accuracy can be performed will be described later. The terminals 2 are then grouped so that the terminals 2 where spatial separation is difficult belong to the same group and the terminals 2 where spatial separation with high accuracy can be performed belong to different groups. In other words, it is acceptable that spatial separation is difficult between terminals 2 in each group.

The grouping control unit 15 indicates information on reference signals to be used to the feedback information processing unit 121 of each of the processing units 12 on the basis of the result of grouping of the terminals 2. Specifically, the grouping control unit 15 indicates information on reference signals to the processing units 12 associated with the layers for the terminals 2 in the same group so that the orthogonality of reference signals between the layers is ensured by at least one of the time domain, the frequency domain, and orthogonal codes used in multiplication. The information on reference signals refers to information indicating at least one of the time domain, the frequency domain, and orthogonal codes used in multiplication. In addition, in the present embodiment, it is permitted that arrangements in the time domain and the frequency domain be identical among different groups, and it is also permitted that orthogonalization using orthogonal codes is not performed. Thus, in the present embodiment, use of identical reference signals among different groups is permitted, and scrambling sequences are changed from those in other groups for transmission of the reference signals. Note that the reference signal sequences themselves instead of scrambling sequences may be changed from those in other groups.

The determination on whether or not spatial separation with high accuracy can be performed, can be made by various techniques. Some methods are provided below as examples thereof.

Method of Determination Based on Whether or not a Distance Between Terminals 2 is Equal to or Longer than a Predetermined Value The positional relation of terminals 2 for which space-division multiplexing is to be performed can be obtained through feedback of position information of the terminals 2 from the terminals 2. Typically, spatial separation is difficult between terminals 2 at a short distance. The base station 1a calculates the distance between terminals 2, and can determine that accurate separation can be performed when the distance between the terminals 2 is equal to or longer than a predetermined value.

Method Using Beam Information Acquired by Terminals 2

When the base station 1a performs communication using narrow beams, the base station 1a periodically performs beam scanning over the entire cell to detect emergence of a new terminal 2. Specifically, the direction of beams is changed to scan the entire cell covered by the base station 1a. Typically, the directions of beams as viewed from the base station are associated in advance with beam numbers. In this process, each of the terminals 2 obtains the direction of a beam in which the beam is received with maximum power, and transmits the direction or the beam number of the beam received with maximum power as feedback information to the base station 1a. In this manner, the base station 1a obtains the positional relation of terminals 2 for which space-division multiplexing is to be performed. The base station 1a can determine that accurate separation can be performed when the difference in angle of the direction of the beam with maximum power between terminals 2 is equal to or larger than a predetermined value.

Method Using Spatial Correlation

Information on channels between the base station 1a and the terminals 2 is important information in performing beamforming. Typically, the base station 1a may calculate the channel information by using known signals transmitted via uplink communication making use of the reciprocity of channels or the reversibility of transmissions, or acquire the channel information as feedback from each of the terminals 2. Spatial correlation between UEs can be calculated on the basis of the channel information. A method for calculating the spatial correlation is as follows. For example, the amount of phase rotation and the amount of power attenuation caused by a channel between UE and the base station are channel information. When correlation values of the amount of phase rotation and the amount of power attenuation mentioned above fed back from different UEs are high, spatial correlation can be determined to be high. For the base station 1a, spatial separation between terminals 2 with high spatial correlation is difficult. When spatial correlation between terminals 2 is lower than a predetermined value, spatial separation with high accuracy is possible.

FIG. 37 is a flowchart illustrating an example of procedures in the base station 1a of the present embodiment. First, the grouping control unit 15 of the base station 1a acquires positional information of each of the terminals 2 from the UEs, that is, the terminals 2 (step S11). Step S12 is similar to step S1 in the first embodiment. After step S12, the grouping control unit 15 groups the terminals 2 on the basis of the positional information of the terminals 2 (step S13).

Subsequently, the grouping control unit 15 allocates difference scrambling codes, that is, different scrambling sequences to the groups (step S14). Subsequently, the grouping control unit 15 allocates orthogonal codes to the terminals 2 in each group similarly to the first embodiment (step S15). Subsequently, the processing units 12 perform multiplication of reference signals and orthogonal codes, and scrambling on the basis of instruction from the grouping control unit 15 (step S16). Steps S17 and S18 are similar to steps S5 and S6, respectively, in the first embodiment. Note that, in the present embodiment, identical arrangement of reference signals in the frequency domain and the time domain may be used in different layers. The control unit 10 can arrange reference signals in any positions in the frequency domain and the time domain.

FIG. 38 is a flowchart illustrating another example of procedures in the base station 1a of the present embodiment. In the example illustrated in FIG. 38, grouping is performed on the basis of channel information (CSI information). First, the base station 1a acquires channel information (CSI information) from each terminal 2 (step S21). Step S22 is similar to step S1 in the first embodiment. Subsequently, the grouping control unit 15 of the base station 1a calculates spatial correlation values between terminals 2 (step S23). The grouping control unit 15 of the base station 1a groups the terminals 2 on the basis of the spatial correlation values between terminals 2 (step S24). Steps S25 to S29 are similar to steps S14 to S18, respectively.

The base station 1a can select and perform either of first allocation in which identical arrangement in the frequency domain and the time domain is used in different layers described in the present embodiment and second allocation in which at least one of the arrangement in the frequency domain, the arrangement in the time domain, and orthogonal codes used in multiplication is different in different layers as described in the first embodiment. For example, the base station 1a selects the first allocation or the second allocation depending on the distance between terminals 2. Alternatively, the base station 1a may acquire, from each terminal 2, information indicating the direction in which the reception strength is maximum when signals emitted in different directions transmitted from the base station 1a are received by the terminal 2, and select the first allocation or the second allocation on the basis of differences in the direction between the terminals 2. Alternatively, the base station 1a may acquire channel information from each terminal 2, calculate spatial correlation between the terminals 2 on the basis of the channel information, and select the first allocation or the second allocation depending on the spatial correlation.

The grouping control unit 15 of the base station 1a in the present embodiment may be implemented by the control circuit 100 illustrated in FIG. 30 or the dedicated hardware circuit 200 illustrated in FIG. 31 similarly to the components in the first embodiment.

As described above, in the present embodiment, the terminals 2 are grouped on the basis of whether or not separation with high accuracy can be performed between the terminals 2, the time domain, the frequency domain and orthogonal codes used in multiplication are permitted to be identical between terminals 2 where separation with high accuracy can be performed, and scrambling processes for terminals 2 are different to one another where separation with high accuracy can be performed. This produces effects similar to those in the first embodiment and suppresses consumption of resources used by reference signals as compared to the first embodiment.

The configurations presented in the embodiments above are examples of the present invention, which can be combined with other known technologies or can be partly omitted or modified without departing from the scope of the present invention.

REFERENCE SIGNS LIST 1, 1a base station; 2, 2-1 to 2-n terminal; 3 communication system; 10, 23 control unit; 11, 21 receiving unit; 12, 12-1 to 12-N processing unit; 13 precoding unit; 14, 24 transmitting unit; 15 grouping control unit; 22 demodulation unit; 121 feedback information processing unit; 122 third control signal generating unit; 123 parameter information generating unit; 124 second control signal generating unit; 125 first control signal generating unit; 126 reference signal generating unit; 127 data generating unit; 128 scrambling unit; 129 multiplexing unit.

The invention claimed is:

1. A transmission device comprising:
processing circuitry; and
a memory storing instructions causing the processing circuitry
to allocate one or more layers per terminal for transmission to a plurality of the terminals, and configure positions in a frequency domain and a time domain of reference signals of each of the layers on the basis of information on spatial correlation among the plurality of the terminals, and information indicating condition of each of channel between the transmission device and each of the plurality of the terminals;
to arrange the reference signals of each of the layers in the frequency domain and the time domain on the basis of the positions in the frequency domain and the time domain configured; and
to perform space-division multiplexing on signals of one or more layers arranged, and transmit the multiplexed signals, wherein
a schedule unit, which is a unit for allocation of resources in the frequency domain and the time domain, is constituted by a matrix of twelve subcarriers from zeroth to eleventh subcarriers and fourteen symbols from zeroth to thirteenth symbols,
with respect to a first plurality of layers, the reference signals that are arranged to second and third symbols of each of zeroth and first subcarriers and to the second and the third symbols of each of sixth and seventh subcarriers, are multiplied by orthogonal codes that are orthogonal to one another among the first plurality of layers, and
with respect to a second plurality of layers which is different from the first plurality of layers, the reference signals that are arranged to the second and the third symbols of each of second and third subcarriers and to the second and the third symbols of each of eighth and ninth subcarriers, are multiplied by orthogonal codes that are orthogonal to one another among the second plurality of layers.

2. A communication system comprising:
the transmission device according to claim 1, and
a terminal to receive signals transmitted from the transmission device.

3. A control circuit comprising a processor and a memory storing instructions executable by the processor for controlling a transmission device to cause the transmission device processes of:
allocating one or more layers per terminal for transmission to a plurality of the terminals,
configuring positions in a frequency domain and a time domain of reference signals of each of the layers on the basis of information on spatial correlation among the plurality of the terminals, and information indicating condition of each of channel between the transmission device and each of the plurality of the terminals;
arranging the reference signals of each of the layers in the frequency domain and the time domain on the basis of the positions in the frequency domain and the time domain configured; and
space-division multiplexing on signals of one or more layers arranged, and transmit the multiplexed signals, wherein
a schedule unit, which is a unit for allocation of resources in the frequency domain and the time domain, is constituted by a matrix of twelve subcarriers from zeroth to eleventh subcarriers and fourteen symbols from zeroth to thirteenth symbols,
with respect to a first plurality of layers, the reference signals that are arranged to second and third symbols of each of zeroth and first subcarriers and to the second and third symbols of each of a sixth and a seventh subcarriers, are multiplied by orthogonal codes that are orthogonal to one another among the first plurality of layers, and with respect to a second plurality of layers which is different from the first plurality of layers, the reference signals that are arranged to the second and the third symbols of each of second and third subcarriers and to the second and the third symbols of each of eighth and ninth subcarriers, are multiplied by orthogonal codes that are orthogonal to one another among the second plurality of layers.

4. A non-transitory computer storage medium to store a program for controlling a transmission device, the program including instructions of:

allocating one or more layers per terminal for transmission to a plurality of the terminals, configuring positions in a frequency domain and a time domain of reference signals of each of the layers on the basis of information on spatial correlation among the plurality of the terminals, and information indicating condition of each of channel between the transmission device and each of the plurality of the terminals;

arranging the reference signals of each of the layers in the frequency domain and the time domain on the basis of the positions in the frequency domain and the time domain configured; and space-division multiplexing on signals of one or more layers arranged, and transmitting the multiplexed signals, wherein a schedule unit, which is a unit for allocation of resources in the frequency domain and the time domain, is constituted by a matrix of twelve subcarriers from zeroth to eleventh subcarriers and fourteen symbols from zeroth to thirteenth symbols, with respect to a first plurality of layers, the reference signals that are arranged to second and third symbols of each of zeroth and first subcarriers and to the second and the third symbols of each of sixth and seventh subcarriers, are multiplied by orthogonal codes that are orthogonal to one another among the first plurality of layers, and with respect to a second plurality of layers which is different from the first plurality of layers, the reference signals that are arranged to the second and the third symbols of each of second and third subcarriers and to the second and the third symbols of each of eighth and ninth subcarriers, are multiplied by orthogonal codes that are orthogonal to one another among the second plurality of layers.

5. A transmission device comprising:

a controller allocating one or more layers per terminal for transmission to a plurality of the terminals, and configuring positions in a frequency domain and a time domain of reference signals of each of the layers on the basis of information indicating condition of each of channel between the transmission device and each of the plurality of the terminals;

a multiplexer arranging the reference signals of each of the layers in the frequency domain and the time domain on the basis of the positions in the frequency domain and the time domain configured; and a precoder performing space-division multiplexing on signals of one or more layers arranged; and a transmitter transmitting the multiplexed signals, wherein a schedule unit, which is a unit for allocation of resources in the frequency domain and the time domain, is constituted by a matrix of twelve subcarriers from zeroth to eleventh subcarriers and fourteen symbols from zeroth to thirteenth symbols, with respect to a first plurality of layers, the reference signals that are arranged to second and third symbols of each of zeroth and first subcarriers and to the second and the third symbols of each of sixth and seventh subcarriers, are multiplied by orthogonal codes that are orthogonal to one another among the first plurality of layers, and with respect to a second plurality of layers which is different from the first plurality of layers, the reference signals that are arranged to the second and the third symbols of each of second and third subcarriers and to the second and the third symbols of each of eighth and ninth subcarriers, are multiplied by orthogonal codes that are orthogonal to one another among the second plurality of layers.

* * * * *